(12) United States Patent
Skolnick

(10) Patent No.: US 10,855,958 B1
(45) Date of Patent: *Dec. 1, 2020

(54) SYSTEM AND METHOD FOR MANAGING SERVICE AND NON-SERVICE RELATED ACTIVITIES ASSOCIATED WITH A WASTE COLLECTION, DISPOSAL AND/OR RECYCLING VEHICLE

(71) Applicant: WM INTELLECTUAL PROPERTY HOLDINGS, LLC, Houston, TX (US)

(72) Inventor: Barry S. Skolnick, Reno, NV (US)

(73) Assignee: WM INTELLECTUAL PROPERTY HOLDINGS, LLC, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/920,142

(22) Filed: Jul. 2, 2020

Related U.S. Application Data

(63) Continuation of application No. 16/809,335, filed on Mar. 4, 2020, now Pat. No. 10,750,134, which is a continuation of application No. 16/243,257, filed on Jan. 9, 2019, now Pat. No. 10,594,991.

(60) Provisional application No. 62/615,360, filed on Jan. 9, 2018.

(51) Int. Cl.
  *H04N 7/18* (2006.01)
  *B65F 3/00* (2006.01)

(52) U.S. Cl.
  CPC ........ *H04N 7/188* (2013.01); *B60R 2300/105* (2013.01); *B60R 2300/406* (2013.01); *B60R 2300/70* (2013.01); *B65F 3/00* (2013.01)

(58) Field of Classification Search
  None
  See application file for complete search history.

(56) References Cited

U.S. PATENT DOCUMENTS

| | | | |
|---|---|---|---|
| 5,072,833 A | 12/1991 | Hansen et al. |
| 5,230,393 A | 7/1993 | Mezey |
| 5,245,137 A | 9/1993 | Bowman et al. |
| 5,278,914 A | 1/1994 | Kinoshita et al. |
| 5,489,898 A | 2/1996 | Shigekusa et al. |
| 5,762,461 A | 6/1998 | Frohlingsdorf |
| 5,837,945 A | 11/1998 | Cornwell et al. |
| 6,097,995 A | 8/2000 | Tipton et al. |
| 6,408,261 B1 | 6/2002 | Durbin |

(Continued)

FOREIGN PATENT DOCUMENTS

| | | |
|---|---|---|
| CA | 2632738 | 5/2016 |
| CA | 2632689 | 10/2016 |

(Continued)

OTHER PUBLICATIONS

US 9,092,921 B2, 07/2015, Lambert et al. (withdrawn)

(Continued)

*Primary Examiner* — Christopher Braniff
(74) *Attorney, Agent, or Firm* — Greenberg Traurig LLP

(57) ABSTRACT

Systems and methods are provided for using video/still images captured by continuously recording optical sensors mounted on waste collection vehicles used in in the waste collection, disposal and recycling industry for operational and customer service related purposes. Optical sensors are integrated into the in-cab monitor as well as the onboard computer, digital video recorder and other external devices.

8 Claims, 62 Drawing Sheets

OBC and DVR Configuration (1) Left Front Camera
(2) Right Front Camera
(3) Right Side Camera
(4) Right Rear Camera
(5) Left Rear Camera
(6) Rear Hopper
(7) Left Side Camera
(8) Front Hopper Camera

(56) References Cited

U.S. PATENT DOCUMENTS

| | | |
|---|---|---|
| 6,448,898 B1 | 9/2002 | Kasik |
| 6,510,376 B2 | 1/2003 | Burnstein et al. |
| 6,563,433 B2 | 5/2003 | Fujiwara |
| 6,729,540 B2 | 5/2004 | Ogawa |
| 6,811,030 B1 | 11/2004 | Compton et al. |
| 7,146,294 B1 | 12/2006 | Waitkus, Jr. |
| 7,330,128 B1 | 2/2008 | Lombardo et al. |
| 7,383,195 B2 | 6/2008 | Mallett et al. |
| 7,406,402 B1 | 7/2008 | Waitkus, Jr. |
| 7,501,951 B2 | 3/2009 | Maruca et al. |
| 7,511,611 B2 | 3/2009 | Sabin et al. |
| 7,536,457 B2 | 5/2009 | Miller |
| 7,659,827 B2 | 2/2010 | Gunderson et al. |
| 7,804,426 B2 | 9/2010 | Etcheson |
| 7,817,021 B2 | 10/2010 | Date et al. |
| 7,870,042 B2 | 1/2011 | Maruca et al. |
| 7,878,392 B2 | 2/2011 | Mayers et al. |
| 7,957,937 B2 | 6/2011 | Waitkus, Jr. |
| 7,994,909 B2 | 8/2011 | Maruca et al. |
| 7,999,688 B2 | 8/2011 | Healey et al. |
| 8,020,767 B2 | 9/2011 | Reeves et al. |
| 8,056,817 B2 | 11/2011 | Flood |
| 8,146,798 B2 | 4/2012 | Flood et al. |
| 8,185,277 B2 | 5/2012 | Flood et al. |
| 8,269,617 B2 | 9/2012 | Cook et al. |
| 8,314,708 B2 | 11/2012 | Gunderson et al. |
| 8,330,059 B2 | 12/2012 | Curotto |
| 8,373,567 B2 | 2/2013 | Denson |
| 8,374,746 B2 | 2/2013 | Plante |
| 8,384,540 B2 | 2/2013 | Reyes et al. |
| 8,485,301 B2 | 7/2013 | Grubaugh et al. |
| 8,508,353 B2 | 8/2013 | Cook et al. |
| 8,542,121 B2 | 9/2013 | Maruca et al. |
| 8,550,252 B2 | 10/2013 | Borowski et al. |
| 8,564,426 B2 | 10/2013 | Cook et al. |
| 8,564,446 B2 | 10/2013 | Gunderson et al. |
| 8,602,298 B2 | 12/2013 | Gonen |
| 8,606,492 B1 | 12/2013 | Botnen |
| 8,630,773 B2 | 1/2014 | Lee et al. |
| 8,645,189 B2 | 2/2014 | Lyle |
| 8,674,243 B2 | 3/2014 | Curotto |
| 8,676,428 B2 | 3/2014 | Richardson et al. |
| 8,714,440 B2 | 5/2014 | Flood et al. |
| 8,738,423 B2 | 5/2014 | Lyle |
| 8,744,642 B2 | 6/2014 | Nemat-Nasser et al. |
| 8,803,695 B2 | 8/2014 | Denson |
| 8,818,908 B2 | 8/2014 | Altice et al. |
| 8,849,501 B2 | 9/2014 | Cook et al. |
| 8,854,199 B2 | 10/2014 | Cook et al. |
| 8,862,495 B2 | 10/2014 | Ritter |
| 8,880,279 B2 | 11/2014 | Plante |
| 8,930,072 B1 | 1/2015 | Lambert et al. |
| 8,952,819 B2 | 2/2015 | Nemat-Nasser |
| 8,970,703 B1 | 3/2015 | Thomas, II et al. |
| 8,996,234 B1 | 3/2015 | Tamari et al. |
| 9,047,721 B1 | 6/2015 | Botnen |
| 9,058,706 B2 | 6/2015 | Cheng |
| 9,098,884 B2 | 8/2015 | Borowski et al. |
| 9,098,956 B2 | 8/2015 | Lambert et al. |
| 9,111,453 B1 | 8/2015 | Alselimi |
| 9,158,962 B1 | 10/2015 | Nemat-Nasser et al. |
| 9,180,887 B2 | 11/2015 | Nemat-Nasser et al. |
| 9,189,899 B2 | 11/2015 | Cook et al. |
| 9,226,004 B1 | 12/2015 | Plante |
| 9,235,750 B1 | 1/2016 | Sutton et al. |
| 9,238,467 B1 | 1/2016 | Hoye et al. |
| 9,240,079 B2 | 1/2016 | Lambert et al. |
| 9,240,080 B2 | 1/2016 | Lambert et al. |
| 9,245,391 B2 | 1/2016 | Cook et al. |
| 9,247,040 B1 | 1/2016 | Sutton |
| 9,251,388 B2 | 2/2016 | Flood |
| 9,268,741 B1 | 2/2016 | Lambert et al. |
| 9,275,090 B2 | 3/2016 | Denson |
| 9,280,857 B2 | 3/2016 | Lambert et al. |
| 9,292,980 B2 | 3/2016 | Cook et al. |
| 9,298,575 B2 | 3/2016 | Tamari et al. |
| 9,317,980 B2 | 4/2016 | Cook |
| 9,330,287 B2 | 5/2016 | Graczyk et al. |
| 9,341,487 B2 | 5/2016 | Bonhomme |
| 9,342,884 B2 | 5/2016 | Mask |
| 9,344,683 B1 | 5/2016 | Nemat-Nasser et al. |
| 9,347,818 B2 | 5/2016 | Curotto |
| 9,358,926 B2 | 6/2016 | Lambert et al. |
| 9,373,257 B2 | 6/2016 | Bonhomme |
| 9,389,147 B1 | 7/2016 | Lambert et al. |
| 9,390,568 B2 | 7/2016 | Nemat-Nasser et al. |
| 9,396,453 B2 | 7/2016 | Hynes et al. |
| 9,401,985 B2 | 7/2016 | Sutton |
| 9,403,278 B1 | 8/2016 | Van Kampen et al. |
| 9,405,992 B2 | 8/2016 | Badholm et al. |
| 9,418,488 B1 | 8/2016 | Lambert |
| 9,428,195 B1 | 8/2016 | Surpi |
| 9,442,194 B2 | 9/2016 | Kurihara et al. |
| 9,463,110 B2 | 10/2016 | Nishtala et al. |
| 9,466,212 B1 | 10/2016 | Stumphauzer, II et al. |
| 9,472,083 B2 | 10/2016 | Nemat-Nasser |
| 9,495,811 B2 | 11/2016 | Herron |
| 9,501,690 B2 | 11/2016 | Nemat-Nasser et al. |
| 9,520,046 B2 | 12/2016 | Call et al. |
| 9,525,967 B2 | 12/2016 | Mamlyuk |
| 9,546,040 B2 | 1/2017 | Flood et al. |
| 9,573,601 B2 | 2/2017 | Hoye et al. |
| 9,574,892 B2 | 2/2017 | Rodoni |
| 9,586,756 B2 | 3/2017 | O'Riordan et al. |
| 9,589,393 B2 | 3/2017 | Botnen |
| 9,594,725 B1 | 3/2017 | Cook et al. |
| 9,595,191 B1 | 3/2017 | Surpi |
| 9,597,997 B2 | 3/2017 | Mitsuta et al. |
| 9,604,648 B2 | 3/2017 | Tamari et al. |
| 9,633,318 B2 | 4/2017 | Plante |
| 9,633,576 B2 | 4/2017 | Reed |
| 9,639,535 B1 | 5/2017 | Ripley |
| 9,646,651 B1 | 5/2017 | Richardson |
| 9,650,051 B2 | 5/2017 | Hoye et al. |
| 9,679,210 B2 | 6/2017 | Sutton et al. |
| 9,685,098 B1 | 6/2017 | Kypri |
| 9,688,282 B2 | 6/2017 | Cook et al. |
| 9,702,113 B2 | 7/2017 | Kotaki et al. |
| 9,707,595 B2 | 7/2017 | Ripley |
| 9,721,342 B2 | 8/2017 | Mask |
| 9,734,717 B1 | 8/2017 | Surpi et al. |
| 9,754,382 B1 | 9/2017 | Rodoni |
| 9,766,086 B1 | 9/2017 | Rodoni |
| 9,778,058 B2 | 10/2017 | Rodoni |
| 9,803,994 B1 | 10/2017 | Rodoni |
| 9,824,336 B2 | 11/2017 | Borges et al. |
| 9,824,337 B1 | 11/2017 | Rodoni |
| 9,834,375 B2 | 12/2017 | Jenkins et al. |
| 9,852,405 B1 | 12/2017 | Rodoni et al. |
| 10,152,737 B2 | 12/2018 | Lyman |
| 10,198,718 B2 | 2/2019 | Rodoni |
| 10,210,623 B2 | 2/2019 | Rodoni |
| 10,311,501 B1 | 6/2019 | Rodoni |
| 10,332,197 B2 | 6/2019 | Kekalainen et al. |
| 10,354,232 B2 | 7/2019 | Tomlin, Jr. et al. |
| 10,382,915 B2 | 8/2019 | Rodoni |
| 10,410,183 B2 | 9/2019 | Bostick et al. |
| 10,594,991 B1 | 3/2020 | Skolnick |
| 2002/0069097 A1 | 6/2002 | Conrath |
| 2002/0077875 A1 | 6/2002 | Nadir |
| 2002/0125315 A1 | 9/2002 | Ogawa |
| 2002/0194144 A1 | 12/2002 | Berry |
| 2003/0014334 A1 | 1/2003 | Tsukamoto |
| 2003/0031543 A1 | 2/2003 | Elbrink |
| 2003/0069745 A1 | 4/2003 | Zenko |
| 2003/0191658 A1 | 10/2003 | Rajewski |
| 2003/0233261 A1 | 12/2003 | Kawahara et al. |
| 2004/0039595 A1 | 2/2004 | Berry |
| 2004/0167799 A1 | 8/2004 | Berry |
| 2005/0038572 A1 | 2/2005 | Krupowicz |
| 2005/0080520 A1 | 4/2005 | Kline et al. |
| 2005/0182643 A1 | 8/2005 | Shirvanian |
| 2005/0209825 A1 | 9/2005 | Ogawa |
| 2005/0261917 A1 | 11/2005 | Forget Shield |

(56) References Cited

U.S. PATENT DOCUMENTS

| | | | |
|---|---|---|---|
| 2006/0061481 A1* | 3/2006 | Kurple | B65F 3/0203 340/686.1 |
| 2006/0235808 A1 | 10/2006 | Berry | |
| 2007/0150138 A1 | 6/2007 | Plante | |
| 2007/0260466 A1 | 11/2007 | Casella et al. | |
| 2008/0010197 A1 | 1/2008 | Scherer | |
| 2008/0077541 A1 | 3/2008 | Scherer et al. | |
| 2008/0202357 A1 | 8/2008 | Flood | |
| 2008/0234889 A1 | 9/2008 | Sorensen | |
| 2009/0014363 A1 | 1/2009 | Gonen et al. | |
| 2009/0024479 A1 | 1/2009 | Gonen et al. | |
| 2009/0083090 A1 | 3/2009 | Rolfes et al. | |
| 2009/0138358 A1 | 5/2009 | Gonen et al. | |
| 2009/0157255 A1* | 6/2009 | Plante | G07C 5/085 701/33.4 |
| 2009/0161907 A1 | 6/2009 | Healey et al. | |
| 2010/0017276 A1 | 1/2010 | Wolff et al. | |
| 2010/0071572 A1 | 3/2010 | Carroll et al. | |
| 2010/0119341 A1 | 5/2010 | Flood et al. | |
| 2010/0185506 A1 | 7/2010 | Wolff et al. | |
| 2010/0217715 A1 | 8/2010 | Lipcon | |
| 2010/0312601 A1 | 12/2010 | Lin | |
| 2011/0108620 A1 | 5/2011 | Wadden et al. | |
| 2011/0225098 A1 | 9/2011 | Wolff et al. | |
| 2011/0279245 A1 | 11/2011 | Hynes et al. | |
| 2011/0316689 A1 | 12/2011 | Reyes et al. | |
| 2012/0029980 A1 | 2/2012 | Paz et al. | |
| 2012/0029985 A1 | 2/2012 | Wilson et al. | |
| 2012/0047080 A1 | 2/2012 | Rodatos | |
| 2012/0262568 A1 | 10/2012 | Ruthenberg | |
| 2012/0265589 A1 | 10/2012 | Whittier | |
| 2013/0024335 A1 | 1/2013 | Lok | |
| 2013/0039728 A1 | 2/2013 | Price et al. | |
| 2013/0041832 A1 | 2/2013 | Rodatos | |
| 2013/0075468 A1 | 3/2013 | Wadden et al. | |
| 2013/0332247 A1 | 12/2013 | Gu | |
| 2014/0060939 A1 | 3/2014 | Eppert | |
| 2014/0114868 A1 | 4/2014 | Wan et al. | |
| 2014/0172174 A1 | 6/2014 | Poss et al. | |
| 2014/0214697 A1 | 7/2014 | Mcsweeney | |
| 2014/0236446 A1 | 8/2014 | Spence | |
| 2014/0278630 A1 | 9/2014 | Gates et al. | |
| 2014/0379588 A1 | 12/2014 | Gates et al. | |
| 2015/0095103 A1 | 4/2015 | Rajamani et al. | |
| 2015/0100428 A1 | 4/2015 | Parkinson, Jr. | |
| 2015/0144012 A1 | 5/2015 | Frybarger | |
| 2015/0278759 A1 | 10/2015 | Harris et al. | |
| 2015/0294431 A1 | 10/2015 | Fiorucci et al. | |
| 2015/0298903 A1 | 10/2015 | Luxford | |
| 2015/0302364 A1 | 10/2015 | Calzada et al. | |
| 2015/0307273 A1 | 10/2015 | Lyman | |
| 2015/0324760 A1 | 11/2015 | Borowski et al. | |
| 2015/0326829 A1 | 11/2015 | Kurihara et al. | |
| 2015/0348252 A1 | 12/2015 | Mask | |
| 2015/0350610 A1 | 12/2015 | Loh | |
| 2016/0021287 A1 | 1/2016 | Loh | |
| 2016/0044285 A1 | 2/2016 | Gasca et al. | |
| 2016/0179065 A1 | 6/2016 | Shahabdeen | |
| 2016/0187188 A1 | 6/2016 | Curotto | |
| 2016/0224846 A1 | 8/2016 | Cardno | |
| 2016/0232498 A1 | 8/2016 | Tomlin, Jr. et al. | |
| 2016/0239689 A1 | 8/2016 | Flood | |
| 2016/0247058 A1 | 8/2016 | Kreiner et al. | |
| 2016/0292653 A1 | 10/2016 | Gonen | |
| 2016/0300297 A1* | 10/2016 | Kekalainen | G06Q 10/08 |
| 2016/0321619 A1 | 11/2016 | Inan et al. | |
| 2016/0335814 A1 | 11/2016 | Tamari et al. | |
| 2016/0372225 A1 | 12/2016 | Lefkowitz et al. | |
| 2016/0377445 A1 | 12/2016 | Rodoni | |
| 2016/0379152 A1 | 12/2016 | Rodoni | |
| 2016/0379154 A1 | 12/2016 | Rodoni | |
| 2017/0008671 A1 | 1/2017 | Whitman et al. | |
| 2017/0011363 A1 | 1/2017 | Whitman et al. | |
| 2017/0046528 A1 | 2/2017 | Lambert | |
| 2017/0061222 A1 | 3/2017 | Hoye et al. | |
| 2017/0076249 A1 | 3/2017 | Byron et al. | |
| 2017/0081120 A1 | 3/2017 | Liu et al. | |
| 2017/0086230 A1 | 3/2017 | Azevedo et al. | |
| 2017/0109704 A1 | 4/2017 | Lettieri et al. | |
| 2017/0116583 A1 | 4/2017 | Rodoni | |
| 2017/0116668 A1 | 4/2017 | Rodoni | |
| 2017/0118609 A1 | 4/2017 | Rodoni | |
| 2017/0121107 A1 | 5/2017 | Flood et al. | |
| 2017/0124533 A1 | 5/2017 | Rodoni | |
| 2017/0154287 A1 | 6/2017 | Kalinowski et al. | |
| 2017/0176986 A1 | 6/2017 | High et al. | |
| 2017/0193798 A1 | 7/2017 | Call et al. | |
| 2017/0200333 A1 | 7/2017 | Plante | |
| 2017/0203706 A1 | 7/2017 | Reed | |
| 2017/0221017 A1 | 8/2017 | Gonen | |
| 2017/0243269 A1 | 8/2017 | Rodini et al. | |
| 2017/0277726 A1 | 9/2017 | Huang et al. | |
| 2017/0308871 A1 | 10/2017 | Tallis | |
| 2017/0330134 A1 | 11/2017 | Botea et al. | |
| 2017/0345169 A1 | 11/2017 | Rodoni | |
| 2017/0350716 A1 | 12/2017 | Rodoni | |
| 2017/0355522 A1 | 12/2017 | Salinas et al. | |
| 2017/0364872 A1 | 12/2017 | Rodoni | |
| 2018/0012172 A1 | 1/2018 | Rodoni | |
| 2018/0025329 A1 | 1/2018 | Podgorny et al. | |
| 2018/0075417 A1 | 3/2018 | Gordon et al. | |
| 2018/0158033 A1 | 6/2018 | Woods et al. | |
| 2018/0194305 A1 | 7/2018 | Reed | |
| 2018/0247351 A1 | 8/2018 | Rodoni | |
| 2019/0005466 A1 | 1/2019 | Rodoni | |
| 2019/0019167 A1 | 1/2019 | Candel et al. | |
| 2019/0056416 A1 | 2/2019 | Rodoni | |
| 2019/0196965 A1 | 6/2019 | Zhang et al. | |
| 2019/0197498 A1 | 6/2019 | Gates et al. | |
| 2019/0210798 A1 | 7/2019 | Schultz | |
| 2019/0217342 A1 | 7/2019 | Parr et al. | |
| 2019/0244267 A1 | 8/2019 | Rattner et al. | |
| 2019/0311333 A1 | 10/2019 | Kekalainen et al. | |
| 2020/0175556 A1 | 6/2020 | Podgorny | |

FOREIGN PATENT DOCUMENTS

| | | |
|---|---|---|
| CN | 101482742 | 7/2009 |
| CN | 105787850 | 7/2016 |
| CN | 105929778 | 9/2016 |
| CN | 106296416 | 1/2017 |
| DE | 69305435 | 4/1997 |
| DE | 69902531 | 4/2003 |
| DE | 102012006536 | 10/2013 |
| EP | 577540 | 10/1996 |
| EP | 1084069 | 8/2002 |
| EP | 2028138 | 2/2009 |
| GB | 2447184 | 9/2008 |
| JP | 2012-206817 | 10/2012 |
| JP | 2013-142037 | 7/2013 |
| WO | 99/54237 | 10/1999 |
| WO | 2007/067772 | 6/2007 |
| WO | 2007/067775 | 6/2007 |
| WO | 2012/069839 | 5/2012 |
| WO | 2012/172395 | 12/2012 |
| WO | 2016/074608 | 5/2016 |
| WO | 2016/187677 | 12/2016 |
| WO | 2017/179038 | 10/2017 |
| WO | 2018/182858 | 10/2018 |
| WO | 2018/206766 | 11/2018 |
| WO | 2018/215682 | 11/2018 |

OTHER PUBLICATIONS

Nilopherjan, N. et al.; Automatic Garbage Volume Estimation Using SIFT Features Through Deep Neural Networks and Poisson Surface Reconstruction; International Journal of Pure and Applied Mathematics; vol. 119, No. 14; 2015; pp. 1101-1107.

Ghongane, Aishwarya et al; Automatic Garbage Tracking and Collection System; International Journal of Advanced Technology in Engineering and Science; vol. 5, No. 4; Apr. 2017; pp. 166-173.

(56) References Cited

OTHER PUBLICATIONS

Rajani et al.; Waste Management System Based on Location Intelligence; 4 pages; Poojya Doddappa Appa Colleage of Engineering, Kalaburgi.

Waste Management Review; A clear vison on waste collections; Dec. 8, 2015; 5 pages; http://wastemanagementreiew.com/au/a-clear-vison-on-waste-collections/.

Waste Management Surveillance Solutiosn; Vehicle Video Cameral; Aug. 23, 2017; 6 pages; http://vehiclevideocameras.com/mobile-video-applications/waste-management-camera.html.

Rich, John I.; Truck Equipment: Creating a Safer Waste Truck Environment; Sep. 2013; pp. 18-20; WasteAdvantage Magainze.

Town of Prosper; News Release: Solid Waste Collection Trucks Equipped wit "Third Eye," video system aborad trash and recycling trucks to improve service; Jan. 13, 2017; 1 page; U.S.

Product News Network; Telematics/Live Video System Increases Driver Safety/Productivity; Mar. 30, 2015; 3 pages; Thomas Industrial Network, Inc.

Karidis, Arlene; Waste Pro to Install Hight-Tech Camera Systems in all Trucks to Address Driver Safety; Mar. 10, 2016; 2 pages; Wastedive.com.

Greenwalt, Megan; Finnish Company Uses IoT to Digitize Trash Bins; Sep. 14, 2016; 21 pages; www.waste360.com.

Georgakopoulos, Chris; Cameras Cut Recycling Contamination; The Daily Telegraph; Apr. 7, 2014; 2 pages.

Van Dongen, Matthew; Garbage 'Gotcha' Videos on Rise in City: Residents Irked Over Perceived Infractions; Nov. 18, 2015; 3 pages; The Spectator.

The Advertiser; Waste Service Drives Innovation; Jan. 25, 2016; 2 pages; Fairfax Media Publications Pty Limited; Australia.

RWP-wasteportal.com; Waste & Recycling Data Portal and Software; 16 pages; printed Oct. 3, 2019.

Bhargava, Hermant K. et al.; A Web-Based Decision Support System for Waste Disposal and Recycling; pp. 47-65; 1997; Comput. Environ. And Urban Systems, vol. 21, No. 1; Pergamon.

Kontokasta, Constantine E. et al.; Using Machine Learning and Small Area Estimation to Predict Building-Level Municipal Solid Waste Generation in Cities; pp. 151-162; 2018; Computer, Envieonment and Urban Systems; Elsevier.

Ferrer, Javier et al.; BIN-CT: Urban Waste Collection Based on Predicting the Container Fill Level; Apr. 23, 2019; 11 pages; Elsevier.

Vu, Hoang Lan et al.; Waste Management: Assessment of Waste Characteristics and Their Impact on GIS Vechicle collection Route Optimization Using ANN Waste Forecasts; Environmental Systems Engineering; Mar. 22, 2019; 13 pages; Elsevier.

Hina, Syeda Mahlaqa; Municipal Solid Waste Collection Route Optimization Using Geospatial Techniques: A Case Study of Two Metropolitan Cities of Pakistan; Feb. 2016; 205 pages; U.S.

Kannangara, Miyuru et al.; Waste Management: Modeling and Prediction of Regional Municipal Soid Waste Generation and Diversion in Canada Using Machine Learning Approaches; Nov. 30, 2017; 3 pages; Elsevier.

Tan, Kah Chun et al.; Smart Land: AI Waste Sorting System; University of Malaya; 2 pages; Keysight Techonogies.

Oliveira, Veronica et al.; Journal of Cleaner Production: Artificial Neural Network Modelling of the Amount of Separately-Collected Household Packaging Waste; Nov. 8, 2018; 9 pages; Elsevier.

Zade, Jalili Ghazi et al.; Prediction of Municipal Solid Waste Generation by Use of Artificial Neural Network: A Case Study of Mashhad; Winter 2008; 10 pages; Int. J. Environ. Res., 2(1).

\* cited by examiner

Typical Optical Sensor Placement

OBC and DVR Configuration

Chapter/Image Review Screen

FIG 6

Events to Review: Source Data

| Information | System | Pulled From |
|---|---|---|
| JPEG/Video: | Optical Sensor | Designated Camera Based on Use Case |
| Lat/Lon: | OBC/DVR/Other | OBC-GPS/DVR-GPS/Other Mapping |
| BU: | OBC | Pulled from User Routing |
| LOB: | OBC | Pulled from User Routing |
| Vehicle ID: | OBC/DVR | OBC/DVR |
| Audit Date: | System | Pulled from 3rd Eye DVIR |
| Customer Acc No.: | OBC | Pulled from User Routing |
| Customer Name: | OBC | Pulled from User Routing |
| Customer Address: | OBC | Pulled from User Routing |
| Service Level: | OBC | Pulled from User Routing |
| Sub-LOB: | OBC | Pulled from User Routing |
| Municipality/Open Market: | OBC | Pulled from User Routing |
| Route ID | OBC | Pulled from User Routing |
| Service Date | OBC/DVR | Pulled from OBC/DVR |
| Service Time: | OBC/DVR | Pulled from OBC/DVR |

FIG. 7
Commercial Use Cases-JPEG & Video (Images)

| Commercial LOB Use Cases-Truck (FEL/REL) | Event to Review "Name" in Drop Down | Image Type | Primary Camera | Description of Audit/Review |
|---|---|---|---|---|
| Commercial Overages | Overages JPEG | JPEG | Front | Overloaded containers |
| Commercial PDAs | PDA JPEG | JPEG | Front | Services without being WM Customer |
| Commercial Service Level Audits | Service Level JPEG | JPEG | Front | Ensuring Customer is being billed correctly |
| Commercial Open Lids | Open Lid JPEG | JPEG | Front | Auditing for open/closed FEL lids |
| Commercial Damaged Containers | Damaged Containers JPEG | JPEG | Front | Auditing for damaged FEL bins (Repaint/Relabel, Graffiti, Lids-Sleeves-Casters & Leaking Bottoms) |
| Commercial Franchise Requirements | Franchise Requirements | JPEG | Front | Auditing to ensure franchise requirements are met (Signage, stickers, notices, yardage, etc.) |
| Soiled Windshields/Inoperable Wipers/Camera | Windshield JPEG | JPEG | Front | Ensuring windshield is clean and cameras are operable |
| Commercial Customer Notifications | Customer Notification | JPEG | Front | Notifications for Customer issues (Overages, Open Lids, Enclosures, Etc.) |
| Commercial Driver Notifications | Driver Notifications | JPEG | Front | Notifications for Driver issues (Litter, Lids not Closed, Positioning, Etc.) |
| No Image | No 3rd Eye Image JPEG | JPEG/Video | All | Ensuring OBC, DVR & Optical Sensor are operating daily and in real-time |
| Service Confirmation (Driver Initiated) | Service Confirmation JPEG | JPEG | Front | Service Confirmations |
| HOC-Haul or Call (Driver Initiated) | HOC JPEG | JPEG | Front | Reviewing for locked, blocked, unacceptable, waste and unable to service |
| Commerical Contamination-Recycling & Organics | Contamination Video | Video | Hopper | Auditing for commercial recycling & organics contamination |
| Commercial Ancillary Fee Audits | Ancillary Fee Video | Video | Front | Auditing for ancillary fee activity & ensuring customer is being invoiced correctly |
| Commercial Poaching-Franchise Infringement | Poaching Video | Video | Front | Auditing for franchise infringement/poaching |
| Open Market Sales Opportunities | Sales Video | Video | Front | Determining Open Market Opportunities |
| Dangerous Stops/Hard to Service | Hard To Service Video | Video | Front | Reviewing Hard to Service & Dangerous Stops |
| Property Damage | PD Video | Video | Front | Reviewing for Claims of Property Damage |
| Commercial LOB Use Cases-Bin Delivery (CD) | Event To Review "Name" in Drop Down | Image Type | Primary Camera | Description of Audit |
| Bin Delivery-New Customer (Driver Initiated) | Bin Delivery-New Customer JPEG | JPEG | Front | Confirm Delivery, Lat/Lon & Geo-Code |
| Bin Activity-Existing Customer (Driver Initiated) | Bin Activity-Existing Customer JPEG | JPEG | Front | Confirm Swap, Repair, Upsize, Downsize, Add & Reduce |

FIG. 8

Residential Use Cases-JPEG & Video (Images)

| Residential LOB Use Cases-Truck (All Types) | Event To Review "Name" in Drop Down | Image Type | Primary Camera | Description of Audit/Review |
|---|---|---|---|---|
| Residential Overages | Overages JPEG | JPEG | Right Side | Overloaded containers |
| Residential PDAs | PDAs JPEG | JPEG | Right Side | Services without being WM Customer |
| Residential Service Level Audits | Service Level JPEG | JPEG | Right Side | Ensuring Customer is being billed correctly |
| Residential Open Lids | Open Lid JPEG | JPEG | Right Side | Auditing for open/closed FEL lids |
| Residential Damaged Containers | Damaged Containers JPEG | JPEG | Right Side | Auditing for damaged FEL bins (Graffiti, Lids, Wheels, Split-Body) |
| Residential Franchise Requirements | Franchise Requirement | JPEG | Right Side | Auditing to ensure franchise requirements are met (Signage, City designation, notices, etc.) |
| Soiled Windshields/Inoperable Wipers/Camera | Windshields JPEG | JPEG | Right Side | Ensuring windshield is clean and cameras are operable |
| Residential Customer Notifications | Customer Notification | JPEG | Right Side | Notifications for Customer Issues (Overages, Open Lids, Spacing, Container Direction, Blocked, Etc.) |
| Residential Driver Notifications | Driver Notifications | JPEG | Right Side | Notifications for Driver Issues (Litter, Tipped Containers, Misaligned Containers, Etc.) |
| No Image | No 3rd Eye Image JPEG | JPEG/Video | All | Ensuring OBC, DVR & Optical Sensor are operating daily and in real-time |
| Service Confirmation (Driver initiated) | Service Confirmation JPEG | JPEG | Right Side | Service Confirmations |
| NOT-OUTs (Driver initiated) | NOT-OUT JPEG | JPEG | Right Side | Confirming Container Was Not-Out at the time of service |
| Residential Contamination-SS Recycling & Organics | Contamination Video | Video | Hopper | Auditing for Residential SS Recycling & Organics contamination |
| Residential Ancillary Fee Audits | Ancillary Fee Video | Video | Right Side | Auditing for ancillary fee activity & ensuring customer is being invoiced correctly |
| Dangerous Stops/Hard to Service | Hard to Service Video | Video | Right Side | Reviewing Hard to Service & Dangerous Stops |
| Property Damage | PD Video | Video | Right Side | Reviewing for Claims of Property Damage |
| Residential LOB Use Cases-Container Delivery (CD) | Event To Review "Name" in Drop Down | Image Type | Primary Camera | Description of Audit |
| Container Activity-Existing Customer (Driver Initiated) | CD Activity-Existing Customer JPEG | JPEG | Front | Confirm Swap, Repair, Upsize, Downsize, Add & Reduce |
| Residential Use LOB Cases-Bulky Collections (Flatbed & Rear loader) | Event To Review "Name" in Drop Down | Image Type | Primary Camera | Description of Audit |
| Residential Bulky Collection-Flat Bed | Bulky Collection-Flat Bed JPEG | JPEG | Rear | Documenting Bulky Collection |
| Residential Bulky Collection-Rear Loader | Bulky Collection-Rear Loader JPEG | JPEG | Rear | Documenting Bulky Collection |

FIG 9

Industrial (Roll-Off) Use Cases-JPEG & Video (Images)

| Industrial LOBs Use Cases-Truck (All Types) | Event To Review "Name" in Drop Down | Image Type | Primary Camera | Description of Audit/Review |
|---|---|---|---|---|
| Industrial Overages | Overages JPEG | JPEG | Rear | Overloaded containers |
| Industrial PDAs | PDA JPEG | JPEG | Rear | Services without being WM Customer |
| Industrial Service Level Audits | Service Level JPEG | JPEG | Rear | Ensuring Customer is being billed correctly |
| Industrial Damaged Containers | Damaged Container JPEG | JPEG | Rear | Auditing for damaged roll-off container |
| Industrial Franchise Requirements | Franchise Requirement | JPEG | Rear | Auditing to ensure franchise requirements are met (Signage, City designation, notices, etc.) |
| Soiled Windshields/Inoperable Wipers/Camera Position | Windshields JPEG | JPEG | Rear | Ensuring windshield is clean and cameras are operable |
| Industrial Customer Notifications | Customer Notification | JPEG | Rear | Notifications for Customer Issues (Overages, Blocked, Compactor Issues, Etc.) |
| Industrial Driver Notifications | Driver Notifications | JPEG | Rear | Notifications for Driver Issues (Litter, Container Positioning, Etc.) |
| No Image | No Image JPEG/Video | JPEG/Video | All | Ensuring OBC, DVR and Optical Sensor are operating daily and in real-time |
| Service Confirmation-Delivery, Swap & Removal (Driver Initiated) | Service Confirmation JPEG | JPEG | Rear | Service Confirmations |
| Industrial HOC (Driver Initiated) | HOC JPEG | JPEG | Rear | Documenting reason for inability to service roll-off bin |
| Industrial Ancillary Fee Audits | Ancillary Fee Video | Video | Rear | Auditing for ancillary fee activity & ensuring customer is being invoiced correctly |
| Dangerous Stops/Hard to Service | Hard to Service Video | Video | Hopper | Reviewing Hard to Service & Dangerous Stops |
| Property Damage | PD Video | Video | Rear | Reviewing for Claims of Property Damage |

FIG. 10
Use Case: Commercial Overloaded Containers
Picture A
Picture B FIG. 11
Use Case: Commercial Open Lid
Picture B
Picture A Use Case: Commercial PDA Audit FIG. 13
Use Case: Commercial Service Level Audit
Picture A
Picture B
Service Paid For
Designate Actual Service Use Case: Damaged Containers Use Case: Commercial Franchise Requirements Use Case: Proactive Commercial Customer Notifications Use Case: Proactive Commercial Driver/Ops Notifications

FIG. 18
Use Case: Commercial Contamination of Recycling and Organics
Video A
Hopper Camera Video
Picture B
Front Camera Still Image
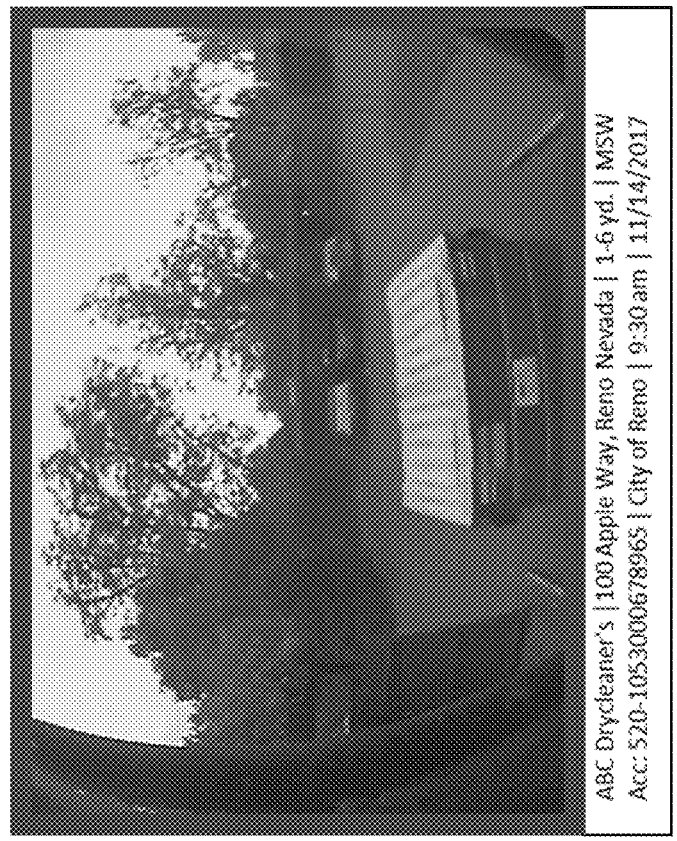
16 Seconds of Video from the Hopper Camera to View Contamination
Image of the Container from the front Camera prior to dumping container

FIG. 19
Use Case: Commercial Open-Market Sales Opportunity
Picture A
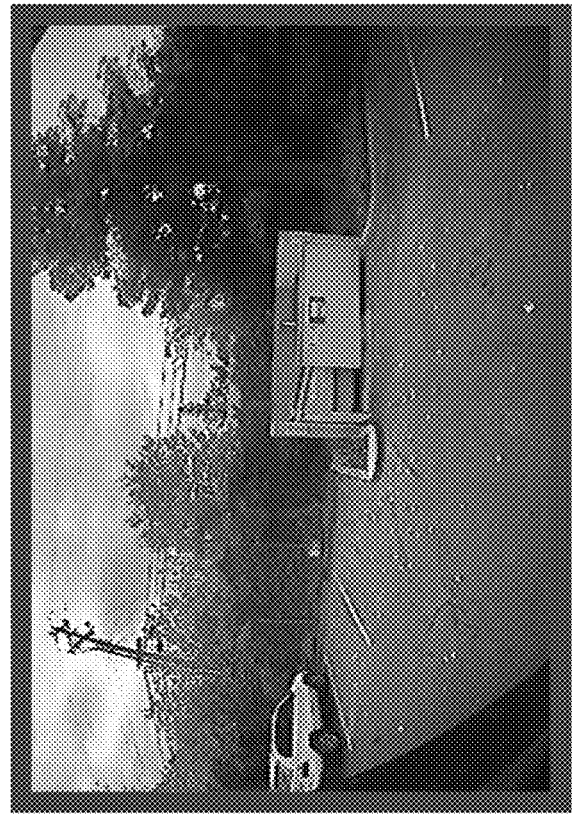
Front Camera Video
30-60 Seconds of Video from the Front Camera Capturing Competitor Activity

FIG. 20
Use Case: Commercial Franchise Infringement (Poaching)
Picture A
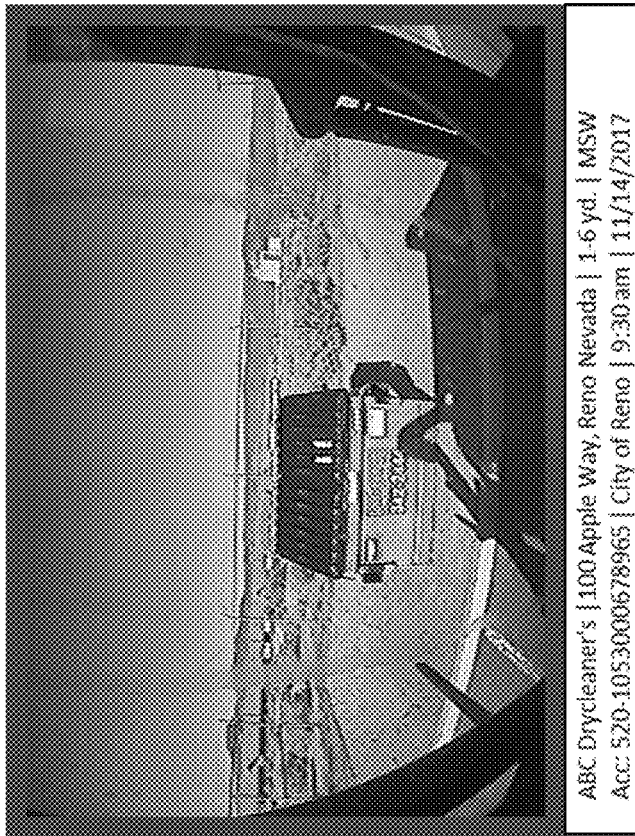
Front Camera Video
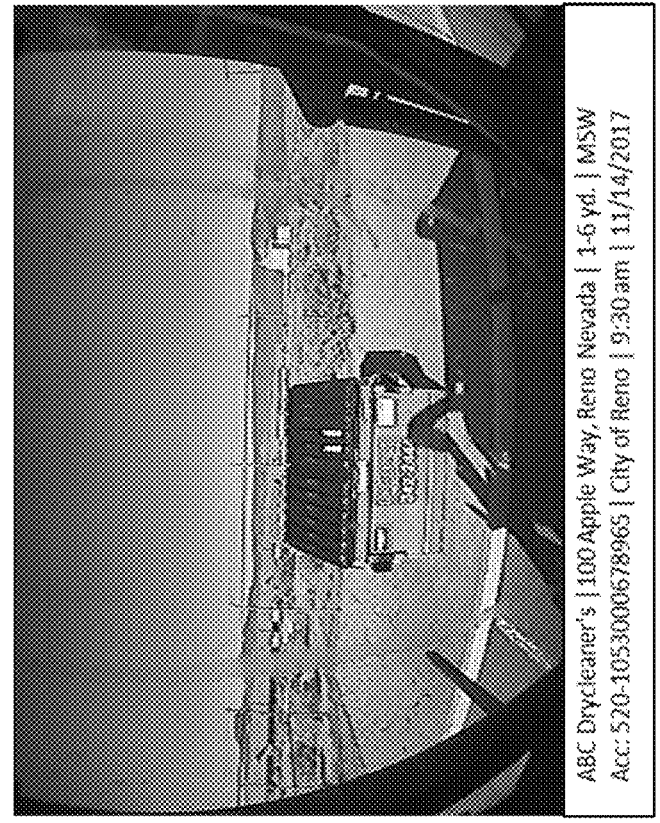
30-60 Seconds of Video from the Front Camera

FIG. 21
Use Case: Commercial Ancillary Fees Audit
Video A  
Front Camera Video
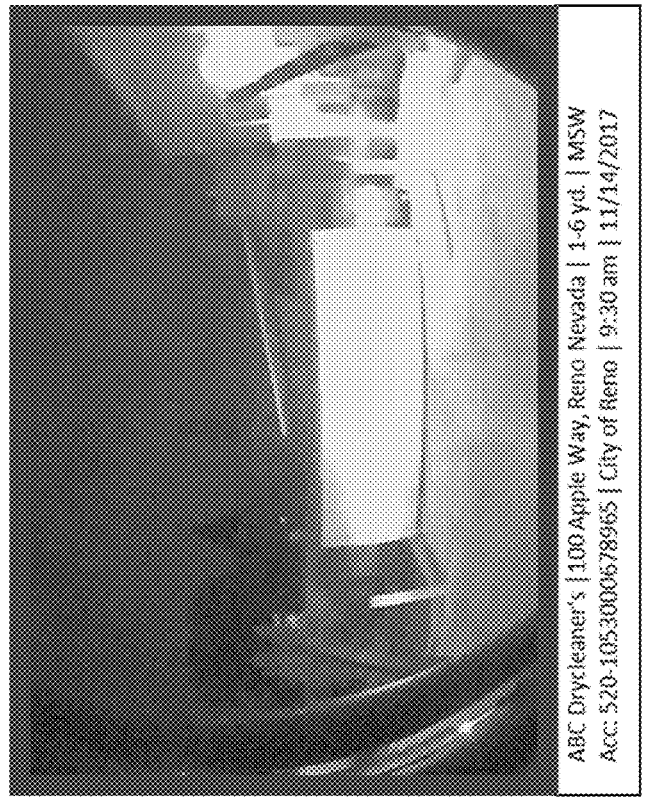
Picture B  
Front Camera JPEG
30-60 Seconds of Video from the Front Camera to View and Note Ancillary Fees and Compare to OPUS
Image of the Container from the front Camera prior to dumping container

Use Case: Commercial Dangerous Stops 30-60 Seconds of Video from the Right Side Camera and Optional 8 Cameras.

Video A

Right Side Camera Video

Use Case: Commercial Property Damage

Video A

Right Side Camera Video 30-60 Seconds of Video from the Right Side Camera and Optional 8 Cameras.

Use Case: HOC-Haul or Call (Container Unserviceable)

Picture A

Use Case: Commercial Service Confirmation-Driver Initiated

Picture A

Driver Manually Pushed a Button on the DVIR.

Use Case: Commercial Bin Delivery-New Customer

Picture A
Front Camera JPEG

Use Case: Commercial Bin Delivery-Existing Customer

Picture A

From Camera JPEG

Clark Gable | 100 Champion Way, Lodi California | | 1-96 gal MSW | 1-64 gal GW | 1-64 gal REC | Acc: 209-1055550676785 | City of Lodi | 9:15 am | 11/15/2017

FIG. 28
Use Case: Residential Overloaded Containers
Picture A
Picture B
Selected if Overloaded results a "Red" Box Use Case: Residential PDA Audit Picture A No customer information in OPUS results in an exception report being created as a suspect account for Billing to review.

Blank

FIG. 30
Use Case: Residential Service Level Audit
Picture A
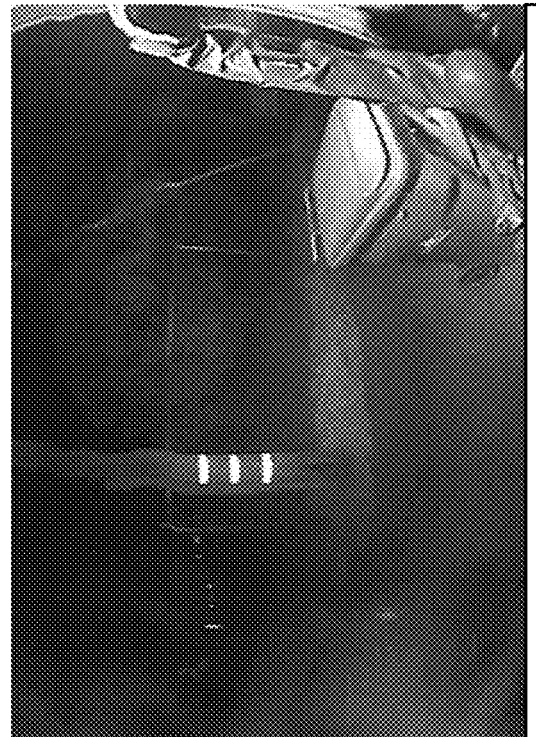
Picture B
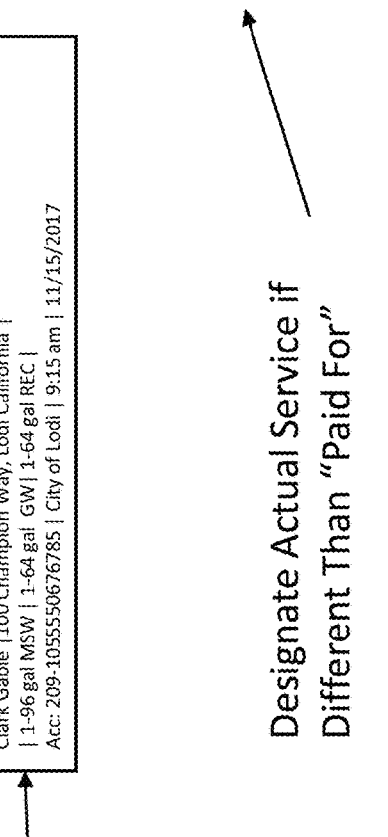
Designate Actual Service if
Different Than "Paid For"
Service Paid For From OPUS

FIG. 31
Use Case: Residential Open Lids
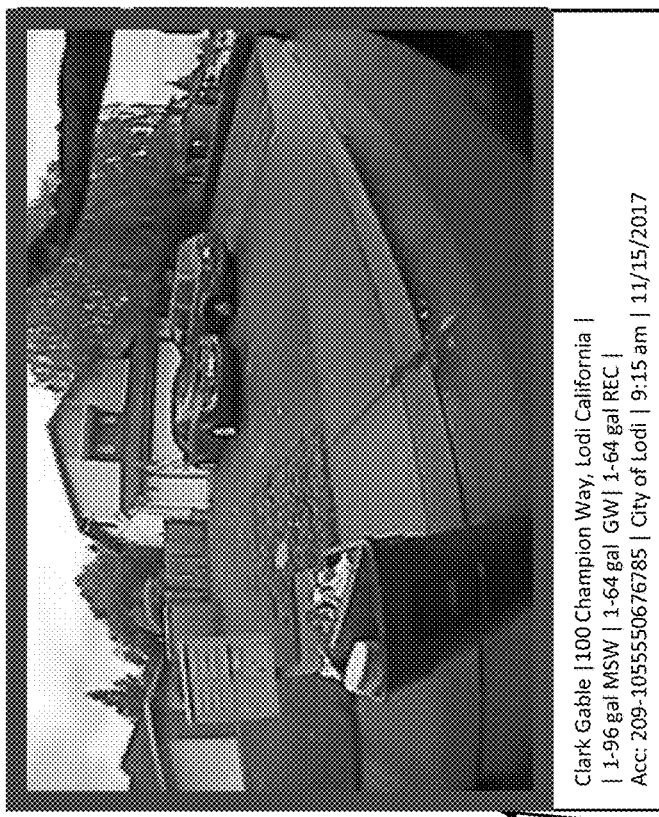
Picture B
Picture A
Selected if Open Lid results a "Red" Box

FIG. 32
Use Case: Residential Damaged Container
Picture A
Picture B
Designate Issue with Cart (Missing Lid), Send Report to Operations.

FIG. 33
Use Case: Residential Franchise Requirements
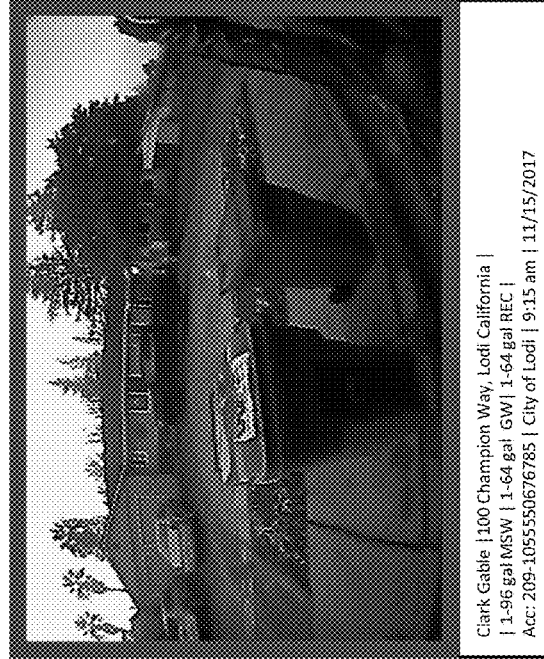
Picture B
Picture A

FIG. 34
Use Case: Residential Extra Bags-Extra Service
Picture A
Picture B
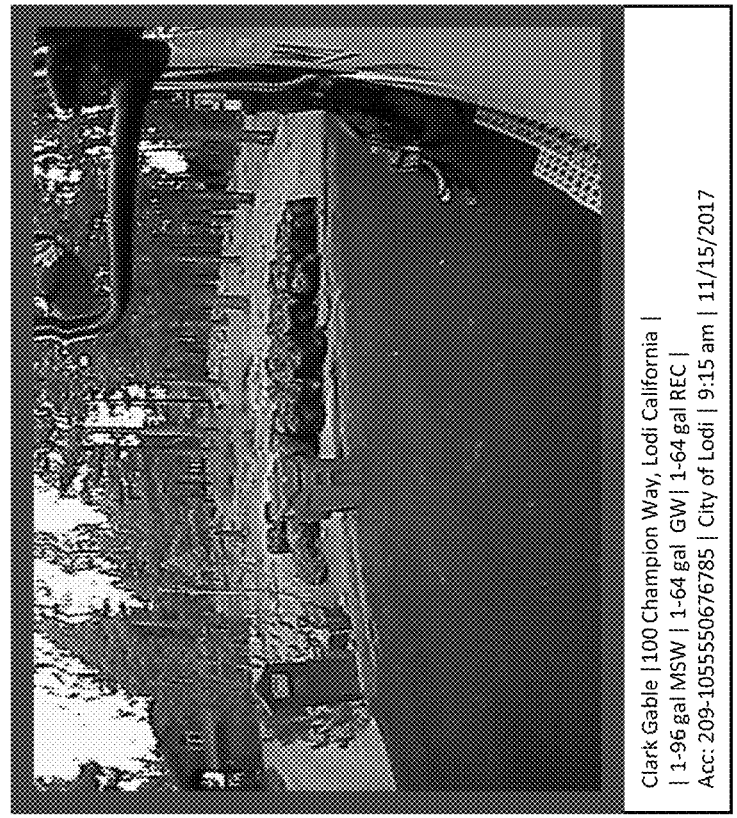
Eliminate Tagging Requirements and the Need to Send Customers' Coupons.

Residential Proactive Customer Notifications (Mailer, Email or Text)

Residential Proactive Driver/Ops Notifications

Residential Service Confirmation (Driver Initiated)

Picture A

Residential NOT-OUT (Driver Initiated)

Picture A

Residential Container Delivery-New Customer

Picture A

Residential Container Delivery-Existing Customer

Residential Bulky Collection (Flatbeds & Rear Loaders)

Picture A

Residential Contamination (SS & Organics)

Video A

Event to Review

Residential Ancillary Fees

FIG. 44
Residential Dangerous Stops
Video A
Video B
30-60 Seconds of Video from the Right Side Camera and Optional 8 Cameras

FIG. 45
Residential Property Damage
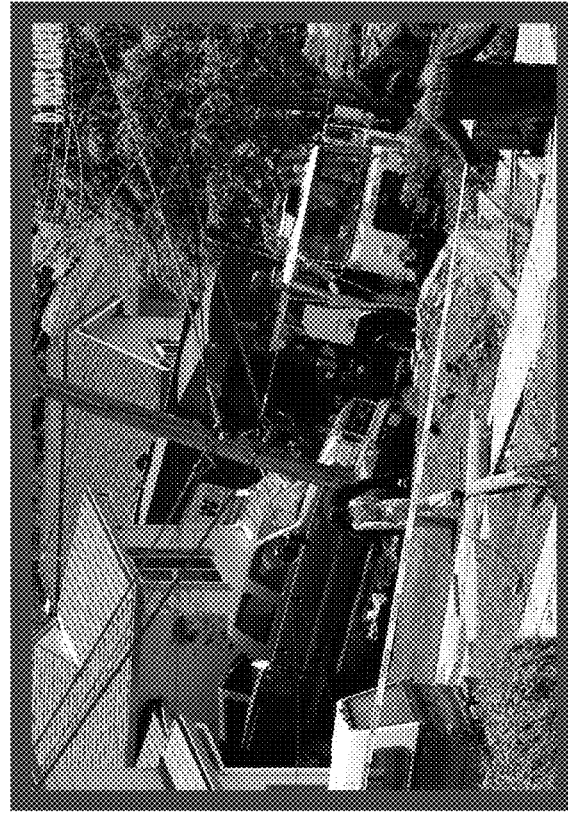
Video A
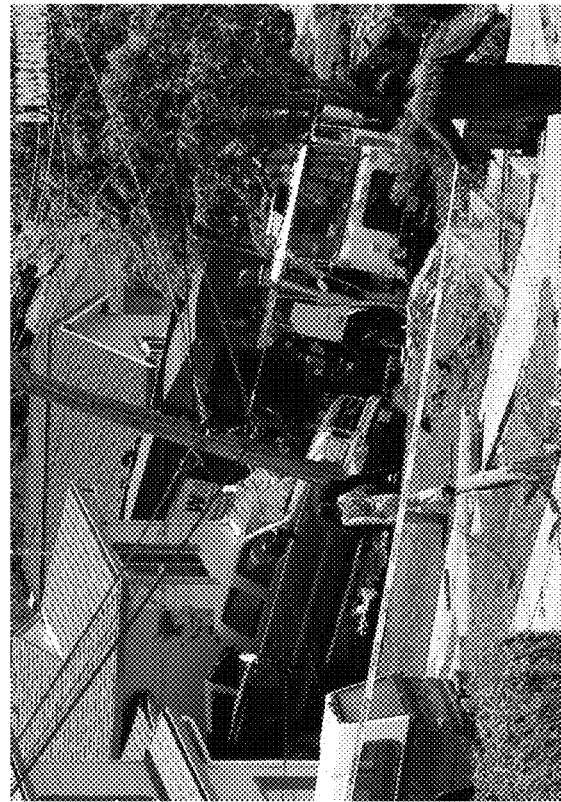
Video B
30- 60 Seconds of Video from the Right Side Camera and Optional 8 Cameras FIG. 46
Waste Service Fleet Soiled Windshields, Inoperable Wipers/Cameras
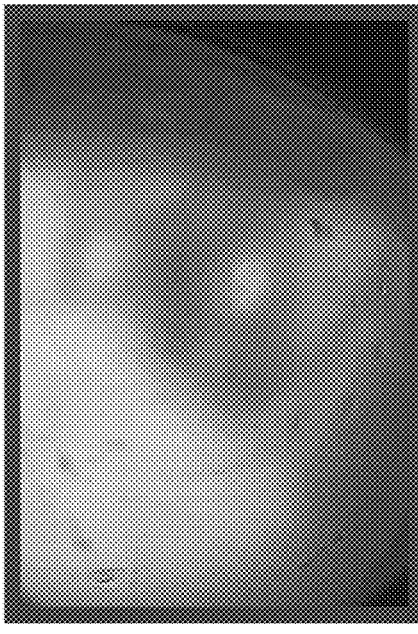
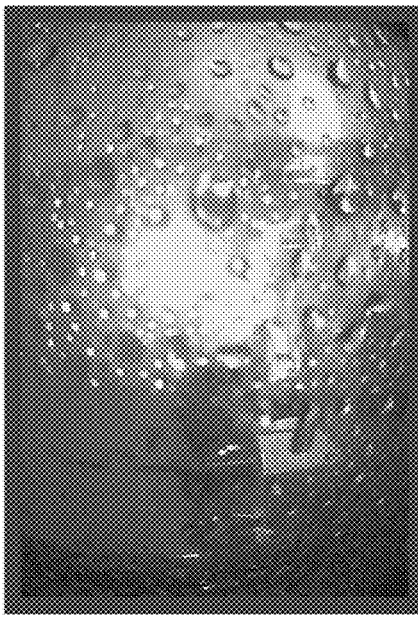

Fig. 47
No Image-Health Assessment and Real-Time Monitoring of Cameras
Events to Review

| Image | Image | Image | Image | Image | Image |
|---|---|---|---|---|---|
| Missing Picture | Missing Picture | Missing Picture | Missing Picture | Missing Picture | Missing Picture |
| Missing Picture | Missing Picture | Missing Picture | Missing Picture | Missing Picture | Missing Picture |
| Missing Picture | Missing Picture | Missing Picture | Missing Picture | Missing Picture | Missing Picture |
| Missing Picture | Missing Picture | Missing Picture | Missing Picture | Missing Picture | Missing Picture |
| Missing Picture | Missing Picture | Missing Picture | Missing Picture | Missing Picture | Missing Picture |
| Missing Picture | | | | | |

Events To Review Process

FIG. 49
Generic Advanced Reports For Certain Use-Cases (All LOBs)

| Explanation | | URL | Event ID | Business Unit or Site Name | Site Name | Use Case from Drop-Down | Use Case | Customer ID | Customer No. | Customer Name | Customer-Name | Customer Service Address | Service-Add | Vehicle ID | Vehicle ID | Route ID | Route ID | Company Code: Municipal Name | Company Code | Line of Business | LOB | Sub-LOB | Sub-LOB | Latitude | Latitude | Longitude | Longitude | Event Date and Time Stamp in current time zone | Event Date | Date Reviewed | Review Date | Reviewer | End User |
|---|---|---|---|---|---|---|---|---|---|---|---|---|---|---|---|---|---|---|---|---|---|---|---|---|---|---|---|---|---|---|---|---|---|
| Report Handling | | | | | | | | | | | | | | | | | | | | | | | | | | | | | | | | | |
| Information | | | 3824944492 | Reno Hauling | | Overage JPEG | | 502-xxxxxxxxx | | ABC Drycleaners | | 123 Main st. | | FL212149 | | R175 | | Reno | | Com | | MSW | | 39.52716185 | | 119.70117956 | | 10/2/17 12:23 PM | | 10/18/17 3:17 PM | | Barry Skolnick |

Use Generic Advanced Reporter

Overage (Com, Res, Ind)
PDAs (Com, Res, Ind)
Open Lids (Com, Res)
Windshields (Com, Res, Ind)
No Image (Com, Res, Ind)
Service Confirmation (Com, Res, Ind)
Contamination (Com, Res, Ind)
Franchise Infringement (Com, Res, Ind)
Open Market Sales (Com, Res, Ind)
Hard to Service (Com, Res, Ind)
PD (Com, Res, Ind)
Bin Delivery-New Customer (Com)
Bin Activity-Existing Customer (Com)
Container Delivery-New Customer (Res)
Container Delivery-Existing Customer (Res)
Residential Bulky-Flat Bed (Res)
Residential Bulky-Rear Loader (Res)

FIG. 50
Commercial Advanced Reports

Commercial Service Level Audit

| | Explanation | URL | Business Unit or Site Name | Use Case From Drop Down | Sub-Items from Drop Down within Use Case | Customer ID | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|---|
| Report Heading | Event ID | URL | Site Name | Use Case | Actual | Actual Size | Customer No. | Customer Name | Service-Add. Address | Vehicle ID | Route ID | Company Code | LOB | Sub-LOB | Latitude | Longitude | Event Date | Review Date | Reviewer |
| Information | 38249492 | | Reno Hauling | Service Level Audit | 1 | 1yd | 502-xxxxxxxxx | ABC Drycleaners | Service | FL212149 | R175 | Reno | Com | MSW | 39.5273619 | -119.7017956 | 10/2/17 12:23 PM | 10/18/17 3:17 PM | Barry Skolnick |
| | | | | | 2 | 1.5yd | | | | | | | | | | | | | |
| | | | | | 3 | 2yd | | | | | | | | | | | | | |
| | | | | | 4 | 3yd | | | | | | | | | | | | | |
| | | | | | 5 | 4yd | | | | | | | | | | | | | |
| | | | | | 6 | 5yd | | | | | | | | | | | | | |
| | | | | | 7 | 6yd | | | | | | | | | | | | | |
| | | | | | 8 | 7yd | | | | | | | | | | | | | |
| | | | | | 9 | 8yd | | | | | | | | | | | | | |

Commercial Damaged Container

| | Explanation | URL | Business Unit or Site Name | Use Case From Drop Down | Sub-Item from Drop Down within Use Case | Customer ID | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|---|
| Report Heading | Event ID | URL | Site Name | Use Case | Damage | Sub Item from Drop Down within Use Case | Customer No. | Customer Name | Service-Add. Address | Vehicle ID | Route ID | Company Code | Line of Business | Sub-LOB | Latitude | Longitude | Event Date | Review Date | Reviewer |
| Information | 38249492 | | Reno Hauling | Service Level Audit | Damaged Container | Repaint/Relabel | 502-xxxxxxxxx | ABC Drycleaners | 123 Main St. | FL212149 | R175 | Reno | Com | MSW | 39.527361 85 | -119.7017956 | 10/2/17 12:23 PM | 10/18/17 3:17 PM | Barry Skolnick |
| | | | | | | Graffiti | | | | | | | | | | | | | |
| | | | | | | Lid | | | | | | | | | | | | | |
| | | | | | | Sleeve | | | | | | | | | | | | | |
| | | | | | | Leaking Bottom | | | | | | | | | | | | | |
| | | | | | | Caster | | | | | | | | | | | | | |
| | | | | | | xxx | | | | | | | | | | | | | |

FIG. 50
Commercial Advanced Reports (Continued)

Commercial Franchise Requirement

| | Explanation | URL | Business Unit or Site Name | Use Case from Drop-Down | Sub Item from Drop Down within Use Case | Customer ID | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|---|
| Report Handling | | | Site Name | Use Case | | Customer No. | Customer Name | Service-Add | Vehicle ID | Route ID | Company Code | LOB | Sub-LOB | Latitude | Longitude | Event Date | Review Date | Reviewer |
| Information | | Event ID 382494492 | Reno Hauling | Franchise Requirement | Deficiency<br>Signage<br>Stickers<br>Motion<br>Yardage<br>xxx | S02-xxxxxxxxxx | ABC Drycleaners | 123 Main St. | FL212149 | R175 | Reno | Com | MSW | 39.5273619 | -119.7017956 | 10/2/17 12:23 PM | 10/18/17 3:17 PM | Barry Skolnick |

Commercial Customer Notification

| | Explanation | URL | Business Unit or Site Name | Use Case from Drop-Down | Sub Item from Drop Down within Use Case | Customer ID | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|---|
| Report Handling | | | Site Name | Use Case | Customer Issues | Customer No. | Customer Name | Service Add | Vehicle ID | Route ID | Company Code | LOB | Sub-LOB | Latitude | Longitude | Event Date | Review Date | Reviewer |
| Information | | Event ID 382494492 | Reno Hauling | Customer Notification | Notice<br>Overage<br>Open Lid<br>Blocked<br>Spacing<br>xxx | S02-xxxxxxxxxx | ABC Drycleaners | 123 Main St. | FL212149 | R175 | Reno | Com | MSW | 39.5273619 | -119.7017956 | 10/2/17 12:23 PM | 10/18/17 3:17 PM | Barry Skolnick |

FIG. 51
Commercial Advanced Reports-Continued

Commercial Driver Notification

| | | | | | | | | | | | | | | | |
|---|---|---|---|---|---|---|---|---|---|---|---|---|---|---|---|
| Explanation: | URL | Business Unit or Site Name | Use Case from Drop-Down | Sub Item from Drop Down within Use Case | Customer ID. | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
| Report Heading | Event ID | Site Name | Use Case | Driver Issues | Customer No. | Customer Name | Service-Add | Vehicle ID | Route ID | Company Code | LOB | Sub-LOB | Latitude | Longitude | Event Date | Review Date | Reviewer |
| Information: | 3824943492 | Reno Hauling | Driver Notification | Notification | 502-xxxxxxxxx | ABC Drycleaners | 123 Main St. | FL212149 | R175 | Reno | Com | MSW | 39.5273619 | 119.7017956 | 10/2/17 12:23 PM | 10/18/17 3:17 PM | Barry Skolnick |
| | | | | Litter | | | | | | | | | | | | | |
| | | | | Close Lid | | | | | | | | | | | | | |
| | | | | Container Position | | | | | | | | | | | | | |
| | | | | Close Enclosure | | | | | | | | | | | | | |
| | | | | xxx | | | | | | | | | | | | | |

Commercial HOC

| | | | | | | | | | | | | | | | |
|---|---|---|---|---|---|---|---|---|---|---|---|---|---|---|---|
| Explanation: | URL | Business Unit or Site Name | Use Case from Drop-Down | Sub Item from Drop Down within Use Case | Customer ID. | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
| Report Heading | Event ID | Site Name | Use Case | Customer Issues | Customer No. | Customer Name | Service-Add | Vehicle ID | Route ID | Company Code | LOB | Sub-LOB | Latitude | Longitude | Event Date | Review Date | Reviewer |
| Information: | 3824943492 | Reno Hauling | HOC | HOC | 502-xxxxxxxxx | ABC Drycleaners | 123 Main St. | FL212149 | R175 | Reno | Com | MSW | 39.5273618 | 119.7017956 | 10/2/17 12:23 PM | 10/18/17 3:17 PM | Barry Skolnick |
| | | | | Blocked | | | | | | | | | | | | | |
| | | | | Locked | | | | | | | | | | | | | |
| | | | | Contamination | | | | | | | | | | | | | |
| | | | | Unserviceable | | | | | | | | | | | | | |
| | | | | xxx | | | | | | | | | | | | | |

FIG. 51
Commercial Advanced Reports-Continued (Continued)

Commercial Ancillary Fees

| | Explanation | | | | | | | | | | | | | | | | | | |
|---|---|---|---|---|---|---|---|---|---|---|---|---|---|---|---|---|---|---|---|
| | URL | Business Unit or Site Name | Use Case from Drop-Down | Sub Item from Drop Down within Use Case | Customer ID | Customer Name | Customer Service Address | Vehicle ID | Route ID | Company Code-Municipal Name | Line of Business | Sub-LOB | Latitude | Longitude | Event Date and Time Stamp in current time zone | | Date Reviewed | | End User |
| Report Heading | Event ID | Site Name | Use Case | Ancillary Audits | Customer No. | Customer Name | Service Add. | Vehicle ID | Route ID | Company Code | LOB | Sub-LOB | Latitude | Longitude | Event Date | | Review Date | | Reviewer |
| Information: | 382494492 | Reno Hauling | Ancillary Fees | Uncharged Fees<br>Push Put<br>Enclosures<br>Locks<br>xxx | S02-xxxxxxxx | ABC Drycleaners | 123 Main St. | FL1212149 | R175 | Reno | Com | MSW | 39.5273618 5 | 119.7017956 | 10/2/17 12:23 PM | | 10/18/17 3:17 PM | | Barry Skolnick |

FIG. 52
Residential Advanced Reports

Residential Service Level Audit

| | URL | Business Unit or Site Name | Use Case from Drop-Down | Sub Item from Drop Down within Use Case | | Customer ID. | Customer Name | Customer Service Address | Service-Add | Vehicle ID | Route ID | Company Code-Municipal Name | Line of Business | Sub-LOB | Latitude | Longitude | Event Date and Time Stamp in current time zone | Date Reviewed |
|---|---|---|---|---|---|---|---|---|---|---|---|---|---|---|---|---|---|---|
| Explanation | URL | Business Unit or Site Name | Use Case from Drop-Down | Sub Item from Drop Down within Use Case | | Customer ID. | Customer Name | Customer Service Address | Service-Add | Vehicle ID | Route ID | Company Code-Municipal Name | Line of Business | Sub-LOB | Latitude | Longitude | Event Date and Time Stamp in current time zone | Date Reviewed |
| Report Heading | Event ID | Site Name | Use Case | Actual | Actual Size | Customer No. | Customer Name | Service-Add | | Vehicle ID | Route ID | Company Code | LOB | Sub-LOB | Latitude | Longitude | Event Date | Review Date | Reviewer |
| Information | 382484492 | Reno Hauling | Service Level Audit | Actual Number 1<br>2<br>3<br>4<br>5<br>6<br>7<br>8<br>9 | 20 gal<br>37 gal<br>64 gal<br>96 gal | 502-xxxxxxxx | John Doe | 100 Apple Way | | ASL101560 | R175 | Reno | Res | MSW | 39.52773618 5 | -119.7017956 | 10/2/2017 12:23:00 PM | 10/18/2017 3:17:00 PM | Barry Skolnick |

Residential Damaged Container

| | URL | Business Unit or Site Name | Use Case from Drop-Down | Sub Item from Drop Down within Use Case | Customer ID. | Customer Name | Customer Service Address | Service-Add | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|---|
| Explanation | URL | Business Unit or Site Name | Use Case from Drop-Down | Sub Item from Drop Down within Use Case | Customer ID. | Customer Name | Customer Service Address | Service-Add | Vehicle ID | Route ID | Company Code-Municipal Name | Line of Business | Sub-LOB | Latitude | Longitude | Event Date and Time Stamp in current time zone | Date Reviewed | End User |
| Report Heading | Event ID | Site Name | Use Case | Damage | Customer No. | Customer Name | Service-Add | | Vehicle ID | Route ID | Company Code | LOB | Sub-LOB | Latitude | Longitude | Event Date | Review Date | Reviewer |
| Information | 382484492 | Reno Hauling | Service Level Audit | Damaged Container<br>Split Body<br>Graffiti<br>Lid<br>Wheels<br>xxx | 502-xxxxxxxx | John Doe | 100 Apple Way | | ASL101560 | R175 | Reno | Res | MSW | 39.52773618 5 | -119.7017956 | 10/2/17 12:23 PM | 10/18/2017 3:17:00 PM | Barry Skolnick |

FIG. 52
Residential Advanced Reports (Continued)

Residential Franchise Requirement

| | | | | | | | | | | | | | | | | |
|---|---|---|---|---|---|---|---|---|---|---|---|---|---|---|---|---|
| Explanation | URL | Business Unit or Site Name | Use Case from Drop-Down | Sub Item from Drop Down within Use Case | Customer ID | Customer Name | Customer Service Address | Vehicle ID | Route ID | Company Code- Municipal Name | Line of Business | Sub-LOB | Latitude | Longitude | Event Date and Time Stamp in current time zone | Date Reviewed | End User |
| Report Heading | Event ID | Site Name | Use Case | Franchise | Customer No. | Customer Name | Service Add: | Vehicle ID | Route ID | Company Code | LOB | Sub-LOB | Latitude | Longitude | Event Date | Review Date | Reviewer |
| Information | 3824944492 | Reno Hauling | Franchise Requirement | Deficiency | 502-xxxxxxxx | John Doe | 100 Apple Way | ASL101560 | R175 | Reno | Res | MSW | 39.52736185 | -119.70179566 | 10/2/17 12:23 PM | 10/18/2017 3:17:00 PM | Barry Skolnick |
| | | | | Signage Stickers Franchise Name xxx | | | | | | | | | | | | | |

Residential Customer Notification

| | | | | | | | | | | | | | | | | |
|---|---|---|---|---|---|---|---|---|---|---|---|---|---|---|---|---|
| Explanation | URL | Business Unit or Site Name | Use Case from Drop-Down | Sub Item from Drop Down within Use Case | Customer ID | Customer Name | Customer Service Address | Vehicle ID | Route ID | Company Code- Municipal Name | Line of Business | Sub-LOB | Latitude | Longitude | Event Date and Time Stamp in current time zone | Date Reviewed | End User |
| Report Heading | Event ID | Site Name | Use Case | Customer Issues | Customer No. | Customer Name | Service Add: | Vehicle ID | Route ID | Company Code | LOB | Sub-LOB | Latitude | Longitude | Event Date | Review Date | Reviewer |
| Information | 3824944492 | Reno Hauling | Customer Notification | Noticed | 502-xxxxxxxx | John Doe | 100 Apple Way | ASL101560 | R175 | Reno | Res | MSW | 39.52736185 | -119.70179566 | 10/2/17 12:23 PM | 10/18/2017 3:17:00 PM | Barry Skolnick |
| | | | | Overage Open Lid Street Parking/Blocked Spacing Container Direction xxx | | | | | | | | | | | | | |

FIG. 53

Residential Advanced Reports-Continued

Residential Driver Notification

| | URL | Business Unit or Site Name | Use Case from Drop-Down | Sub Item from Drop Down within Use Case | | | | | | | | | | | | |
|---|---|---|---|---|---|---|---|---|---|---|---|---|---|---|---|---|
| Explanation | | | | | | | | | | | | | | | | |
| Report Heading | Event ID | Site Name | Use Case | Driver Issues | Customer ID | Customer Name | Service-Add Customer Service Address | Vehicle ID | Route ID | Company Code-Municipal Name Company Code | Line of Business | Sub-LOB | Latitude | Longitude | Event Date and Time Stamp in current time zone Event Date | Date Reviewed Review Date | End User Reviewer |
| Information | 382494492 | Reno Hauling | Driver Notification | Notification | 502-xxxxxxxx | John Doe | 100 Apple Way | ASL101560 | R175 | Reno | Res | MSW | 39.5273618 5 | 119.7017956 | 10/2/17 12:23 PM | 10/18/2017 3:17:00 PM | Barry Skolnick |
| | | | | Litter | | | | | | | | | | | | |
| | | | | Close Lid | | | | | | | | | | | | |
| | | | | Upright Container | | | | | | | | | | | | |
| | | | | Return to Curb | | | | | | | | | | | | |
| | | | | xxx | | | | | | | | | | | | |

Residential HOC

| | URL | Business Unit or Site Name | Use Case from Drop-Down | Sub Item from Drop Down within Use Case | | | | | | | | | | | | |
|---|---|---|---|---|---|---|---|---|---|---|---|---|---|---|---|---|
| Explanation | | | | | | | | | | | | | | | | |
| Report Heading | Event ID | Site Name | Use Case | Customer Issues | Customer ID | Customer Name | Service-Add Customer Service Address | Vehicle ID | Route ID | Company Code-Municipal Name Company Code | Line of Business | Sub-LOB | Latitude | Longitude | Event Date and Time Stamp in current time zone Event Date | Date Reviewed Review Date | End User Reviewer |
| Information | 382494492 | Reno Hauling | HOC | HOC | 502-xxxxxxxx | John Doe | 100 Apple Way | ASL101560 | R175 | Reno | Res | MSW | 39.5273618 5 | 119.7017956 | 10/2/17 12:23 PM | 10/18/2017 3:17:00 PM | Barry Skolnick |
| | | | | Blocked | | | | | | | | | | | | |
| | | | | Locked | | | | | | | | | | | | |
| | | | | Contamination | | | | | | | | | | | | |
| | | | | Unserviceable | | | | | | | | | | | | |
| | | | | Xxx | | | | | | | | | | | | |

Residential Ancillary Fees

| | URL | Business Unit or Site Name | Use Case from Drop-Down | Sub Item from Drop Down within Use Case | | | | | | | | | | | | |
|---|---|---|---|---|---|---|---|---|---|---|---|---|---|---|---|---|
| Explanation | | | | | | | | | | | | | | | | |
| Report Heading | Event ID | Site Name | Use Case | Ancillary Audits | Customer ID | Customer Name | Service-Add Customer Service Address | Vehicle ID | Route ID | Company Code-Municipal Name Company Code | Line of Business | Sub-LOB | Latitude | Longitude | Event Date and Time Stamp in current time zone Event Date | Date Reviewed Review Date | End User Reviewer |
| Information | 382494492 | Reno Hauling | Ancillary Fees | Uncharged Fees | 502-xxxxxxxx | John Doe | 100 Apple Way | ASL101560 | R175 | Reno | Res | MSW | 39.5273618 5 | 119.7017956 | 10/2/17 12:23 PM | 10/18/2017 3:17:00 PM | Barry Skolnick |
| | | | | Backyard | | | | | | | | | | | | |
| | | | | Push-Pull | | | | | | | | | | | | |
| | | | | Multiple Containers | | | | | | | | | | | | |
| | | | | xxx | | | | | | | | | | | | |

FIG. 54
Industrial Advanced Reports

Industrial Service Level Audit

| Explanation | URL | Business Unit or Site Name | Use Case from Drop-Down | Sub Item from Drop Down within Use Case | Customer ID. | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|
| Report Heading | | Site Name | Use Case | Ancillary Audits | Customer No. | Customer Name | Service-Add | Vehicle ID | Route ID | Company Code | LOB | Sub-LOB | Latitude | Longitude | Event Date | Review Date | Reviewer |
| Information | 3824944492 | Reno Hauling | Service Level Audit | Actual Number | 502-xxxxxxxxx | Tahoe Construction | 400 Stratton Way | ASL101560 | 404150 | Reno | Ind | MSW | 39.5273618 | 119.7017956 | 10/2/17 12:23 PM | 10/18/2017 3:17:00 PM | Barry Skolnick |

| 1 | 10 yd |
| 2 | 14 yd |
| 3 | 20 yd |
| 4 | 30 yd |
| 5 | 40 yd |
| 6 | |
| 7 | |
| 8 | |
| 9 | |

Industrial Damaged Container

| Explanation | URL | Business Unit or Site Name | Use Case from Drop-Down | Sub Item from Drop Down within Use Case | Customer ID. | Customer Name | Customer Service Address | Vehicle ID | Route ID | Company Code-Municipal Name | Line of Business | Sub-LOB | Latitude | Longitude | Event Date and Time Stamp in current time zone | Date Reviewed | End User |
|---|---|---|---|---|---|---|---|---|---|---|---|---|---|---|---|---|---|
| Report Heading | | Site Name | Use Case | Damage | Customer No. | Customer Name | Service-Add | Vehicle ID | Route ID | Company Code | LOB | Sub-LOB | Latitude | Longitude | Event Date | Review Date | Reviewer |
| Information | 3824944492 | Reno Hauling | Service Level Audit | Damaged Container | 502-xxxxxxxxx | Tahoe Construction | 400 Stratton Way | ASL101560 | 404150 | Reno | Ind | MSW | 39.5273618 | 119.7017956 | 10/2/17 12:23 PM | 10/18/2017 3:17:00 PM | Barry Skolnick |

| Split Body |
| Graffiti |
| Lid |
| Wheels |
| xxx |

FIG. 54
Industrial Advanced Reports (Continued)

Industrial Franchise Requirement

| | | | | | | | | | | | | | | | | | | |
|---|---|---|---|---|---|---|---|---|---|---|---|---|---|---|---|---|---|---|
| Explanation | URL | Business Unit or Site Name | Use Case from Drop-Down | Sub Item from Drop Down within Use Case | Customer ID. | Customer Name | Customer Service Address | Vehicle ID | Route ID | Company Code-Municipal Name | Line of Business | Sub-LOB | Latitude | Longitude | Event Date and Time Stamp in current time zone | Date Reviewed | | End User |
| Report Heading | URL | Business Unit or Site Name | Use Case | Franchise | Customer No. | Customer Name | Service-Add | Vehicle ID | Route ID | Company Code | LOB | Sub-LOB | Latitude | Longitude | Event Date | Review Date | | Reviewer |
| Information: | 382494492 | Reno Hauling | Franchise Requirement | Deficiency<br>Signed Stickers<br>Franchise Name<br>xxx | 502-xxxxxxxxx | Tahoe Construction | 400 Stratton Way | ASL101560 | 404150 | Reno | Ind | MSW | 39.5273618 5 | 119.7017956 | 10/2/17 12:23 PM | 10/18/2017 3:17:00 PM | | Barry Skolnick |

Industrial Customer Notification

| | | | | | | | | | | | | | | | | | | |
|---|---|---|---|---|---|---|---|---|---|---|---|---|---|---|---|---|---|---|
| Explanation | URL | Business Unit or Site Name | Use Case from Drop-Down | Sub Item from Drop Down within Use Case | Customer ID. | Customer Name | Customer Service Address | Vehicle ID | Route ID | Company Code-Municipal Name | Line of Business | Sub-LOB | Latitude | Longitude | Event Date and Time Stamp in current time zone | Date Reviewed | | End User |
| Report Heading | URL | Business Unit or Site Name | Use Case | Customer Issues | Customer No. | Customer Name | Service-Add | Vehicle ID | Route ID | Company Code | LOB | Sub-LOB | Latitude | Longitude | Event Date | Review Date | | Reviewer |
| Information: | 382494492 | Reno Hauling | Customer Notification | Notice<br>Overage<br>Open Lid<br>Street Parking/Blocked<br>Spaceing<br>Container Direction<br>Xxx | 502-xxxxxxxxx | Tahoe Construction | 400 Stratton Way | ASL101560 | 404150 | Reno | Ind | MSW | 39.5273618 5 | 119.7017956 | 10/2/17 12:23 PM | 10/18/2017 3:17:00 PM | | Barry Skolnick |

FIG. 55
Industrial Advanced Reports (Continued)

Industrial Driver Notification

| Explanation | URL | Business Unit or Site Name | Site Name | Use Case from Drop-Down | Sub Item from Drop Down within Use Case | Customer ID: | Customer Name | Customer Service Address | Service-Add | Vehicle ID | Vehicle ID | Route ID | Route ID | Company Code-Municipal Name | Company Code | Line of Business | Line of Business | Sub-LOB | Sub-LOB | Latitude | Latitude | Longitude | Longitude | Event Date and Time Stamp in current time zone | Event Date | Date Reviewed | Review Date | End User | Reviewer |
|---|---|---|---|---|---|---|---|---|---|---|---|---|---|---|---|---|---|---|---|---|---|---|---|---|---|---|---|---|---|
| Report Heading | | Event ID | | Use Case | Driver Issues | | Customer No. | | Service-Add | | Vehicle ID | | Route ID | | Company Code | | Line of Business | | Sub-LOB | | Latitude | | Longitude | | Event Date | | Review Date | | |
| Information | | 382494492 | Reno Hauling | Driver Notification | Notification | 502-xxxxxxxxx | Tahoe Construction | 400 Stratton Way | | ASL101560 | | 404150 | | Reno | | Ind | | MSW | | 39.5273618 5 | | 119.7017956 | | 10/2/17 12:23 PM | | 10/18/2017 3:17:00 PM | | Barry Skolnick |
| | | | | | Litter Close Lid Upright Container Return to Curb xxx | | | | | | | | | | | | | | | | | | | | | | | | |

Industrial HOC

| Explanation | URL | Business Unit or Site Name | Site Name | Use Case from Drop-Down | Sub Item from Drop Down within Use Case | Customer ID: | Customer Name | Customer Service Address | Service-Add | Vehicle ID | Vehicle ID | Route ID | Route ID | Company Code-Municipal Name | Company Code | Line of Business | Line of Business | Sub-LOB | Sub-LOB | Latitude | Latitude | Longitude | Longitude | Event Date and Time Stamp in current time zone | Event Date | Date Reviewed | Review Date | End User | Reviewer |
|---|---|---|---|---|---|---|---|---|---|---|---|---|---|---|---|---|---|---|---|---|---|---|---|---|---|---|---|---|---|
| Report Heading | | Event ID | | Use Case | Customer Issues | | Customer No. | | Service-Add | | Vehicle ID | | Route ID | | Company Code | | Line of Business | | Sub-LOB | | Latitude | | Longitude | | Event Date | | Review Date | | |
| Information | | 382494492 | Reno Hauling | HOC | HOC | 502-xxxxxxxxx | Tahoe Construction | 400 Stratton Way | | ASL101560 | | 404150 | | Reno | | Ind | | MSW | | 39.5273618 5 | | 119.7017956 | | 10/2/17 12:23 PM | | 10/18/2017 3:17:00 PM | | Barry Skolnick |
| | | | | | Blocked Locked Contamination Unserviceable xxx | | | | | | | | | | | | | | | | | | | | | | | | |

FIG. 55
Industrial Advanced Reports (Continued)

Industrial Ancillary Fees

| Explanation | URL | Business Unit or Site Name | Use Case from Drop-Down | Sub Item from Drop Down within Use Case | Customer ID. | Customer No. | Customer Name | Customer Service Address | Service Add | Vehicle ID | Vehicle ID | Route ID | Route ID | Company Code-Municipal Name | Company Code | Line of Business | LOB | Sub-LOB | Sub-LOB | Latitude | Latitude | Longitude | Longitude | Event Date and Time Stamp in current time zone | Event Date | Date Reviewed | Review Date | End User | Reviewer |
|---|---|---|---|---|---|---|---|---|---|---|---|---|---|---|---|---|---|---|---|---|---|---|---|---|---|---|---|---|---|
| Report Heading | | Site Name | Use Case | Ancillary Audits | Customer ID. | | | | | | | | | | | | | | | | | | | | | | | | |
| Information: | 3824944828 | Reno Hauling | Ancillary Fees | Uncharged Fees | 502-xxxxxxxxx | | Tahoe Construction | | 400 Stratton Way | | AS1101560 | | 404150 | | Reno | | Ind | | MSW | | 39.52773618 5 | | 119.7017956 | | 10/2/17 12:23 PM | | 10/18/2017 3:17:00 PM | | Barry Skolnick |
| | | | | Backyard Push-Pull Multiple Containers xxx | | | | | | | | | | | | | | | | | | | | | | | | | |

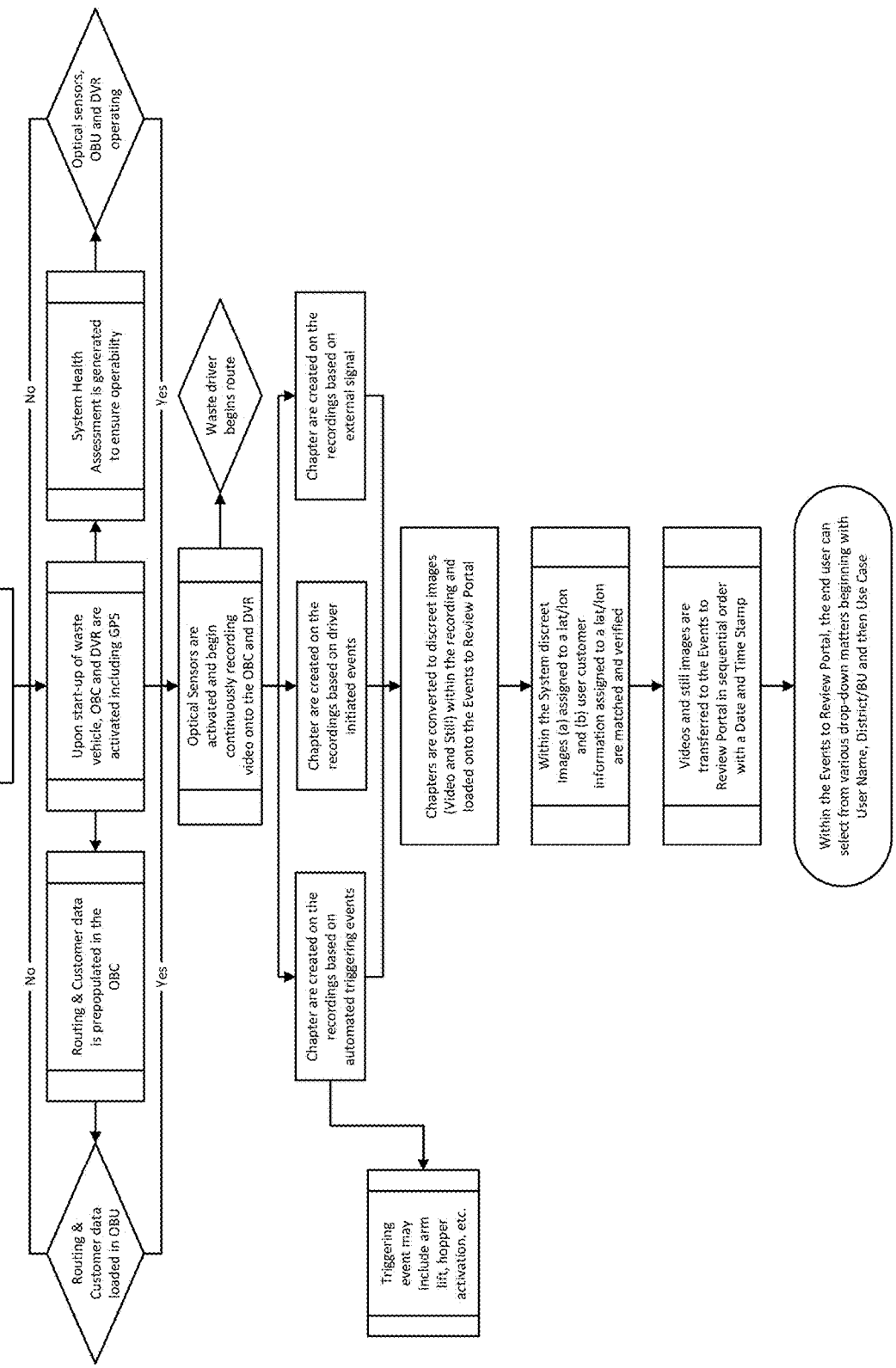

Use Case Bundles

SYSTEM AND METHOD FOR MANAGING SERVICE AND NON-SERVICE RELATED ACTIVITIES ASSOCIATED WITH A WASTE COLLECTION, DISPOSAL AND/OR RECYCLING VEHICLE

RELATED APPLICATIONS

This application is a continuation application and claims the benefit, and priority benefit, of U.S. patent application Ser. No. 16/809,335, filed Mar. 4, 2020, which is a continuation application of, and claims the benefit and priority benefit, of U.S. patent application Ser. No. 16/243,257, filed Jan. 9, 2019, now issued as U.S. Pat. No. 10,594,991 which claims the benefit and priority benefit, of U.S. Provisional Patent Application Ser. No. 62/615,360, filed Jan. 9, 2018, the contents of which are incorporated by reference herein in their entirety.

BACKGROUND

1. Field of the Invention

The presently disclosed subject matter relates to managing service and non-service related activities associated with a waste collection, disposal or recycling vehicle.

2. Description of the Related Art

Waste service vehicles (as well as waste container delivery vehicles) used in the waste collection, disposal and recycling industry often have on-board computers, location devices and interior and exterior safety and non-safety related cameras installed on the exterior and interior thereof. These systems provide field managers with limited data related to the waste service vehicle, location of the waste service vehicle, waste service confirmation, customer service issues, service routing issues, customer site information and safety issues and concerns.

Commercial, Residential, Industrial (roll-off services) and Container Delivery waste service providers typically have assigned waste service routes for management of municipal solid waste (MSW, waste, trash or traditional garbage), recycling (residential curbside source separated or single stream) organics (source separated residential green waste and source separated residential food waste and commercial food waste) and commercial recycling (source separated dry waste including cardboard, metals, polymers, paper, other fibers, glass, woods and other inerts, etc.) for each of the waste service provider customers whether the customers are in a competitive subscription open market pursuant to a service contract/agreement or within an exclusive or non-exclusive municipal franchise system. On occasion, waste services may be provided on an ad-hoc basis resulting from On-Call waste services or instances where services are required to be provided off-route because of a missed-pickup or emergency where the customer requires immediate service, etc.

Improvements in this field of technology are desired.

SUMMARY

A system for managing waste service activities and non-service activities outside of the waste servicing collection vehicle is provided which can include one or more of: a waste vehicle equipped with an onboard board computer (OBC) and digital video recorder (DVR); a waste vehicle equipped with one or more optical sensors; triangulation of customer location for commercial, residential and industrial collections using an OBC linked to GPS, on-board DVR linked to GPS and other off-the-shelf mapping geo-coding applications to establish latitude/longitude for each customer container, bin, cart and box; one or more optical sensors configured to capture continuous video recordings from the time the waste collection truck driver commences the DOT pre-trip inspection at the facility location until the collection waste truck driver returns to the facility location and performs the DOT post-trip inspection; one or more optical sensors configured to the OBC, DVR and back office hardware and software system ("System"); one or more optical sensors that, while configured to the OBC, DVR & System, are likewise configured to a signal or signals emanating from electronic or mechanical device on the truck to include, but not limited to proximity switches, limit switches, mechanical sensors, electronic control module (ECM), programmable logic computer (PLC), arms, hoppers and/or blades and such other vehicle devices (hereinafter referred to as "Devices"); one or more optical sensors that, while configured to the OBC, DVR & System, are likewise configured to vehicle movement including acceleration, deceleration, g-force, stopping and starting (hereinafter referred to as "Vehicle Movement"); one or more optical sensors that, while configured to the OBC, DVR & System, are likewise configured to a driver initiated triggering event (hereinafter referred to as "Driver Initiated Event"); one or more optical sensors that, while configured to the OBC, DVR & System, are likewise configured to an external or outside of the vehicle initiated triggering event (hereinafter referred to as "External Initiated Event"); and one or more of Devices, Vehicle Movement, Driver Initiated Events, and External Initiated Events (hereinafter referred to as ("Triggering Events") that are configured to the OBC and DVR with the Triggering Events causing one or more images or video segments to be captured on the continuous video recording ("Chapters") resulting in a Still Image or up to 60 second Video Clip assigned to one or more Optical Sensors, and wherein such Chapters are configured to be displayed on a Portal for review and are available in sequential order based on Date, Time and Truck ID.

A method of linking Company and Customer information including Customer container/bin/cart/box location to Chapters is also provided which can include one or more of: each of the Company information including, but not limited to, Business Unit/Site, Truck ID, Company Code and Route ID are downloaded into the OBC; each of the Customer locations including locations of the container/bin/cart/box are assigned a latitude/longitude and downloaded into the OBC; the OBC contains Customer information including, but not limited to Customer ID, Customer name, Customer address, Customer service levels, Franchise name/Open Market with the Customer information likewise link to the Customer location; the OBC likewise contains service requirements assigned to the Customer and waste collection municipal franchise system; and resulting Chapters created from the continuous video recording through Triggering Events are linked/connected to the Company and Customer with each Chapter containing Customer Name, Customer Address, Service Level, Sub-Line of Business, Route ID, Customer Account Number, Franchise Name/Open Market, Service Time and Service Date.

A method of viewing Company information, Customer information and Chapter developed from Triggering Events through the Optical Sensor(s) stored on the OBC and DVR within an Event to Review Portal or Display is also provided which can include one or more of: a visual display of the Still Image and/or up to 60-second Video Clip loaded into Events to Review Portal viewable by Use Case and then Business Unit and Truck ID; the visual display of the Still Image and/or up to 60-second Video Clip with Customer Name, Customer Address, Service Level, Sub-Line of Business, Route ID, Customer Account Number, Franchise Name/Open Market, Service Time and Service Date below the Still Image and/or Video Clip; the ability for the end-user to select an Image aligned to a Use-Case resulting in a red-box highlighting the Image; the ability for the end-user to send the Image via web-address, email and/or text to the User's various departments (e.g. Customer Service, Billing, Operations, etc.) and to the Customer; and the ability for the end-user to Submit the highlighted image to an Advance Report module for use by the Company.

A method for reviewing Use Cases resulting from Chapters and such other waste service activities and nonservice activities outside of the waste servicing collection vehicle is also provided which can include one or more of: selecting Use-Cases from the Events to Review portal; determining if Images meet the criteria under each of the Use-Cases; and submitting the selected Chapter for further review within Advanced Reports.

A method for viewing Advanced Reports and such other Reports resulting from Images from Triggering Events being Submitted from the Events to Review Portal is also provided which can include one or more of: a series of selected Images by the end-user from the Events to Review Portal images being selected; selected Images being available for further review in the Advanced Reporting screen; selected Images in the Advanced Reporting screen being sent to Customer Service, Billing and Operations; and selected Images in the Advanced Reporting screen being sent to Customers via US Mail, web-address, email and/or text.

A system is also provided for managing service activities performed by a waste service vehicle, wherein the system can include: an optical sensor disposed on-board the waste service vehicle and configured to capture a continuous video recording of an area outside of the cab of the waste service vehicle, wherein the continuous video recording is captured during the entirety of a service operations period for the waste service vehicle; a recording device disposed on-board the waste servicing vehicle and configured to store the continuous video recording from the optical sensor; a computing device disposed on-board the waste service vehicle and configured to identify a physical location of a waste service customer; and a central computing device that is not on-board the waste service vehicle and is operatively linked to the optical sensor, recording device and computing device; wherein, upon the occurrence of a pre-defined triggering event, the central computing device is configured to capture a chapter from the continuous video recording, and the central computing device is configured to display the chapter on an electronic viewing portal in association with a visual indication of the physical location of the waste service customer and one or more of date, time, and an identification number for the waste service vehicle. In certain aspects, the pre-defined triggering event comprises one or more of: signal or signals emanating from an electronic or mechanical device on the waste service vehicle, wherein the electronic or mechanical device is one or more of a proximity switch, a limit switch, a mechanical sensor, an electronic control module, a programmable logic computer, an arm, a hopper, a blade or a waste service vehicle device; a movement of the waste service vehicle, wherein the movement comprises acceleration, deceleration, g-force, stopping or starting; a driver initiated triggering event; and a triggering event that is initiated external to or outside of the vehicle. In certain aspects, the service operations period for the waste service vehicle begins when a driver commences an inspection of the vehicle at a facility location prior to performing one or more service activities, and ends when the driver performs an inspection of the waste service vehicle after performing the one or more service activities. In certain aspects, the step of identifying a physical location of a waste service customer during the service operations period comprises identifying a location for one or more of commercial, residential or industrial collections using a GPS linked to the onboard computer and to the on-board recording device to establish latitude and/or longitude for one or more customer waste containers. In certain aspects, the chapter that is captured from the continuous video recording comprises one or more of a still image or a video clip of 60 seconds or less. In certain aspects, the recording device on-board the waste servicing vehicle comprises a digital video recorder. In certain aspects, the on-board computer is configured to: store downloaded waste service company information comprising one or more of a waste site, a business unit, a truck identification number, a company code and a route identification number; store downloaded customer location information comprising latitude/longitude for one or more customer locations including locations of the waste container; and store downloaded customer identifying information comprising one or more of a customer identification number, a customer name, a customer address, one or more customer service levels, a franchise name, and a service requirement assigned to the customer and to a waste collection municipal franchise system; and the central computing device is configured to: link the customer identifying information to the customer location information, and link the chapters from the continuous video recording to one or more of the waste service company information, the customer identifying information, and the customer location information.

BRIEF DESCRIPTION OF THE DRAWINGS

A better understanding of the presently disclosed subject matter can be obtained when the following detailed description is considered in conjunction with the drawings and figures herein, wherein:

FIG. 6 is an example of a listing of Source Data for the Event to Review display for a user in accordance with an illustrative embodiment of the presently disclosed subject matter;

FIGS. 7-9 are examples of screens where a variety of pre-defined Use Cases by Line of Business (Commercial, Residential and Industrial) can be displayed for a user in accordance with illustrative embodiments of the presently disclosed subject matter;

FIG. 10 is an example of a screen where a Chapter (still image/video or image) is displayed on a monitor for an end-user to review under the Use Case "Commercial Overloaded Container" in accordance with an illustrative embodiment of the presently disclosed subject matter;

FIG. 11 is an example of a screen where a Chapter (still image/video or image) is displayed on a monitor for an end-user to review under the Use Case "Commercial Open Lid" in accordance with an illustrative embodiment of the presently disclosed subject matter;

FIG. 13 is an example of a screen where a Chapter (still image/video or image) is displayed on a monitor for an end-user to review under the Use Case "Commercial Service Level Audit" in accordance with an illustrative embodiment of the presently disclosed subject matter;

FIG. 18 is an example of a screen where a Chapter (still image/video or image) is displayed on a monitor for an end-user to review under the Use Case "Commercial Contamination of Recycling and Organics" in accordance with an illustrative embodiment of the presently disclosed subject matter;

FIG. 19 is an example of a screen where a Chapter (still image/video or image) is displayed on a monitor for an end-user to review under the Use Case "Commercial Open-Market Sales Opportunity" in accordance with an illustrative embodiment of the presently disclosed subject matter;

FIG. 20 is an example of a screen where a Chapter (still image/video or image) is displayed on a monitor for an end-user to review under the Use Case "Commercial Franchise Infringement (Poaching)" in accordance with an illustrative embodiment of the presently disclosed subject matter;

FIG. 21 is an example of a screen where a Chapter (still image/video or image) is displayed on a monitor for an end-user to review under the Use Case "Commercial Ancillary Fee Audit" in accordance with an illustrative embodiment of the presently disclosed subject matter;

FIG. 28 is an example of a screen where a Chapter (still image/video or image) is displayed on a monitor for an end-user to review under the Use Case "Residential Overloaded Container" in accordance with an illustrative embodiment of the presently disclosed subject matter;

FIG. 30 is an example of a screen where a Chapter (still image/video or image) is displayed on a monitor for an end-user to review under the Use Case "Residential Service Level Audit" in accordance with an illustrative embodiment of the presently disclosed subject matter;

FIG. 31 is an example of a screen where a Chapter (still image/video or image) is displayed on a monitor for an end-user to review under the Use Case "Residential Open Lid" in accordance with an illustrative embodiment of the presently disclosed subject matter;

FIG. 32 is an example of a screen where a Chapter (still image/video or image) is displayed on a monitor for an end-user to review under the Use Case "Residential Damaged Containers" in accordance with an illustrative embodiment of the presently disclosed subject matter;

FIG. 33 is an example of a screen where a Chapter (still image/video or image) is displayed on a monitor for an end-user to review under the Use Case "Residential Franchise Requirements" in accordance with an illustrative embodiment of the presently disclosed subject matter;

FIG. 34 is an example of a screen where aChapter (still image/video or image) is displayed on a monitor for an end-user to review under the Use Case "Residential Extra Bags-Extra Service" in accordance with an illustrative embodiment of the presently disclosed subject matter;

FIG. 44 is an example of a screen where a Chapter (still image/video or image) is displayed on a monitor for an end-user to review under the Use Case "Residential Dangerous Stops" in accordance with an illustrative embodiment of the presently disclosed subject matter;

FIG. 45 is an example of a screen where a Chapter (still image/video or image) is displayed on a monitor for an end-user to review under the Use Case "Residential Property Damage" in accordance with an illustrative embodiment of the presently disclosed subject matter;

FIG. 46 is an example of a report screen with the notation for each Chapter, "Missing Picture", in accordance with an illustrative embodiment of the presently disclosed subject matter;

FIG. 47 is an example of a report screen within an Events to Review portal which provides a process to monitor unavailable images (video and still) under the Use Case "No Image-Heath Assessment and Real-Time Monitoring of Cameras" in accordance with an illustrative embodiment of the presently disclosed subject matter;

FIGS. 49-55 illustrate examples of Advance Reports in accordance with illustrative embodiments of the presently disclosed subject matter;

FIG. 56 illustrates an example of a method of managing service and non-service related activities associated with a waste collection, disposal and/or recycling vehicle including continuous monitoring and recording of a vehicle in accordance with an illustrative embodiment of the presently disclosed subject matter.

Figure 1:
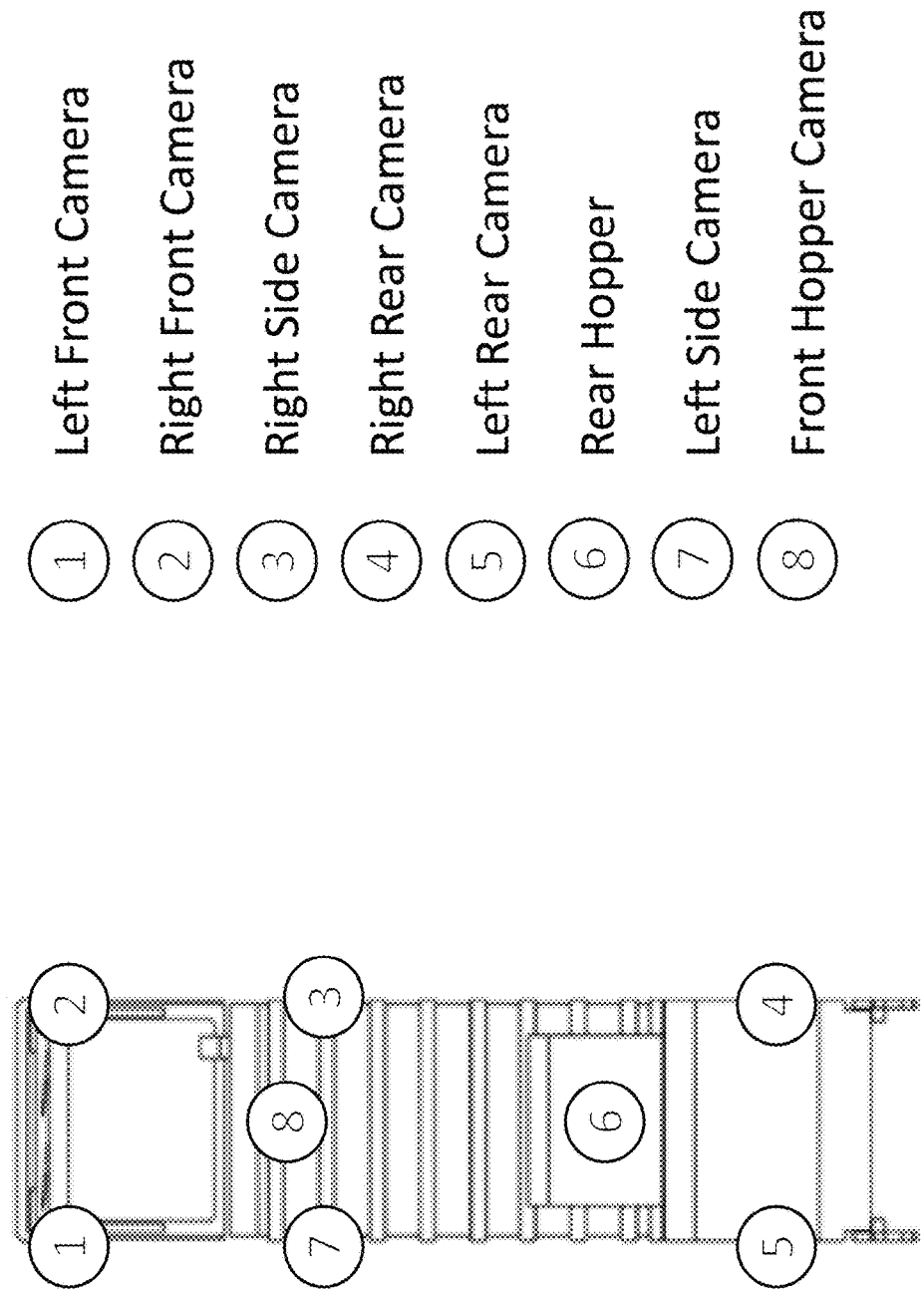
FIG. 1 is an example of optical camera placement on a waste service vehicle in accordance with an illustrative embodiment of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

The presently disclosed subject matter relates generally to systems and methods for using video/still images captured by one or more continuously recording optical sensors mounted on waste collection vehicles used in the waste collection, disposal and recycling industry for operational and customer service related purposes. Optical sensors can be integrated into the in-cab monitor as well as the onboard computer, digital video recorder and other external devices. In certain illustrative embodiments, it is desired to virtually connect (in real-time) the waste service provider to the waste service vehicle and ultimately to the waste service customer being serviced for management of waste collection, disposal and recycling in immediate real-time or at a date in the future. The disclosed system is directed to overcoming the issues, problems and opportunities described herein and/or other issues and problems of the prior art.

In certain illustrative embodiments, a system is disclosed for managing some or all service related and nonservice related activities outside of the waste servicing vehicle. The system has a location device configured to determine the location of the service vehicle always while the service vehicle is inactive, in motion and operating and performing service related and nonservice related activities. The service vehicle has optical sensors and such other sensors installed throughout the service vehicle including, but not limited to, high definition cameras, monitors and such other sensors mounted to the front (interior and exterior of the cab), exterior right side, exterior left side, exterior rear and exterior/interior hopper area of the service vehicle. Optical sensors and other sensors are continuously recording all activities from each of the optical sensors with the images and data being stored on an onboard computer and recording device (such as a digital video recorder) and being transmitted and stored remotely away from the waste service vehicle. The onboard computer and recording device are configured to detect motion, g-force, speed, vehicle deceleration, distance from assigned points within a service area and engagement of the service vehicle equipment including service arms resulting in container and bin lifts, engagement of other vehicle mechanical devices and all such other services being performed by the service vehicle. Additionally, the onboard computer and recording device are configured to detect signals from external devices.

In certain illustrative embodiments, the onboard computer and recording device are configured to create notations, cyphers, codes, or chapters (hereinafter referred to as "Chapter(s)") resulting from one or more optical sensors, while configured to the Onboard Computer (OBC), Digital Video Recorder (DVR) & User's remote back-office hardware and software (System), and are likewise configured to receive a signal or signals emanating from electronic or mechanical devices on the waste collection truck including but not limited to:
 (a) proximity switches;
 (b) limit switches;
 (c) electronic control module (ECM);
 (d) programmable logic computer (PLC);
 (e) vehicle arms, hoppers and blades; and/or
 (f) such other vehicle devices (hereinafter referred to as "Devices").

In certain illustrative embodiments, the optical sensor takes the videos and sends to the DVR and OBC. The OBC and DVR are configured in such a way that Triggering Events create Chapters (Videos and Still Images), which are stored on a back office system and made available for view through Advanced Reports and other Reports in a viewing portal.

In certain illustrative embodiments, the onboard computer and recording device are configured to create Chapters resulting from one or more optical sensors, while configured to the OBC, DVR & System, and are likewise configured to detect vehicle movement including but not limited to:
 (a) waste collection vehicle acceleration;
 (b) waste collection vehicle deceleration;
 (c) measuring g-force; and
 (d) stopping and starting of the waste collection vehicle (hereinafter referred to as "Vehicle Movement").

In certain illustrative embodiments, the onboard computer and recording device are configured to create Chapters resulting from one or more optical sensors, while configured to the OBC, DVR & System, and are likewise configured to detect a waste collection vehicle driver initiated event (hereinafter referred to as "Driver Initiated Event").

In certain illustrative embodiments, the onboard computer and recording device are configured to create Chapters resulting from one or more optical sensors, while configured to the OBC, DVR & System, and are likewise configured to detect an external or outside of the waste collection vehicle initiated event (hereinafter referred to as "External Initiated Event").

In certain illustrative embodiments, one or more Devices, Vehicle Movements, Driver Initiated Events and External Initiated Event (hereinafter collectively referred to as "Triggering Events") are configured to the OBC and DVR with Triggering Events causing Chapters to be captured on the continuous video recording resulting in a Still Image or up to 60-second Video Clip assigned to one or more Optical Sensors.

Triggering Events resulting in Chapters on the continuous optical sensor recordings may be stored on an onboard vehicle computer and/or digital video recorder and transmitted to remote storage device(s).

The Chapters on the continuous optical sensor recordings and such other sensors are configured to provide immediate and/or passive Still Images and immediate and/or passive limited Video-Clip images for remote viewing and auditing for all service related and nonservice related activities from the waste service vehicles.

In certain illustrative embodiments, the most efficient and optimal method for providing waste services is through routed waste collection optimizing route density and service productivity. Other efficiencies and productivity are gained, service costs are reduced, optimal waste services are provided and waste service company margins are improved when waste service customer are managed pursuant to service expectations designated by the waste service provider and/or the municipal franchise system. These service expectations include, but are not limited to:
 (a) containerized waste and ensuring waste is below the lid of the container/bin,
 (b) ensuring waste container lids are closed to prevent collection of precipitation within in the waste container/bin,
 (c) ensuring containers/bins are accessible at the time of service and are not blocked, locked, enclosed or otherwise unavailable for service,
 (d) ensuring the containers and bins are positioned correctly to ensure optimal and safe servicing,
 (e) ensuring multiple containers/bins at a customer location are adequately separated to allow semi-automated and automated waste service vehicles optimal and safe access to each container/bin,
 (f) ensuring damaged containers/bins are identified and swapped, repaired and/or removed, and
 (g) ensuring customers adhere to requirements regarding recycling and abate contaminating recycling containers/bins with prohibited waste and/or non-recycling materials.

Other efficiencies and productivity are gained, service costs are reduced, optimal waste services are provided and waste service company margins are improved when waste service companies effectively manage and service their service routes, service stops and Customers. Effectively servicing and managing routes, stops and Customers can include, but is not limited to:
 (a) performing service level audits to ensure Customers are being charged correctly for the container size, quantity and frequency of service,
 (b) performing ancillary fee audits to ensure Customers are being charged correctly for requested and franchise services in addition to traditional waste collection services, which may include but is not limited to backyard service, enclosures, push-pull services, valet services, locks, etc.,
 (c) proactively notifying Customers of service related issues including, but not limited to, overloaded containers/bins, open lids, blocked containers/bins, inaccessible containers/bins, litter on the ground, waste bags and collection items outside the container/bin, prohibited items in the containers/bins, etc.,
 (d) ensuring sites and service addresses receiving waste services are in fact Customers of the waste service company, (e) providing immediate service confirmation to include, but not limited to, the waste service company's Customer Service department, the waste service company's District/Site Operations, the waste service company's Dispatch Center and the waste service company's Customer via US Mail, email, text, wed-address and such other communications efforts, (f) ensuring the waste service company is achieving regulatory and municipal franchise requirements regarding containers/bins including, but not limited to, waste service company and/or municipal signage, stickering, placement, logos, size notation, phone numbers and bin/container condition, etc., (g) performing site audits to ensure competitors are not violating franchise requirements/encroaching within the franchise for exclusive waste service collection, disposal and recycling, (h) auditing hard to service, dangerous stops and claims of property damage at Customer service locations, (i) immediately notifying and providing visual evidence of a container/bin not being out (Not-Outs) to include, but not limited to, the waste service company's Customer Service department, the waste service company's District/Site Operations, the waste service company's Dispatch Center and the waste service company's Customer via US Mail, email, text, web-address and such other communications efforts, (j) providing immediate or passive visual evidence of a container/bin being delivered, repaired, swapped and/or removed to include, but not limited to, the waste service company's Customer Service department, the waste service company's District/Site Operations, the waste service company's Dispatch Center and the waste service company's Customer via US Mail, email, text, web-address and such other communications efforts, (k) documenting and providing visual evidence of Bulky Waste pickups to include, but not limited to, the waste service company's Customer Service department, the waste service company's District/Site Operations, the waste service company's Dispatch Center and the waste service company's Customer via US Mail, email, text, web-address and such other communications efforts, and (l) providing proactive notification to waste service company drivers and operations related to service failure to include, but not limited to, missed-pickup, litter, container misalignment/carts askew, carts tipped over and property damage, etc.

In certain illustrative embodiments, truck mounted cameras can be used to capture video, still images and/or monitoring from a monitor display inside the waste service vehicle. FIG. 1 is a diagram of typical camera placement on waste service vehicles to include (without limitation) Front Load Commercial, Rear Load Commercial, Rear Load Residential, Side Load Residential, Front Load Residential, Roll-Off and Residential and Commercial Container Delivery.

For example, in certain illustrative embodiments, OBCs and DVRs are installed in the waste service vehicle with the OBC and DVR configured to detect vehicle location at all times, motion, g-force, speed, vehicle deceleration, distance from assigned points within a service area and engagement of the service vehicle equipment including service arms resulting in container and bin lifts, engagement of other vehicle mechanical devices and all such other services being performed by the service vehicle.

Figure 2:
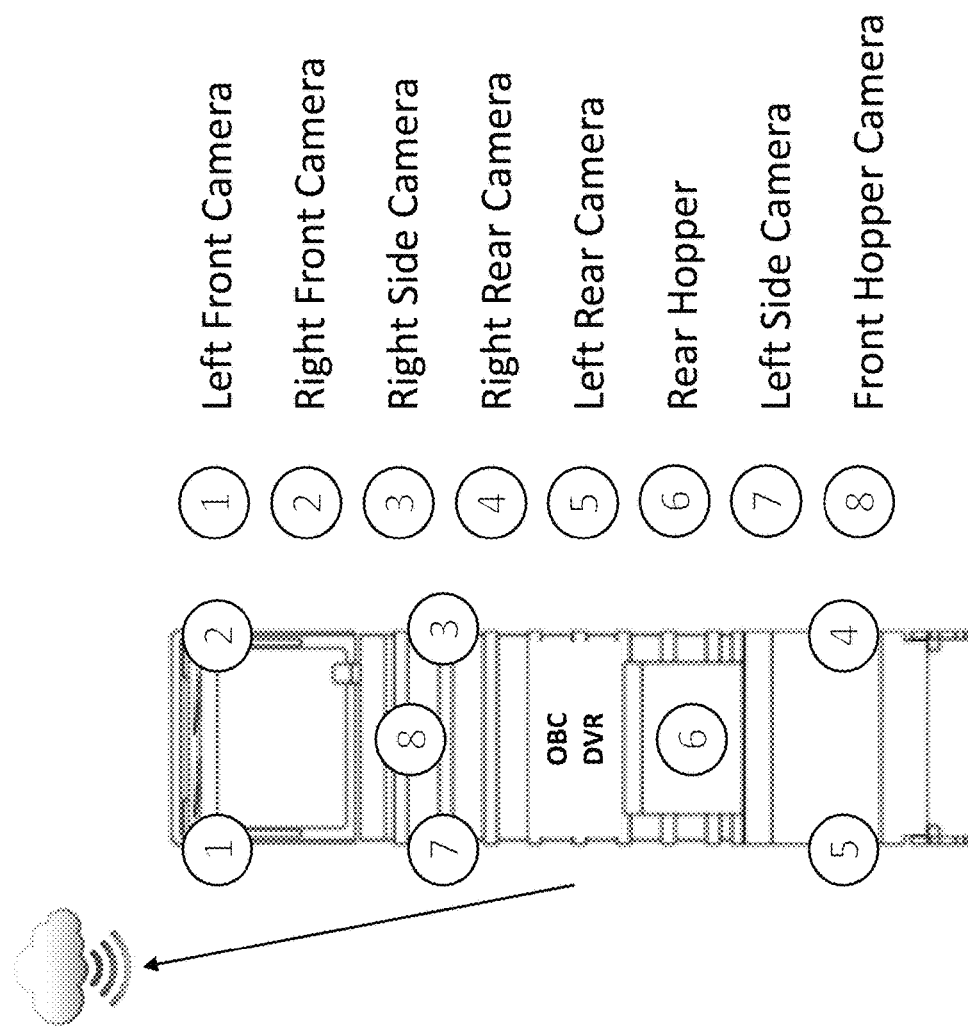
FIG. 2 is an example of an onboard computer and DVR configured to capture continuous video feeds from truck mounted optical sensors and capture service related and non-service related activity outside of the waste service vehicle in accordance with an illustrative embodiment of the presently disclosed subject matter.

In FIG. 2, the OBC and DVR are configured to capture continuous video feeds from each of the truck mounted optical sensors and further designed to capture all service related and non-service related activity outside of the waste service vehicle. The DVR can be installed in the service vehicle. The OBCs can be continuous recording. All service related and non-service related activities can be captured. Images are stored on the OBC, DVR and in the Cloud via cellular and/or other wireless transmissions for remote storage and viewing. Images are available for review in immediate real-time or passive review later by an end-user.

For example, in certain illustrative embodiments, continuous video feeds from each of the optical sensor may be used to review certain service related and non-service related activities. Certain predefined Triggering Events can result in a Chapter (defined hereinabove) within the continuous optical sensor recordings.

In certain illustrative embodiments, waste service vehicle and/or optical sensor data can be linked (i) to a specific customer (and associated customer data such as account number, service address, service level, etc.) and/or (ii) to route/location/destination specific information. For example, with respect to customer linking, service confirmations can be collected at a point of service. With respect to route event linking, a service can be reviewed for the purposes of determining contamination with the recycling stream by capturing video/camera images from the hopper camera. The presently disclosed system and method can connect one, more than one or every service and non-service related event to an actual customer or event on the waste service route. This step can be performed manually by a human operator, or it can be an automated process.

Figure 3:
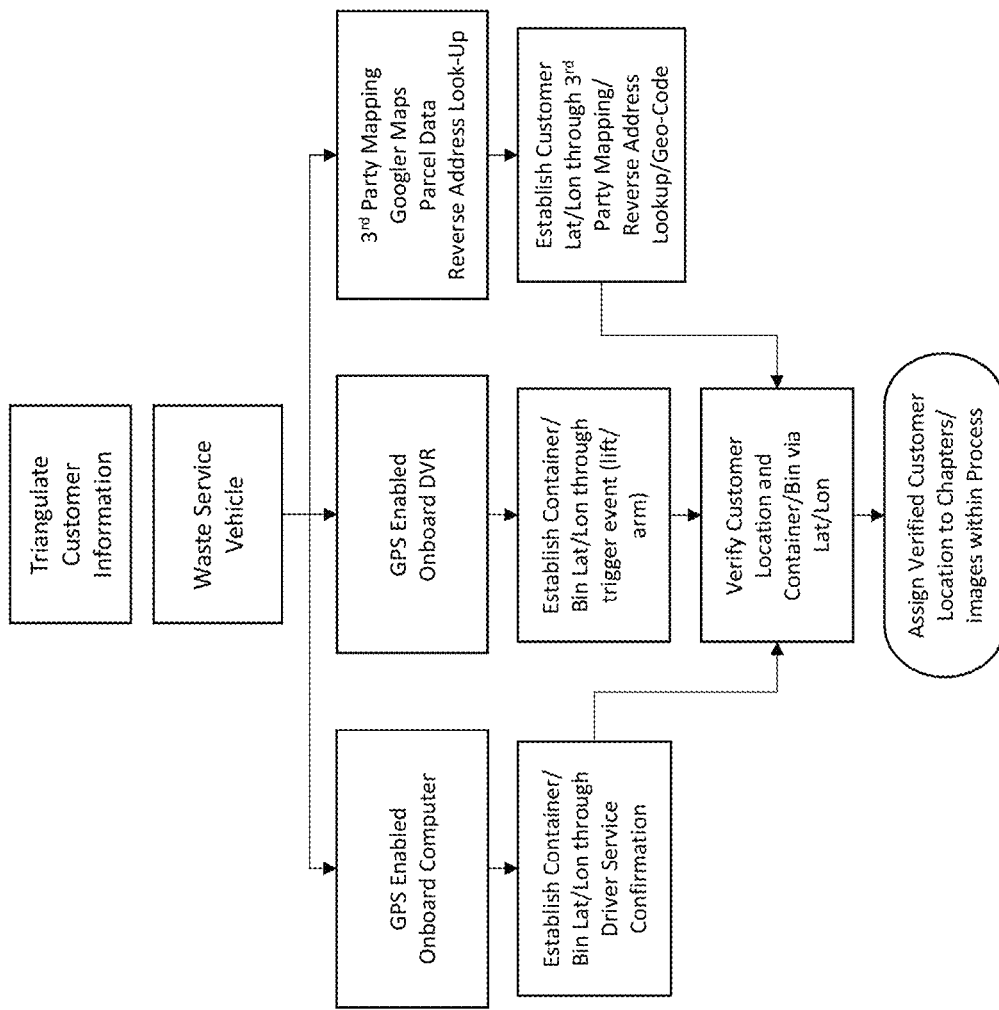
FIG. 3 is an example of a method for using spatial (GPS) data to triangulate information provided by a driver's service confirmation on an onboard computer, truck's GPS enabled DVR, and geocoding of service address using traditional mapping software in accordance with an illustrative embodiment of the presently disclosed subject matter.

As referenced in FIG. 3, in certain illustrative embodiments, the method can start with using spatial (GPS) data to triangulate the information provided by the driver's service confirmation on the OBC, truck's GPS enabled DVR, and geocoding of service address using traditional mapping software (e.g. Google™ maps, parcel data analysis, reverse geo-coding, reverse address look-up, etc.). Additional methods can be utilized for customer and container identification and recognition.

In certain illustrative embodiments, the presently disclosed systems and methods provide functionality for end-user and such other user designees to utilize video and still images from one or more vehicle cameras for operational purposes relating to servicing and managing waste collection customers as well as non-service related activities.

For example, multiple user vehicle mounted optical sensors can be used to capture video and still images that are prompted by specific vehicle movement and actions (e.g., movement of the vehicle or movement of the mechanical arm of the truck and engagement of the hopper) and/or prompted by manual manipulation by the driver resulting in the optical sensor(s) capturing specific footage related to customer services and user defined "Use Cases" (again, as further described below).

Also, multiple user vehicle mounted optical sensors can be used to capture video and still images that link videos and still images associated with user's latitude/longitude with customers' containers and bin location and latitude/longitude resulting from user's defined triggering event with user customer information being matched or verified against videos and still images generated through digital video recording.

For example, in certain illustrative embodiments, waste vehicle optical sensors and video recordings and still images are associated with specific user-defined scenarios or "Use Cases" (e.g., overloaded waste containers, contamination of waste containers, waste container maintenance, open lids, identifying waste collection infringement with a municipal franchise system, etc.). Use Cases are further defined in greater detail below. However, in certain illustrative embodiments, the recordings can be indifferent as to the Use Cases and are configured to be used for any one or all user-defined Use Cases and future user-defined Use Cases.

Figure 4:
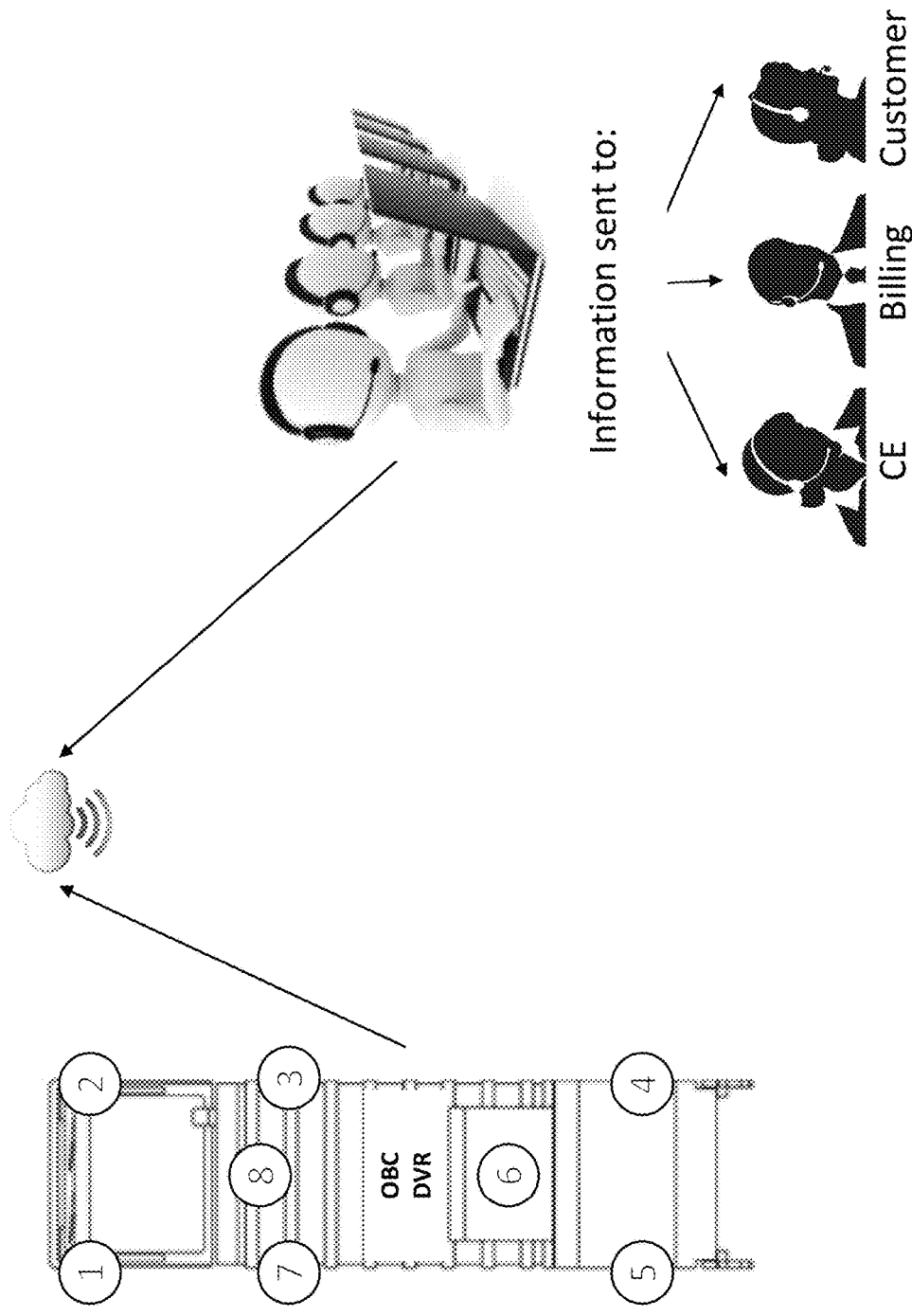
FIG. 4 is an example of a process for transmitting optical sensor video recordings from a waste service vehicle to a Cloud and having discreet Chapters or images available for review associated with Use Cases by auditors, operations, customer service or other end-users in accordance with illustrative embodiments of the presently disclosed subject matter.

FIG. 4 demonstrates a process for transmitting optical sensor video recordings from the waste service vehicle to the Cloud and having discreet Chapters or images available for review associated with Use Cases by auditors, operations, customer service or other end-users. Upon reviewing designated Chapters in the form of still images and video clips, end-users may forward the findings to User's Billing, Operations, Customer Service and/or the Customer. Optical Sensor recordings can be stored on the DVR and transmitted to the Cloud. Auditors, Operations and others can review Chapters within an optical sensor recording associated with a designated Use Case, and the findings are sent on to Customer Service, Billing and the Customer.

Figure 5:
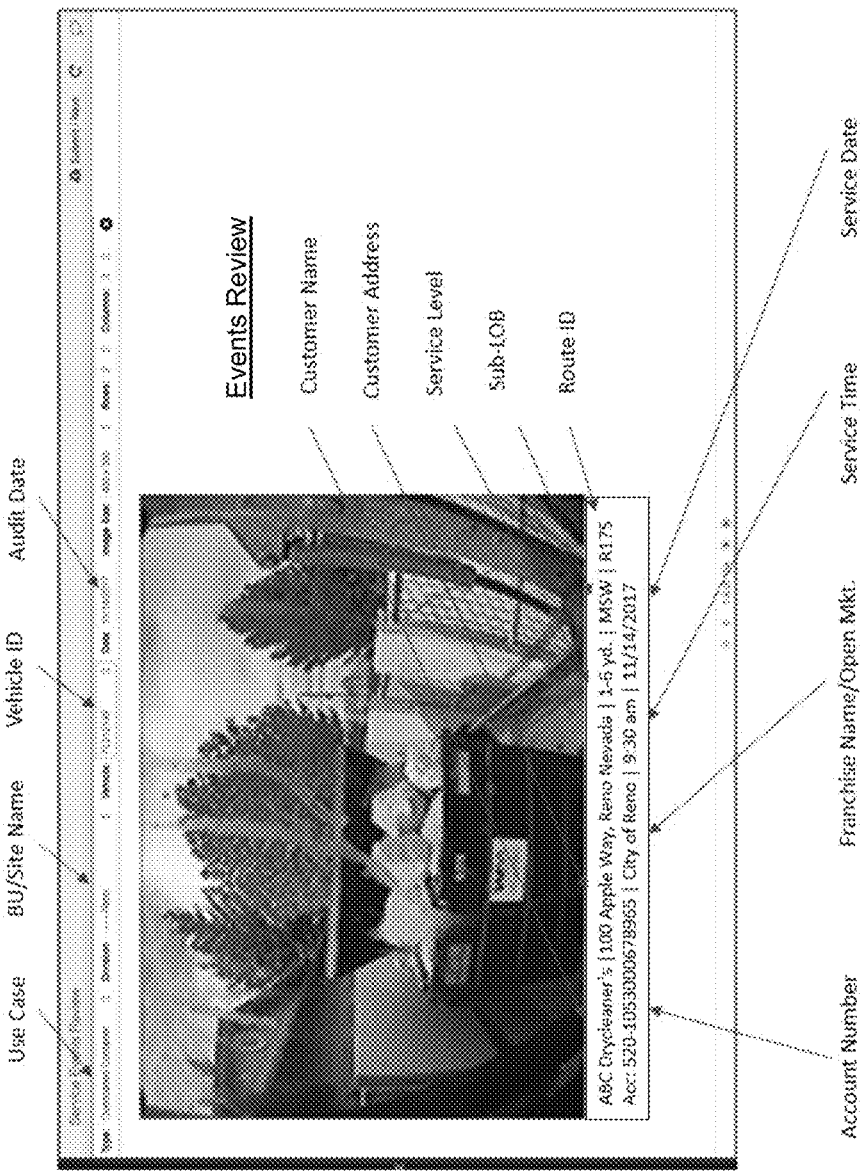
FIG. 5 is an example of a screen where a Chapter (still image/video or image) is displayed on a monitor for an end-user to review in accordance with an illustrative embodiment of the presently disclosed subject matter.

FIG. 5 includes sample screenshots for a computer program/software product where the video/still images are linked to specific customer information (name, address, etc.) in the user's customer database with the information being displayed next to the video/still images (see, e.g., FIG. 5,—"ABC Packaging, 100 Apple Way, Reno Nev. . . . ").

By way of further explanation, FIG. 5 includes a sample screenshot where the Chapter (still image/video or image) is displayed on a monitor for the end-user to review. The Chapters or images can be displayed in sequential order based on Triggering Events resulting in a Chapter being notated on the continuous optical sensor recordings. Effectively, the end-user can view still images of customers' services in the sequential order in which the waste service route is being operated and performed.

Each discreet Chapter or image can contain one or more of the following information items displayed in an Events to Review and Service Events Portal and Display with one or more of the qualifying Naming Conventions (drop down menus for end-users) allowing the end-user to select by a variety of options to review Chapters or images associated with service related and non-service related activities:

(a) Use Case being reviewed,
(b) User Waste Service Company Name,
(c) User Waste Service Site ID, Business Unit
(d) User Truck/Vehicle ID
(e) User Customer Name,
(f) User Customer Address,
(g) User Customer Service Levels,
(h) User Line of Business (commercial, residential, industrial),
(i) User Sub-Line of Business (MSW, recycling, organics),
(j) User Route ID,
(k) User Customer Account Number,
(l) User Designation of Municipal Franchise or Open Market,
(m) User Service Date; and,
(n) User Service Time.

The Source Data for the Event to Review is depicted in FIG. 6 and results from pulling information from the Optical Sensors, OBC, DVR, other Mapping & Geo-Coding features, Routing & Logistics systems and/or Customer information and User's System.

Also, multiple user vehicle mounted optical sensors can be used to capture video and still image Chapters that associated with specific scenarios or "Use Cases" and related software functionality, user camera interface and user customers. The functionality of the process includes, but is not limited to the following:

(a) Videos and still images Chapters are automatically available and associated by Triggering Events (e.g. vehicle movement, servicing or attempting service, engaging arm, tipper, hopper, etc. at commercial, residential and industrial stops;

(b) Video and still image Chapters either viewed in real-time or later time and date for user defined Use Cases and related service and customer audits;

(c) Ability to view actual user customer information including Customer ID, Customer Name, Service Address, Business Unit, Company Code, Truck ID, Route ID, Service Levels and Franchise Name associated with each video and still image Chapters on a display screen (e.g., Events to Review);

(d) Ability to view time-stamp and date stamp with each video and still image Chapters on a display screen (e.g., Events to Review) and such other portals within a user system;

(e) Ability to generate still images Chapters within 6'-8' in front of a commercial waste bin prior to service or such other distances, angles and viewpoints as defined by the end-user;

(f) Ability to generate still image Chapters 6'-8' adjacent to a residential cart prior to service or such other distances, angles and viewpoints as defined by the end-user;

(g) Ability to generate still image Chapters with a full view of all containers, extra pickups and bulky pickups being serviced at residential stops, multi-family stops, commercial stops and industrial stops;

(h) Ability to generate still image Chapters with a full view of the roll-off containers being serviced at industrial stops;

(i) Ability to generate still image Chapters of all container deliveries, swaps and removals at commercial, residential and industrial customers;

(j) Ability to capture up to 60 seconds of video Chapters of sources separated organics and recycling being deposited into the vehicles' hopper; and (k) Ability to capture up to 60 seconds of video Chapters associated with all activities at the customers' service address.

Also, multiple user vehicle mounted optical sensors can be used to capture video and still images that are available for view and auditing in the display screen (e.g., Events to Review Screen, Service Events Screen, Advanced Reports) and such other portals and screens within the system as defined by user.

Also, multiple user vehicle optical sensors can be used to capture video and still images that, with limited driver interface with the OBC, DVR and user optical sensors, can capture one or more of the following:

(a) Not-Out: The ability to capture a still image and/or video of a customer's container not being available for service or "Not-Out" and send through the system to user-Customer Service, user operations and/or user's Customer via US Mail, web address, email and text;

(b) HOC's: The ability to capture a still image and/or video of a customer's container being unavailable for service due to the container being locked, blocked, behind a locked gate, containing prohibitive waste, etc. and send through the system to user-Customer Service, user-operations and/or user's-Customer via US Mail, web address, email and text;

(c) Container/Bin Management: Residential, Commercial and Industrial container bin deliveries, swaps and removals and send through the system to user-Customer Service, user-operations and/or user's-Customer via US Mail, web address, email and text;

(d) Pings: The ability to specifically ping a service location to establish latitude/longitude and cross-reference against User's latitude/longitude notation within User's routing and logistic system to verify and notate service location and bin or container location; and, (e) Other limited driver interface as defined by User.

Also, multiple user vehicle mounted optical sensors can be used to capture video and still images that are available for Customer Service, Operations, Dispatchers and such other user designees to view a live video feed when there is a potential service issue and address the issue with the driver and customer, as needed.

In certain illustrative embodiments, the system and method provides for a variety of pre-defined Use Cases by Line of Business (Commercial, Residential and Industrial) resulting in the end-user being able to review videos and still images, identify, tag (with a red box or other tagging means) and submit to Advanced Reports or such other reporting methods instances relating to one or more of the following occurrences described in FIGS. 7-9.

Management and auditing of Use Cases are more fully explained hereinbelow (such explanations are not all inclusive).

FIG. 10, Picture A includes a sample screenshot where the Chapter (still image/video or image) is displayed on a monitor for the end-user to review under the Use Case "Commercial Overloaded Container". Picture B in FIG. 10 depicts the determination by the end-user that the container/bin is overloaded. As a result, the image is tagged resulting in a highlighted "red-box" (or other designation) around the perimeter of the image. For example, selecting the image for Overloaded Container results a highlighted "Red Box" with the image being sent to report Commercial overages. After reviewing images associated with a Use Case, the end-user "Submits" the image for action to include charging the customer for the overage, notifying the customer of the overage through a proactive warning and notification process and noting the overage incident on the customer's account.

FIG. 11, Picture A includes a sample screenshot where the Chapter (still image/video or image) is displayed on a monitor for the end-user to review under the Use Case "Commercial Open Lid". Picture B in FIG. 11 depicts the determination by the end-user that the commercial container/bin lid is "Open". As a result, the image is tagged resulting in a highlighted "red-box" (or other designation) around the perimeter of the image. For example, proactive notice can be provided to Customer to close lids and charge a fee in jurisdictions allowing open lid fees to eliminate blight, illegal dumping and collection of water in commercial bins. After reviewing images associated with a Use Case, the end-user "Submits" the image for action to include notifying and/or charging the customer for an open lid and noting the open lid incident on the customer's account.

Figure 12:
FIG. 12 is an example of a screen where a Chapter (still image/video or image) is displayed on a monitor for an end-user to review under the Use Case "Commercial PDA" in accordance with an illustrative embodiment of the presently disclosed subject matter.

FIG. 12, Picture A includes a sample screenshot where the Chapter (still image/video or image) is displayed on a monitor for the end-user to review under the Use Case "Commercial PDA". The absence of customer information results in an exception report being created as a suspect account for Billing to review. If FEL Bin service appears in Commercial PDA Audit, this might result from a driver operating an independent FEL service or a customer set-up error by the waste service company.

FIG. 13, Picture A includes a sample screenshot where the Chapter (still image/video or image) is displayed on a monitor for the end-user to review under the Use Case "Commercial Service Level Audit". Picture B in FIG. 13 depicts the determination by the end-user that the customer is receiving service inconsistent with the customer information associated with Picture A. As a result, the image is tagged resulting in a highlighted "red-box" (or other designation) around the perimeter of the image. Because of highlighting the image, Drop-Down Menus allow the end-user to select the size and quality of commercial containers by sub-LOB (MSW, Recycling or Organics) at the service address. After reviewing images associated with the Use Case, the end-user "Submits" the image for action to include notifying Billing and the Customer of the service level discrepancy resulting in either an additional charge or refund.

Figure 14:
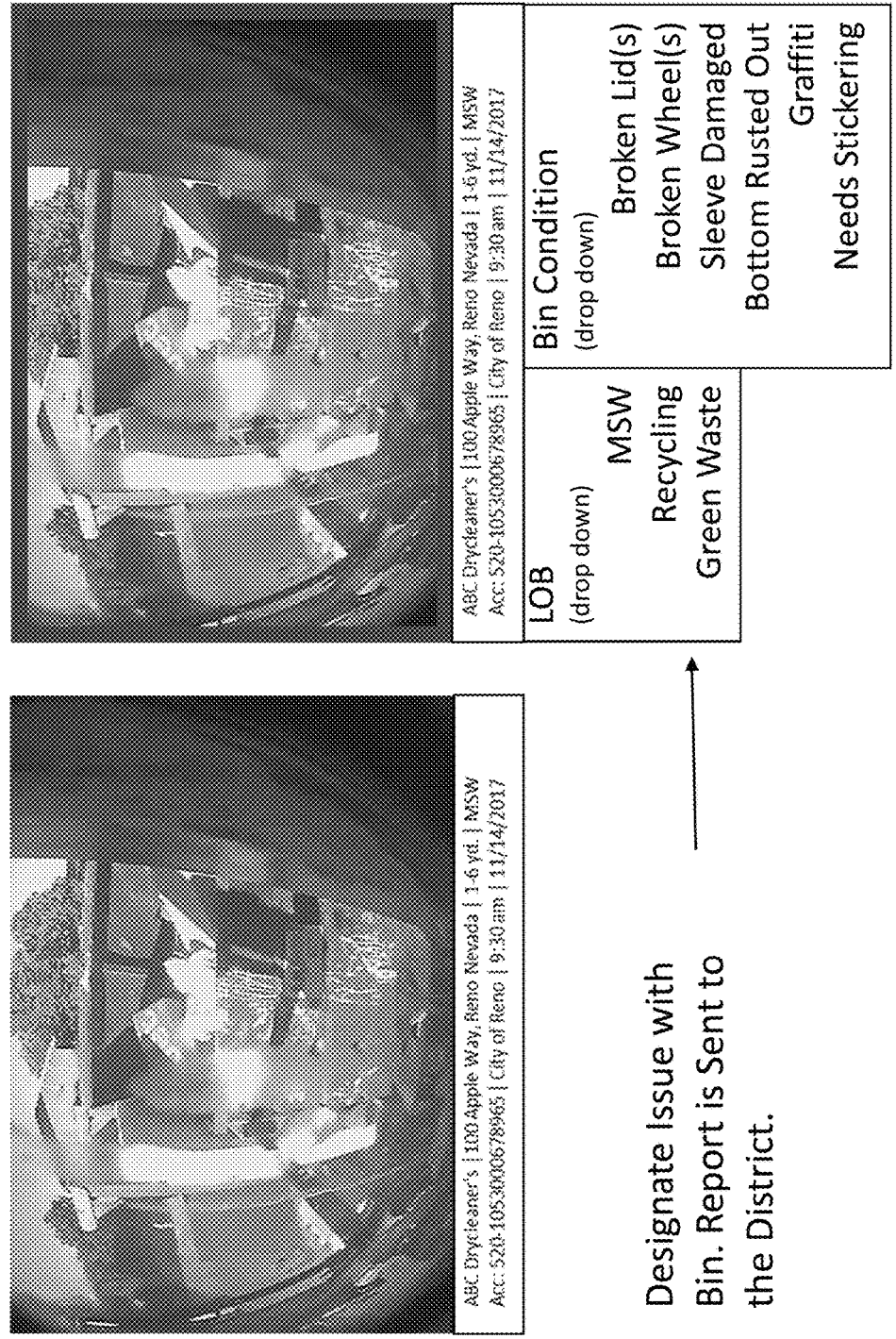
FIG. 14 is an example of a screen where a Chapter (still image/video or image) is displayed on a monitor for an end-user to review under the Use Case "Commercial Damaged Containers" in accordance with an illustrative embodiment of the presently disclosed subject matter.

FIG. 14, Picture A includes a sample screenshot where the Chapter (still image/video or image) is displayed on a monitor for the end-user to review under the Use Case "Commercial Damaged Containers". Picture B in FIG. 14 depicts the determination by the end-user that the container is damaged requiring repairs, swap or removal. As a result, the image is tagged resulting in a highlighted "red-box" (or other designation) around the perimeter of the image. Because of highlighting the image, Drop-Down Menus allow the end-user to select the container sub-LOB (MSW, Recycling, Organics) and noted damage including, but not limited to, broken lid, broken wheel/caster, sleeve damage, bottom rusted/leaking, graffiti, needs stickering, etc. After reviewing images associated with the Use Case, the end-user "Submits" the image for action to include notifying Operations and the Customer of the need for container repair scheduling.

Figure 15:
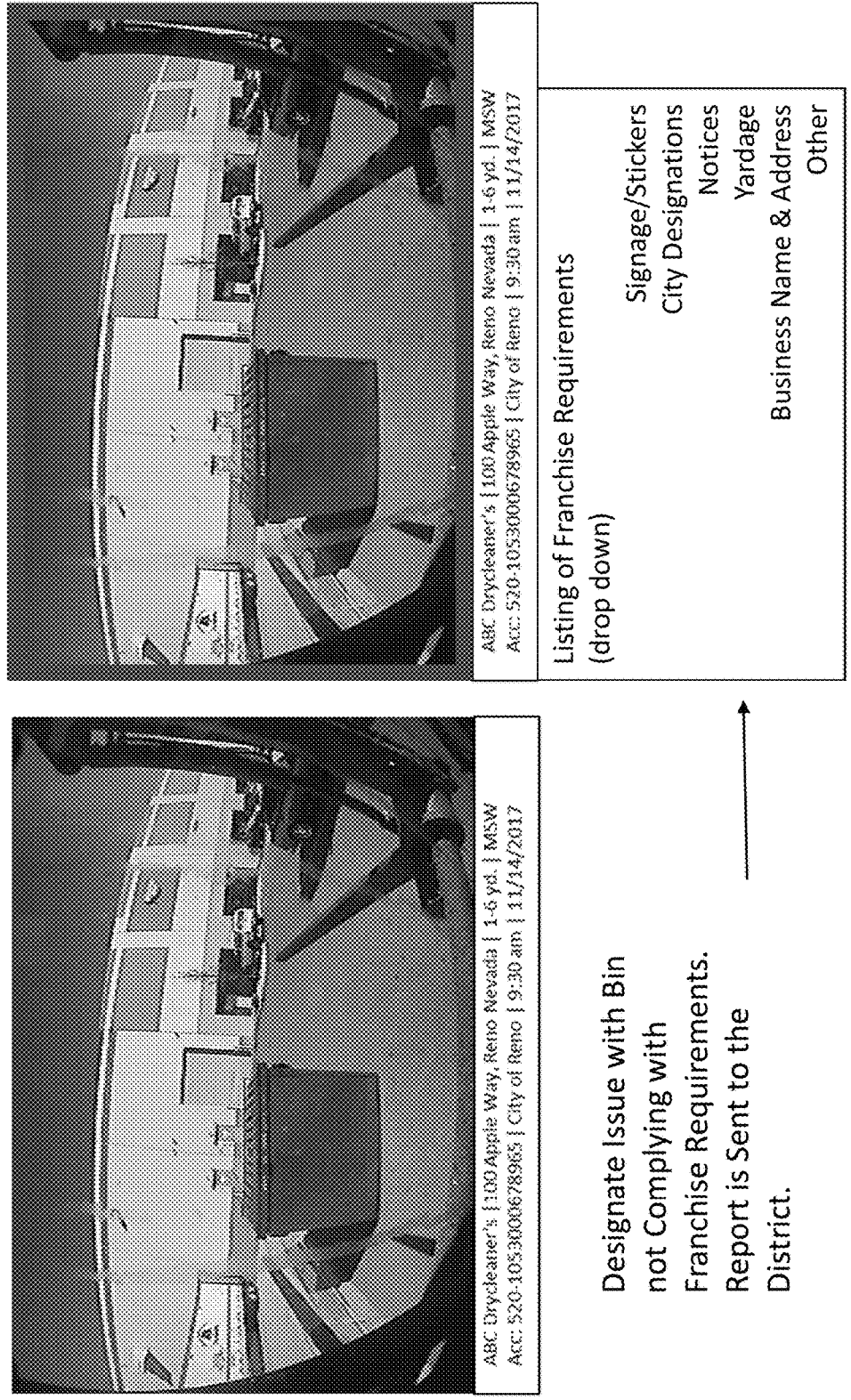
FIG. 15 is an example of a screen where a Chapter (still image/video or image) is displayed on a monitor for an end-user to review under the Use Case "Commercial Franchise Requirements" in accordance with an illustrative embodiment of the presently disclosed subject matter.

FIG. 15, Picture A includes a sample screenshot where the Chapter (still image/video or image) is displayed on a monitor for the end-user to review under the Use Case "Commercial Franchise Requirements". Picture B in FIG. 15 depicts the determination by the end-user that the container does not meet certain franchise requirements. As a result, the image is tagged resulting in a highlighted "red-box" (or other designation) around the perimeter of the image. Because of highlighting the image, Drop-Down Menus allow the end-user to select the franchise requirement deficiencies including, but not limited to, signage/stickers, City designation, notices, container yardage, waste service company name and telephone number, etc. After reviewing images associated with the Use Case, the end-user "Submits" the image for action to include notifying Operations of the need to comply with franchise and regulatory requirements.

Figure 16:
FIG. 16 is an example of a screen where a Chapter (still image/video or image) is displayed on a monitor for an end-user to review under the Use Case "Proactive Commercial Customer Notifications" in accordance with an illustrative embodiment of the presently disclosed subject matter.

The images in FIG. 16 include sample screenshots where the Chapter (still image/video or image) is displayed on a monitor for the end-user to review under the Use Case "Proactive Commercial Customer Notifications". The images in FIG. 16 depict the determination by the end-user that the customer service address has service related issues associated with open lids, litter, overages and blocked container. As a result, the image is tagged resulting in a highlighted "red-box" (or other designation) around the perimeter of the image. Because of highlighting the image, Drop-Down Menus allow the end-user to select the Proactive Customer Notifications. After reviewing images associated with the Use Case, the end-user "Submits" the image for action to include notifying the customer of the need to comply with waste service company's service requirements.

Figure 17:
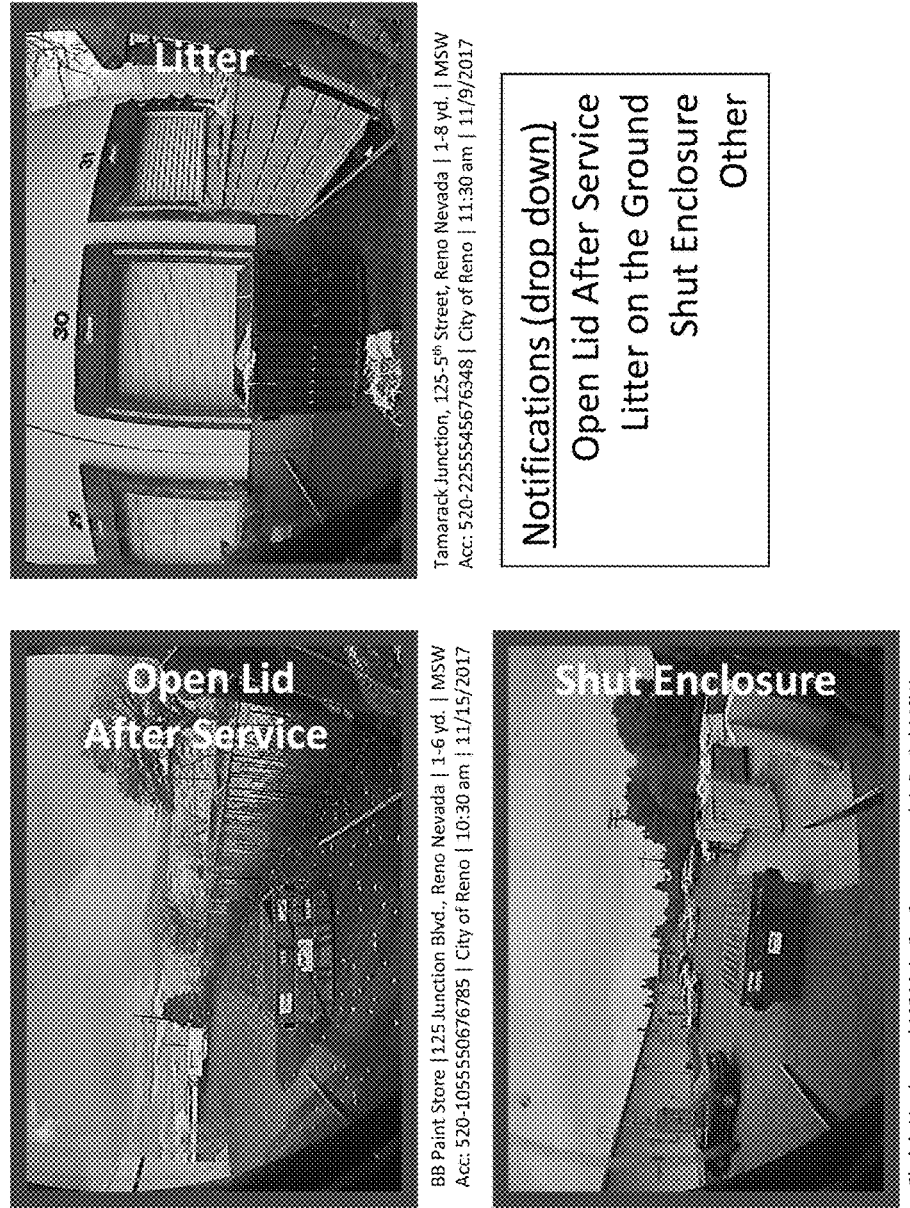
FIG. 17 is an example of a screen where a Chapter (still image/video or image) is displayed on a monitor for an end-user to review under the Use Case "Proactive Commercial Driver/Ops Notifications" in accordance with an illustrative embodiment of the presently disclosed subject matter.

The images in FIG. 17 include sample screenshots where the Chapter (still image/video or image) is displayed on a monitor for the end-user to review under the Use Case "Proactive Commercial Driver/Ops Notifications". The images in FIG. 17 depict the determination by the end-user that the customer service address has service failure related issues associated with the driver failing to close lids, close enclosures, little/blight, etc. As a result, the image is tagged resulting in a highlighted "red-box" (or other designation) around the perimeter of the image. Because of highlighting the image, Drop-Down Menus allow the end-user to select the Proactive Driver/Ops Notifications. After reviewing images associated with the Use Case, the end-user "Submits" the image for action to include notifying Operations of the need for the driver to comply with waste company's service requirements. The issue is designated with the driver, and an operations report is created and sent to the district for purposes of future driver coaching.

The images in FIG. 18 include sample screenshots where the Chapter (still image/video or image) is displayed on a monitor for the end-user to review under the Use Case "Commercial Contamination of Recycling and Organics". After reviewing a certain length (in this case, 16 seconds) of video image in Video A-Hopper Camera Video Image, FIG. 18 depicts the determination by the end-user that the commercial customer has either contaminated its organics bin or recycling bin with prohibited waste. Picture B-Front Camera Still Image depicts the customer's service bin prior to service. As a result, the video and still image are tagged resulting in a highlighted "red-box" (or other designation) around the perimeter of the images. After reviewing images associated with the Use Case, the end-user "Submits" the video and still image for action to include notifying Operations, Billing and the Customer to reduce contamination and ensure compliance with waste company's service requirements.

The images in FIG. 19 include sample screenshots where the Chapter (still image/video or image) is displayed on a monitor for the end-user to review under the Use Case "Commercial Open-Market Sales Opportunity". After reviewing 30-60 seconds of video image from the Front Camera depicted in Picture A, FIG. 19 depicts the determination by the end-user that there are open market sales opportunities and competitor containers within the waste company's service area and routes. As a result, the video and still image are tagged resulting in a highlighted "red-box" (or other designation) around the perimeter of the images. After reviewing images associated with the Use Case, the end-user "Submits" the video and still image for action to include notifying Sales and Operations to attract additional customers within the waste company's service area resulting in improved density and routing efficiencies.

The images in FIG. 20 include sample screenshots where the Chapter (still image/video or image) is displayed on a monitor for the end-user to review under the Use Case "Commercial Franchise Infringement (Poaching)". After reviewing 30-60 seconds of video image from the Front Camera depicted in Picture A, FIG. 20 depicts the determination by the end-user that there are franchise violations and encroachment by competitors unauthorized to provide waste services within the municipal franchise system. As a result, the video and still image are tagged resulting in a highlighted "red-box" (or other designation) around the perimeter of the images. After reviewing images associated with the Use Case, the end-user "Submits" the video and still image for action to include notifying Operations, Sales and Legal to abate competitor franchise infringement.

The images in FIG. 21 include sample screenshots where the Chapter (still image/video or image) is displayed on a monitor for the end-user to review under the Use Case "Commercial Ancillary Fee Audit". After reviewing some length (in this case, 30-60 seconds) of video image from the Front Camera depicted in Picture A, FIG. 21 depicts the determination by the end-user that there are ancillary services being provided to the waste company's customers without the customer being charged for ancillary services. As a result, the video and still image are tagged resulting in a highlighted "red-box" (or other designation) around the perimeter of the images. After reviewing images associated with the Use Case, the end-user "Submits" the video and still image for action to include notifying Billing and the Customer resulting in either an additional charge or refund.

Figure 22:
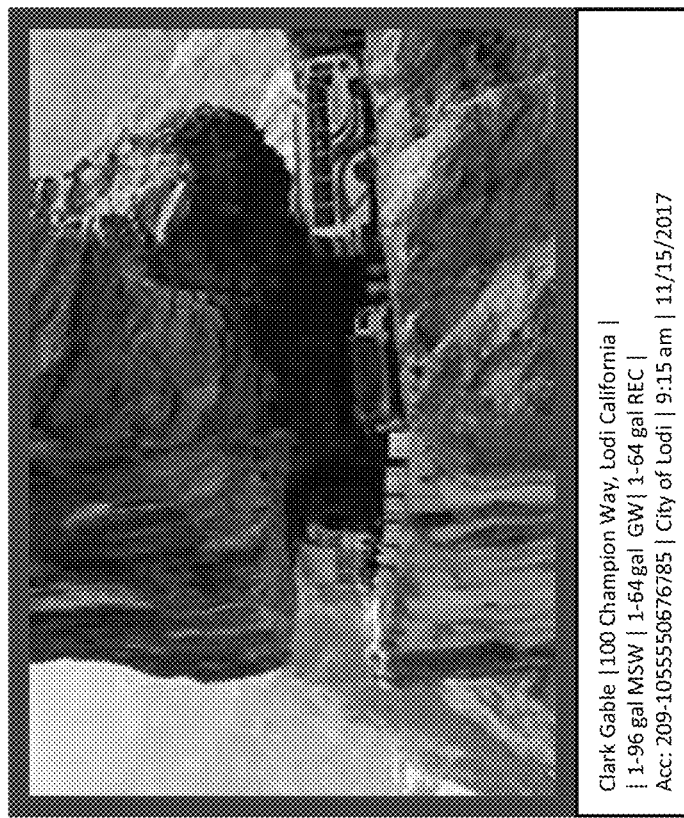
FIG. 22 is an example of a screen where a Chapter (still image/video or image) is displayed on a monitor for an end-user to review under the Use Case "Commercial Dangerous Stops" in accordance with an illustrative embodiment of the presently disclosed subject matter.

The image in FIG. 22 is a sample screenshot where the Chapter (still image/video or image) is displayed on a monitor for the end-user to review under the Use Case "Commercial Dangerous Stops". After reviewing some length (in this case, 30-60 seconds) of video image from the Front Camera depicted in Video A, FIG. 22, depicts the determination by the end-user that there exist dangerous conditions within the customer's service location including, but not limited to: unsafe enclosures, low overhead wires, hard to service, unsafe backing, unsafe bin placement, etc. As a result, the video and still image are tagged resulting in a highlighted "red-box" (or other designation) around the perimeter of the images. After reviewing images associated with the Use Case, the end-user "Submits" the video and still image for action to include notifying Sales, Operations and the Customer to ensure the unsafe stop is corrected. Operations and Sales can work together to find safer servicing solutions regarding enclosures, overhead wires, hard to service, backing, bin placement, etc.

Figure 23:
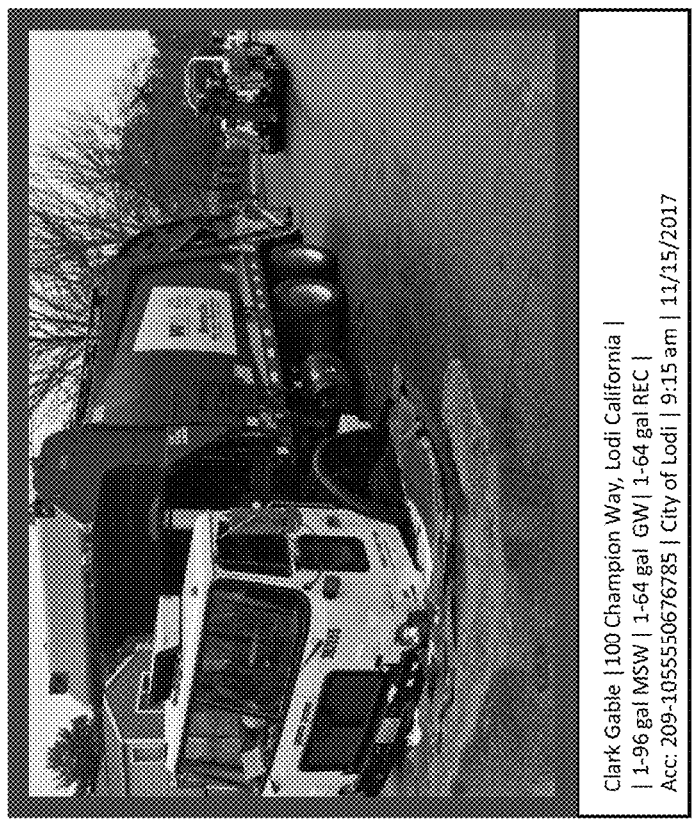
FIG. 23 is an example of a screen where a Chapter (still image/video or image) is displayed on a monitor for an end-user to review under the Use Case "Commercial Property Damage" in accordance with an illustrative embodiment of the presently disclosed subject matter.

The image in FIG. 23 is a sample screenshot where the Chapter (still image/video or image) is displayed on a monitor for the end-user to review under the Use Case "Commercial Property Damage". After reviewing some length (in this case, 30-60 seconds) of video image from the Front Camera depicted in Video A, FIG. 23 depicts the determination by the end-user that there servicing of the customer's bin/container resulted in property damage. As a result, the video and still image are tagged resulting in a highlighted "red-box" (or other designation) around the perimeter of the images. After reviewing images associated with the Use Case, the end-user "Submits" the video and still image for action to include notifying Operations, Safety, Risk Management and the Customer to ensure the property damage is corrected as well as determining causation on property damage claims.

Figure 24:
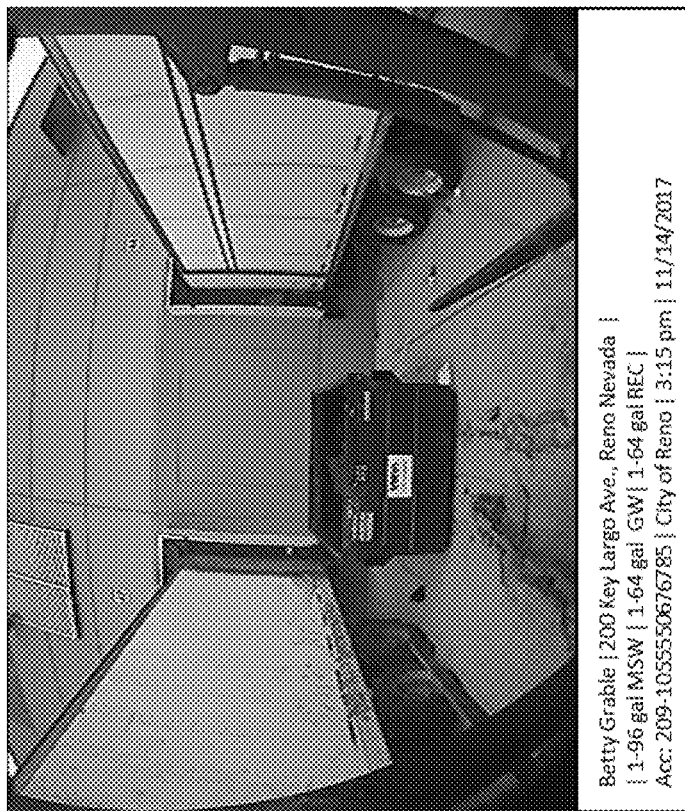
FIG. 24 is an example of a screen where a Chapter (still image/video or image) is displayed on a monitor for an end-user to review under the Use Case "HOC-Haul or Call (Container Unserviceable)" in accordance with an illustrative embodiment of the presently disclosed subject matter.

The image in FIG. 24 is a sample screenshot where the Chapter (still image/video or image) is displayed on a monitor for the end-user to review under the Use Case "HOC-Haul or Call (Container Unserviceable)". The HOC Use Case is initiated by waste vehicle driver because the container/bin deemed unserviceable. Thereafter, the end-user reviews some length (in this case, 30-60 seconds) of video image from the Front Camera depicted in Video A, FIG. 24 and confirms the determination that the container/bin is unserviceable. As a result, the video and still image are tagged resulting in a highlighted "red-box" (or other designation) around the perimeter of the images. After reviewing images associated with the Use Case, the end-user "Submits" the video and still image for action to include notifying Operations, Customer Service and the Customer to ensure the issues associated with the container/bin being unserviceable is corrected.

Figure 25:
FIG. 25 is an example of a screen where a Chapter (still image/video or image) is displayed on a monitor for an end-user to review under the Use Case "Commercial Service Confirmation-Driver Initiated" in accordance with an illustrative embodiment of the presently disclosed subject matter.

The image in FIG. 25 is a sample screenshot where the Chapter (still image/video or image) is displayed on a monitor for the end-user to review under the Use Case "Commercial Service Confirmation-Driver Initiated". The Service Confirmation is initiated by waste vehicle driver pursuant to a service confirmation request. Thereafter, the Service Confirmation (including a still image and/or video) is sent to Customer Service, Operations and the Customer via email and text. The image and/or video can be captured with Lat/Lon and Customer Information, and email and/or text can be sent to Customer Service, Dispatch, and the District to designate issue with Driver/Ops. A Report can be created and sent to the District for DMs/RMs to coach the driver.

Figure 26:
FIG. 26 is an example of a screen where a Chapter (still image/video or image) is displayed on a monitor for an end-user to review under the Use Case "Commercial Bin Delivery-New Customer" in accordance with an illustrative embodiment of the presently disclosed subject matter.

The image in FIG. 26 is a sample screenshot where the Chapter (still image/video or image) is displayed on a monitor for the end-user to review under the Use Case "Commercial Bin Delivery-New Customer". The Bin Delivery is initiated by bin delivery driver by selecting a button on the OBC and DVR with the bin delivery confirmation (including still image and/or video) being sent to Customer Service, Operations and the Customer via email and text. Additionally, the bin delivery driver establishes a verified service address through latitude/longitude by confirming delivery through the OBC and DVR.

Figure 27:
FIG. 27 is an example of a screen where a Chapter (still image/video or image) is displayed on a monitor for an end-user to review under the Use Case "Commercial Bin Delivery-Existing Customer" in accordance with an illustrative embodiment of the presently disclosed subject matter.

The image in FIG. 27 is a sample screenshot where the Chapter (still image/video or image) is displayed on a monitor for the end-user to review under the Use Case "Commercial Bin Delivery-Existing Customer". The Bin Delivery, Swap, Repair and/or Removal is initiated by bin delivery driver by selecting a button on the OBC and DVR with the bin delivery/swap/repair/removal confirmation being sent to Customer Service, Operations and the Customer via email and text. Additionally, the bin delivery driver establishes a verified service address through latitude/longitude by confirming delivery through the OBC and DVR.

FIG. 28, Picture A is a sample screenshot where the Chapter (still image/video or image) is displayed on a monitor for the end-user to review under the Use Case "Residential Overloaded Container". Picture B in FIG. 28 depicts the determination by the end-user that the container/bin is overloaded. As a result, the image is tagged resulting in a highlighted "red-box" (or other designation) around the perimeter of the image. A selected image based on Overloaded status results in a "Red" Box and a Report being sent for Residential Overage. Depending on the franchise, customer may also be sent a warning and/or charge. All Residential Overloaded Containers can be viewed from, e.g., the MSW Route Right Side Camera. After reviewing images associated with a Use Case, the end-user "Submits" the image for action to include charging the customer for the overage, notifying the customer of the overage through a proactive warning and notification process and noting the overage incident on the customer's account.

Figure 29:
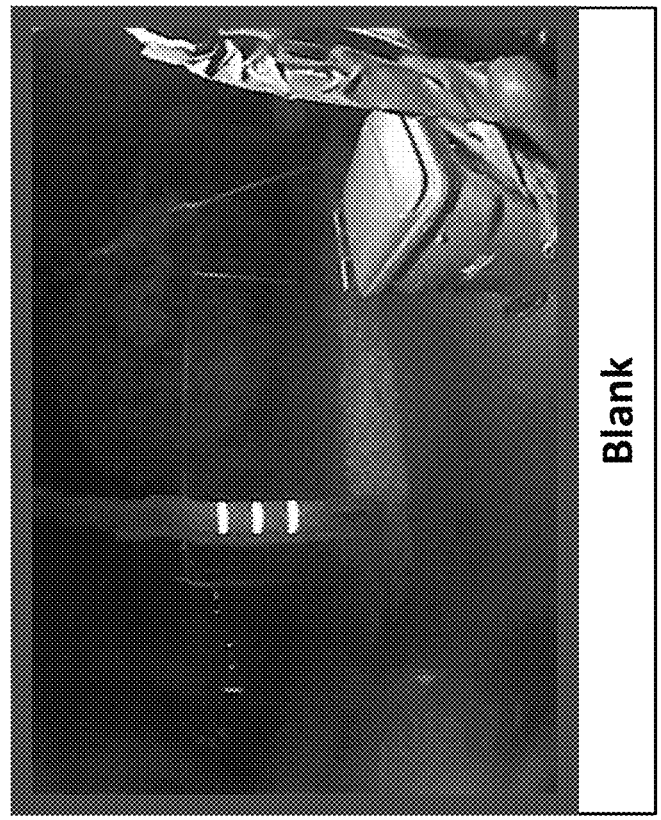
FIG. 29 is an example of a screen where a Chapter (still image/video or image) is displayed on a monitor for an end-user to review under the Use Case "Residential PDA" in accordance with an illustrative embodiment of the presently disclosed subject matter.

FIG. 29, Picture A is a sample screenshot where the Chapter (still image/video or image) is displayed on a monitor for the end-user to review under the Use Case "Residential Parcel Data Audit". The absence of customer information results in an exception report being created as a suspect account for Billing to review further. If Residential container service appears in the Residential Parcel Data Audit, this might result from a homeowner purchasing a home with a waste container in the garage and failed to contact the waste service company to set up service. Unfortunately, the homeowner may have acquired a container improperly or a customer was improperly setup for service by the waste service company resulting in insufficient routing information. Residential Parcel Data Audits can be performed on a daily basis with a Report sent to Billing to determine if the Customer is in Mid America System. If not, the Customer is sent a notice and added to Billing and Routing. This eliminates the need for Corporate sponsored Parcel Data Audits and field audits by Pricing, Public Sector Solutions, Ops and other 3rd Parties used to accomplish Parcel Data Audits.

FIG. 30, Picture A is a sample screenshot where the Chapter (still image/video or image) is displayed on a monitor for the end-user to review under the Use Case "Residential Service Level Audit". Picture B in FIG. 30 depicts the determination by the end-user that the customer is receiving service inconsistent with the customer information associated with Picture A. As a result, the image is tagged resulting in a highlighted "red-box" (or other designation) around the perimeter of the image. Because of highlighting the image, Drop-Down Menus allow the end-user to select the size and quality of commercial containers by sub-LOB (MSW, Recycling, Green Waste) at the service address. After reviewing images associated with the Use Case, the end-user "Submits" the image for action to include notifying Billing and the Customer of the service level discrepancy resulting in either an additional charge or refund.

FIG. 31, Picture A is a sample screenshot where the Chapter (still image/video or image) is displayed on a monitor for the end-user to review under the Use Case "Residential Open Lid". Picture B in FIG. 31 depicts the determination by the end-user that the residential container lid is "Open". As a result, the image is tagged resulting in a highlighted "red-box" (or other designation) around the perimeter of the image. After reviewing images associated with a Use Case, the end-user "Submits" the image for action to include notifying and/or charging the customer for an open lid and noting the open lid incident on the customer's account. Selection based on Open Lid results in a "Red" Box and a Report being sent for Residential Open Lid and either a charge or notification. Open Lids contribute to increased disposal cost, litter and other service issues.

FIG. 32, Picture A is a sample screenshot where the Chapter (still image/video or image) is displayed on a monitor for the end-user to review under the Use Case "Residential Damaged Containers". Picture B in FIG. 32 depicts the determination by the end-user that the container is damaged requiring repairs, swap or removal. As a result, the image is tagged resulting in a highlighted "red-box" (or other designation) around the perimeter of the image. Because of highlighting the image, Drop-Down Menus allow the end-user to select the container sub-LOB (MSW, Recycling, Green Waste) and noted damage including, but not limited to, broken lid, broken wheel(s), body damage, space bar, graffiti, needs stickering, etc. After reviewing images associated with the Use Case, the end-user "Submits" the image for action to include notifying Operations and the Customer of the need for container repair scheduling.

FIG. 33, Picture A is a sample screenshot where the Chapter (still image/video or image) is displayed on a monitor for the end-user to review under the Use Case "Residential Franchise Requirements". Picture B in FIG. 33 depicts the determination by the end-user that the container does not meet certain franchise requirements. As a result, the image is tagged resulting in a highlighted "red-box" (or other designation) around the perimeter of the image. Because of highlighting the image, Drop-Down Menus allow the end-user to select the franchise requirement deficiencies including, but not limited to, signage (e.g., residential), city designation, notices, container color, waste service company name and telephone number, permissible items allowed in SS and Green Waste Services, etc. After reviewing images associated with the Use Case, the end-user "Submits" the image for action to include notifying Operations of the need to comply with franchise and regulatory requirements.

FIG. 34, Pictures A and B are sample screenshots where the Chapter (still image/video or image) is displayed on a monitor for the end-user to review under the Use Case "Residential Extra Bags-Extra Service". FIG. 34 depicts the determination by the end-user that the residential customer is setting out Extra Bags or receiving Extra Service either through a municipal franchise system or through subscription service. Whether the service is at no charge, the customer is allowed "X-number of bags per calendar year or the customer is charged per bag, the extra bags-extra service is tracked. As a result, the image is tagged resulting in a highlighted "red-box" (or other designation) around the perimeter of the image. After reviewing images associated with the Use Case, the end-user "Submits" the image for action to include notifying Billing and the Customer of the Extra Bags-Extra Service. This eliminates tagging requirements and the need to send coupons to Customers.

Figure 35:
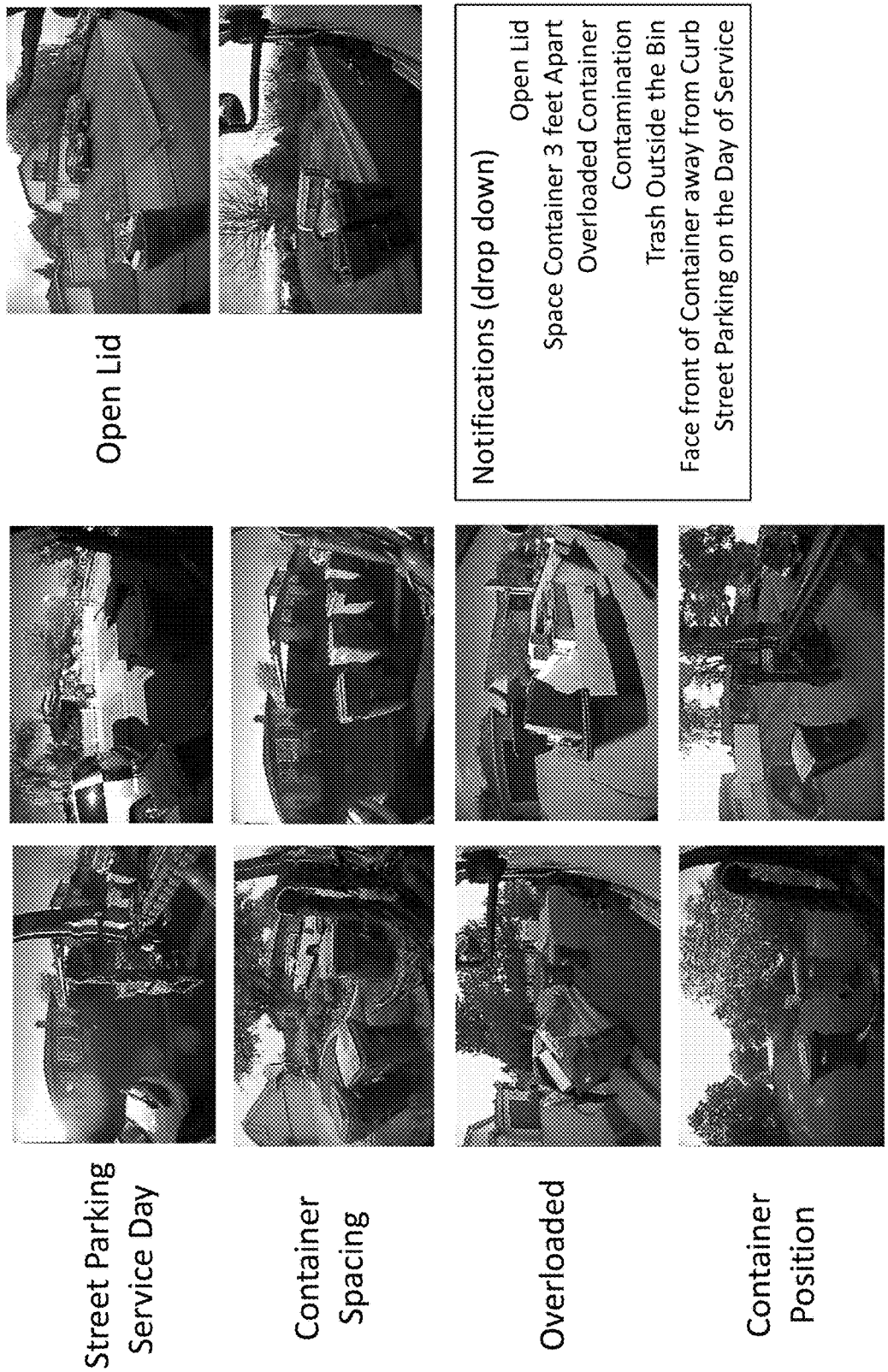
FIG. 35 is an example of a screen where a Chapter (still image/video or image) is displayed on a monitor for an end-user to review under the Use Case "Residential Proactive Customer Notification" in accordance with an illustrative embodiment of the presently disclosed subject matter.

The images in FIG. 35 include sample screenshots where the Chapter (still image/video or image) is displayed on a monitor for the end-user to review under the Use Case "Residential Proactive Customer Notification". The images in FIG. 35 depict the determination by the end-user that the customer service address has service related issues associated with open lids, container spacing, overloaded container, contamination, trash outside the bin, face front of container away from bin, street parking on the day of service, etc. As a result, the images can be tagged resulting in a highlighted "red-box" (or other designation) around the perimeter of the image. Because of highlighting the image, Drop-Down Menus allow the end-user to select the Proactive Customer Notifications. After reviewing images associated with the Use Case, the end-user "Submits" the image for action to include notifying the customer of the need to comply with waste service company's service requirements.

Figure 36:
FIG. 36 is an example of a screen where a Chapter (still image/video or image) is displayed on a monitor for an end-user to review under the Use Case "Proactive Residential Driver/Ops Notifications" in accordance with an illustrative embodiment of the presently disclosed subject matter.

The images in FIG. 36 include sample screenshots where the Chapter (still image/video or image) is displayed on a monitor for the end-user to review under the Use Case "Proactive Residential Driver/Ops Notifications". The images in FIG. 36 depict the determination by the end-user that the customer service address has service failure related issues associated with the driver failing to leave container upright, litter, open lid after service, carts askew, etc. As a result, the image can be tagged resulting in a highlighted "red-box" (or other designation) around the perimeter of the image. Because of highlighting the image, Drop-Down Menus allow the end-user to select the Proactive Driver/Ops Notifications. After reviewing images associated with the Use Case, the end-user "Submits" the image for action to include notifying Operations of the need for the driver to comply with waste company's service requirements.

Figure 37:
FIG. 37 is an example of a screens where a Chapter (still image/video or image) is displayed on a monitor for an end-user to review under the Use Case "Residential Service Confirmation-Driver Initiated" in accordance with an illustrative embodiment of the presently disclosed subject matter.

The image in FIG. 37 includes a sample screenshot where the Chapter (still image/video or image) is displayed on a monitor for the end-user to review under the Use Case "Residential Service Confirmation-Driver Initiated". The Service Confirmation is initiated by waste vehicle driver pursuant to a service confirmation request. Thereafter, the Service Confirmation is sent to Customer Service, Operations and the Customer via email and text. As noted in the earlier filing, the image is date and time stamped verifying the date and time of the service confirmation.

Figure 38:
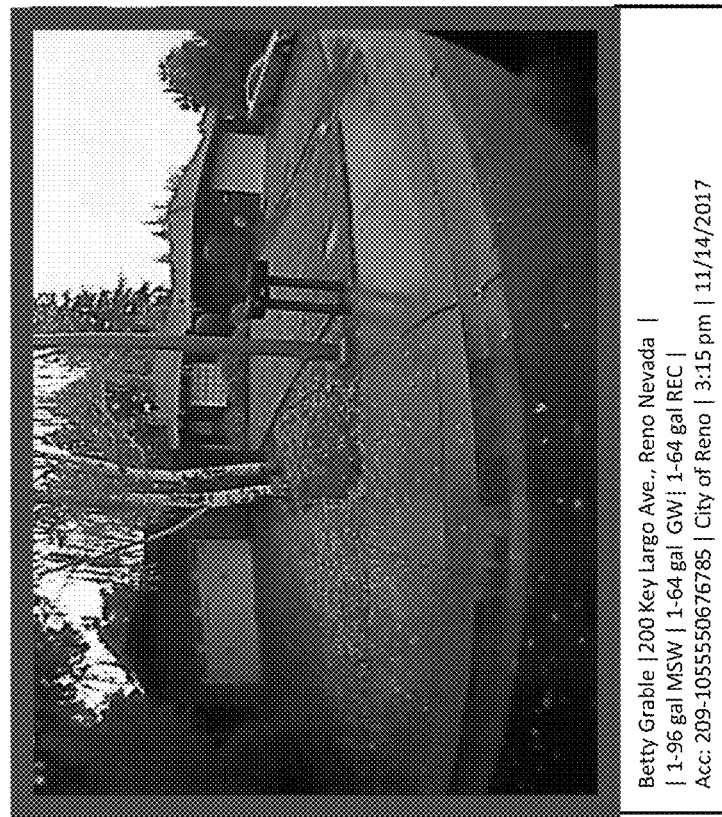
FIG. 38 is an example of a screen where a Chapter (still image/video or image) is displayed on a monitor for an end-user to review under the Use Case "Residential NOT-OUT-Driver Initiated" in accordance with an illustrative embodiment of the presently disclosed subject matter.

The image in FIG. 38 includes a sample screenshot where the Chapter (still image/video or image) is displayed on a monitor for the end-user to review under the Use Case "Residential NOT-OUT-Driver Initiated". The driver, upon arriving at a residential service address, determines the container is Not-Out and unavailable for service. The driver selects the Not-Out button on the OBC and DVR resulting in a Chapter or still image. The Not-Out image is sent to Customer Service, Operations and the Customer via email and text. As noted in the earlier filing, the image is date and time stamped verifying the date and time of attempted service. This can eliminate the ongoing debate of whether or not the Residential Container was "OUT" or "NOT OUT." Images are captured in real-time and sent to Customer Service.

Figure 39:
FIG. 39 is an example of a screen where a Chapter (still image/video or image) is displayed on a monitor for an end-user to review under the Use Case "Residential Container Delivery-New Customer" in accordance with an illustrative embodiment of the presently disclosed subject matter.

The image in FIG. 39 includes a sample screenshot where the Chapter (still image/video or image) is displayed on a monitor for the end-user to review under the Use Case "Residential Container Delivery-New Customer". The Container Delivery is initiated by container delivery driver by selecting a button on the OBC and DVR with the container delivery confirmation (including a still image and/or video) being sent to Customer Service, Operations and the Customer via email and text. Deliveries are captured in real time. Additionally, the container delivery driver establishes a verified service address through latitude/longitude by confirming delivery through the OBC and DVR.

Figure 40:
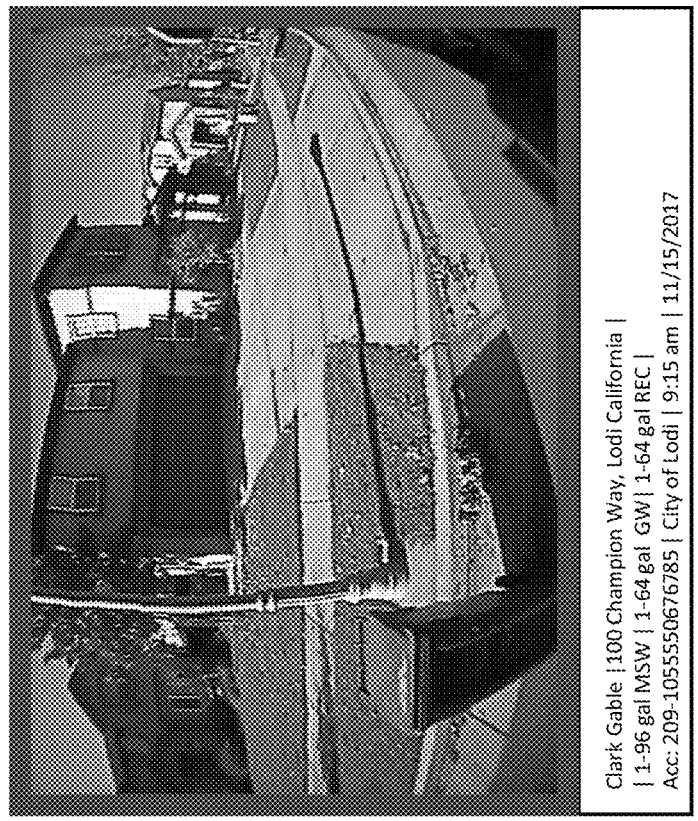
FIG. 40 is an example of a screen where a Chapter (still image/video or image) is displayed on a monitor for an end-user to review under the Use Case "Residential Container Delivery-Existing Customer" in accordance with an illustrative embodiment of the presently disclosed subject matter.

The image in FIG. 40 includes a sample screenshot where the Chapter (still image/video or image) is displayed on a monitor for the end-user to review under the Use Case "Residential Container Delivery-Existing Customer". The Container Delivery, Swap, Repair and/or Removal is initiated by container delivery driver by selecting a button on the OBC and DVR with the container delivery/swap/repair/removal confirmation (including a still image and/or video) being sent to Customer Service, Operations and the Customer via email and text. Additionally, the container delivery driver reestablishes a verified service address through latitude/longitude by confirming delivery through the OBC and DVR. Swaps, repairs, and removals are captured in real-time with image sent to the Customer, Customer Service and Operations.

Figure 41:
FIG. 41 is an example of a screen where a Chapter (still image/video or image) is displayed on a monitor for an end-user to review under the Use Case "Residential Bulky Collection (Flatbeds & Rear Loaders)" in accordance with an illustrative embodiment of the presently disclosed subject matter.

FIG. 41 includes a sample screenshot where the Chapter (still image/video or image) is displayed on a monitor for the end-user to review under the Use Case "Residential Bulky Collection (Flatbeds & Rear Loaders)". FIG. 41 depicts the determination by the end-user that the residential customer is receiving Bulky Collection service either through a municipal franchise system or through subscription service. Whether the service is at no charge, the customer is allowed "X-number of yards, bags, appliances and/or other Bulky Waste", the Bulky Waste is tracked. As a result, the image is tagged resulting in a highlighted "red-box" (or other designation) around the perimeter of the image. After reviewing images associated with the Use Case, the end-user "Submits" the image for action to include notifying Billing and the Customer of the Bulky Pick-Up. Bulky collections are captured in real-time with items and quantity being recorded for allotment, overages and additional charge.

Figure 42:
FIG. 42 is an example of a screen where a Chapter (still image/video or image) is displayed on a monitor for an end-user to review under the Use Case "Residential Contamination of Single Stream Recycling and Organics" in accordance with an illustrative embodiment of the presently disclosed subject matter.

The image in FIG. 42 includes a sample screenshot where the Chapter (still image/video or image) is displayed on a monitor for the end-user to review under the Use Case "Residential Contamination of Single Stream Recycling and Organics". After reviewing some length (in this case, 16 seconds) of video image in Video A-Hopper Camera Video Image, FIG. 42 depicts the determination by the end-user that the residential customer has either contaminated its single stream recycling container or organics container with prohibited waste. A Front Camera Still Image depicts the customer's service container prior to service. As a result, the video and still image can be tagged resulting in a highlighted "red-box" (or other designation) around the perimeter of the images. After reviewing images associated with the Use Case, the end-user "Submits" the video and still image for action to include notifying Operations, Billing and the Customer to reduce contamination and ensure compliance with waste company's service requirements.

Figure 43:
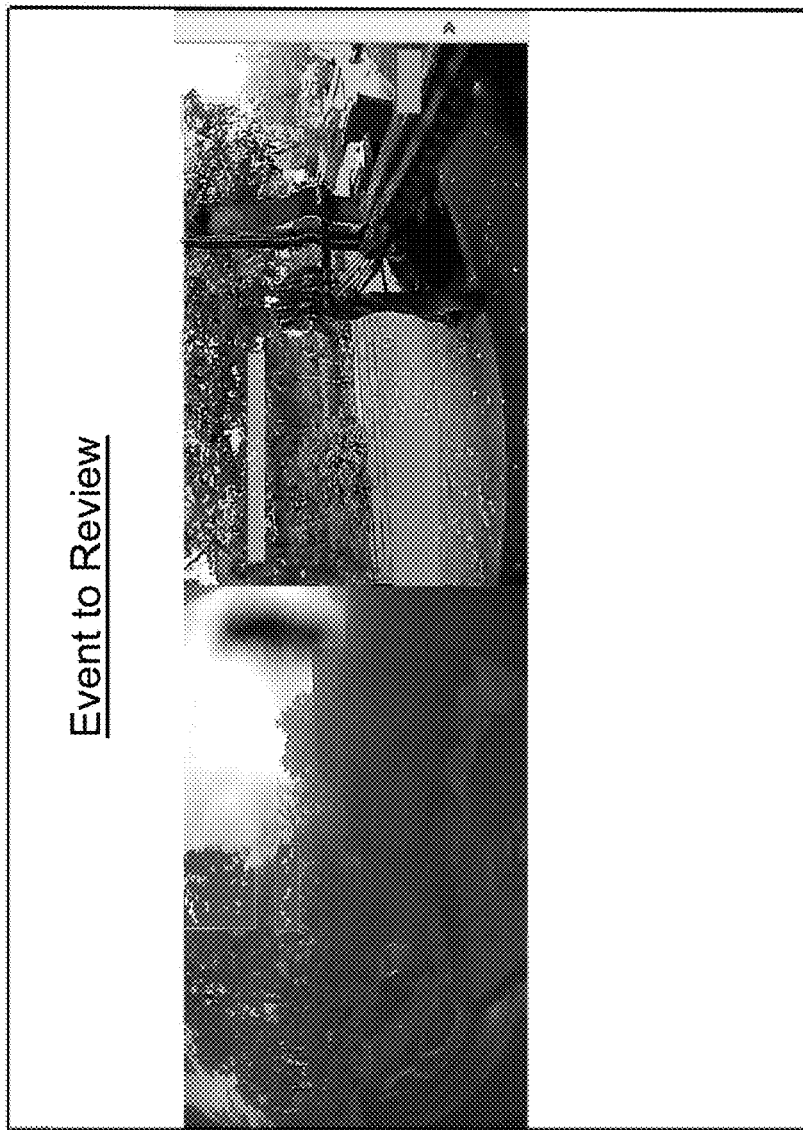
FIG. 43 is an example of a screen where a Chapter (still image/video or image) is displayed on a monitor for an end-user to review under the Use Case "Residential Ancillary Fee Audit" in accordance with an illustrative embodiment of the presently disclosed subject matter.

The image in FIG. 43 includes a sample screenshot where the Chapter (still image/video or image) is displayed on a monitor for the end-user to review under the Use Case "Residential Ancillary Fee Audit". After reviewing some length (in this case, 30-60 seconds) of video image from the Front Camera depicted in Video A, FIG. 43 depicts the determination by the end-user that there are ancillary services being provided to the waste company's customers without the customer being charged for ancillary services. As a result, the video and still image can be tagged resulting in a highlighted "red-box" (or other designation) around the perimeter of the images. After reviewing images associated with the Use Case, the end-user "Submits" the video and still image for action to include notifying Billing and the Customer resulting in either an additional charge or refund.

The images in FIG. 44 include sample screenshots where the Chapter (still image/video or image) is displayed on a monitor for the end-user to review under the Use Case "Residential Dangerous Stops". After reviewing some length (in this case, 30-60 seconds) of video image from the Front Camera depicted in Video A, FIG. 44 depicts the determination by the end-user that there exist dangerous conditions within the customer's service location. As a result, the video and still image are tagged (Video B) resulting in a highlighted "red-box" (or other designation) around the perimeter of the images. After reviewing images associated with the Use Case, the end-user "Submits" the video and still image for action to include notifying Sales, Operations and the Customer to ensure the unsafe stop is corrected.

The images in FIG. 45 include sample screenshots where the Chapter (still image/video or image) is displayed on a monitor for the end-user to review under the Use Case "Residential Property Damage". After reviewing some length (in this case, 30-60 seconds) of video image from the Front Camera depicted in Video A, FIG. 45 depicts the determination by the end-user that there servicing of the residential customer's container resulted in property damage. As a result, the video and still image are tagged (Video B) resulting in a highlighted "red-box" (or other designation) around the perimeter of the images. After reviewing images associated with the Use Case, the end-user "Submits" the video and still image for action to include notifying Operations, Safety, Risk Management and the Customer to ensure the property damage is corrected.

The images in FIG. 46 include sample screenshots where the Chapter (still image/video or image) is displayed on a monitor for the end-user to review under the Use Case "Waste Service Fleet Soiled Windshields, Inoperable Wipers/Cameras". During the process of reviewing Use Cases and otherwise managing the system in real-time, end-users are tasked with ensuring optical sensors are capturing images unobstructed or the optical sensors are operating unabated and continuously recording images. FIG. 46 depicts the determination by the end-user that there are visual or mechanical obstructions resulting in poor quality recordings. As a result, the video and still image are tagged resulting in a highlighted "red-box" (or other designation) around the perimeter of the images. After reviewing images associated with the Use Case, the end-user "Submits" the video and still image for action to Operations and Maintenance to ensure the video recording obstructions and deficiencies are corrected. Images and videos are viewed on a regular basis to ensure quality. Notice is sent to take action to clean windshields and camera lenses.

FIG. 47 depicts a report screen within Events to Review which provides a process to monitor unavailable images (video and still) under the Use Case "No Image-Heath Assessment and Real-Time Monitoring of Cameras". During the daily startup process and throughout the servicing of waste customers, diagnostic efforts are continuously performed to ensure Chapters are being created on the continuous video feed and images are available for review by the end-user. FIG. 47 depicts a report with the notation for each Chapter, "Missing Picture". As a result, Operations and Maintenance are immediately notified to troubleshoot the deficiency and take corrective action. Health Assessment is run on each OBC, DVR and Optical Sensor to ensure images are being captured and the System is operational for each truck. Immediate action can be taken to ensure uptime is accomplished. Each District is likewise responsible for ensuring the System is operational for each truck as well.

Figure 48:
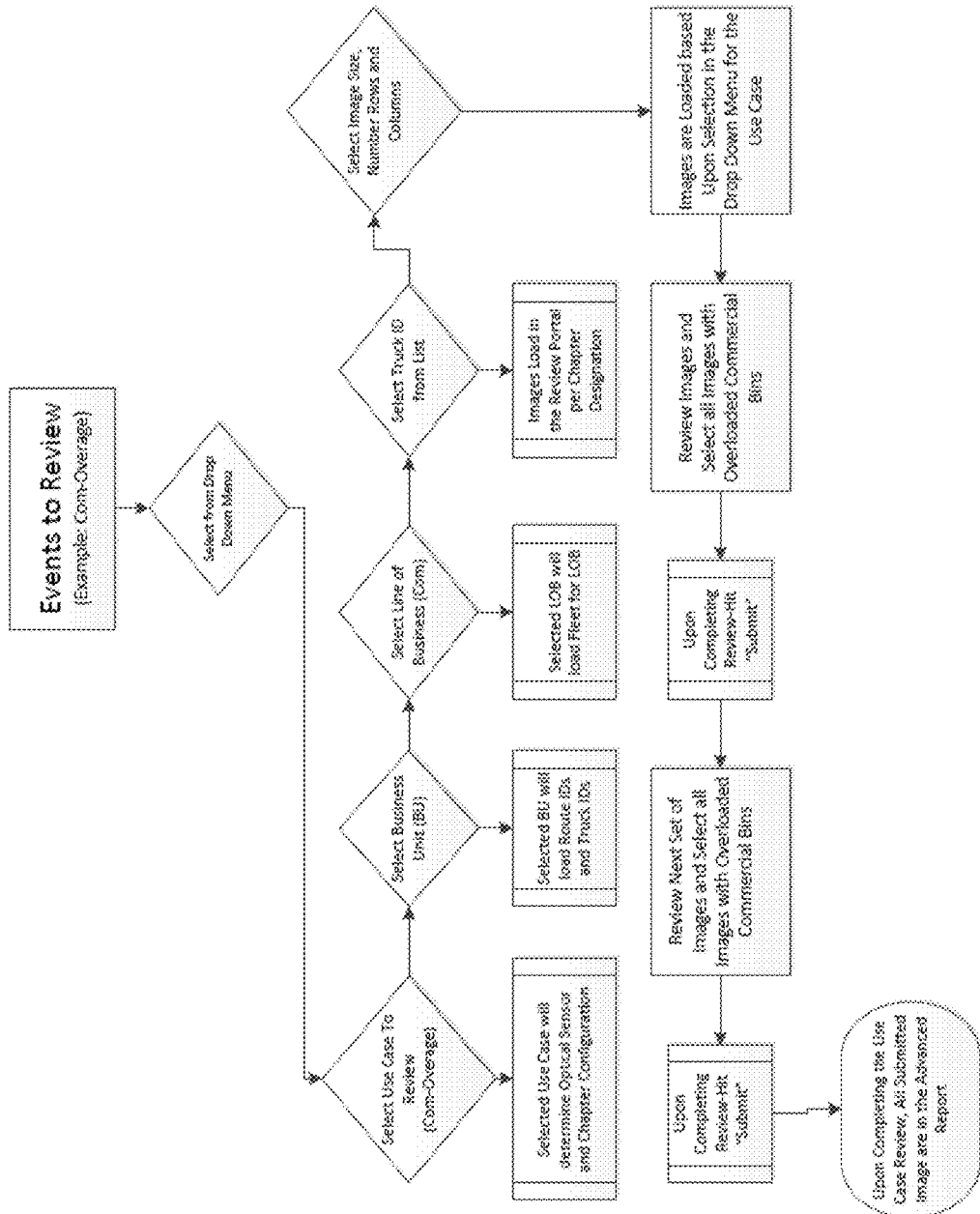
FIG. 48 illustrates a flowchart-decision process for reviewing Chapters within an Events to Review portal in accordance with an illustrative embodiment of the presently disclosed subject matter.

In certain illustrative embodiments, within the Events to Review process and management of Use-Cases facilitated by the end-user, FIG. 48 depicts the flowchart-decision process for reviewing Chapters within the Events to Review portal. The process is followed for each Use-Case as determined by the waste service company in managing its service requirements and customer expectations.

In certain illustrative embodiments, the system and method provide an end-user and/or auditor with the ability to review videos and still images, identify, tag (with a red box or other tagging means) and submit to Advanced Reports or such other reporting methods. A sample of the Advanced Reports are depicted in FIGS. 49-55, which are available for one or more of Operations, Billing, Customer Service, Sales, Safety, Risk Management and ultimately the Customer in the form of a communication (including still images and/or video), proactive notification and/or billing adjustment.

Below is a non-exhaustive listing tied to Use Cases, which are submitted and available in Advanced Reports with such instances relating to one or more of the following occurrences and Use Cases:

(a) Commercial, Residential and Industrial waste services for user customer services;

(b) Overloaded waste containers in all lines of business (commercial, residential and industrial);

(c) Contamination of source separated containers (e.g., residential green waste, residential single stream, commercial recycling and commercial organics);

(d) Open Lids in all lines of business;

(e) Container spacing;

(f) Waste outside the container, bin and roll-off box;

(g) Proper container and bin placement;

(h) Prohibited and contaminated waste;

(i) Damaged containers (e.g. broken lids, broken wheels, sleeve damaged, bottom rusted out, graffiti, needs stickering, missing lids, crack container, leaking container, etc.);

(j) Service Confirmations-Driver Initiated;

(k) HOC or Haul or Call-: Customer accounts, which are unserviceable due to the container or bin being inaccessible, blocked, locked or containing prohibited waste (e.g. contamination, universal waste, electronics, etc.);

(l) Dangerous Stops or Hard to Service Stops;

(m) Property Damage;

(n) Bulky Pick-Up;

(o) Ancillary fee audit with ancillary services defined by User;

(p) Open market sales opportunities, for example, an incentive based program where end-user drivers identify open market competitor containers within User's service area and captures images from the optical sensors, OBC and DVR and submits images for sales to call on opportunities to convert to User.

(q) Competitors poaching or infringing on User's franchise business within franchised municipal services;

(r) Bin Delivery, Swaps and Removals for New or Existing Customers;

(s) Service Level Audits including container size, number and service frequency;

(t) Determination of services being provided to non-User customers;

(u) Franchise Requirements (Signage, City Designations, Notices, Etc.);

(v) Proactive Customer Notifications as defined by User;

(w) Proactive Driver Notifications as defined by User; and (x) Such other Use Cases as defined by User.

In certain illustrative embodiments, the system and method provide a user and/or auditor with the ability to operate OBUs, DVRs and user Cameras related to one or more of the following functions:

(a) Soiled Windshields/Inoperable Wipers/Camera Position;

(b) Defective Triggering Events (proximity switches and other mechanical devices);

(c) No Camera image available;

(d) Pre-defined Heath Assessment Reports related to User's use of the OBU, DVR and User cameras; and (e) Such other diagnostic capabilities to ensure continuous operation and use of the system and method.

In certain illustrative embodiments, the system and method provide an end-user with the ability to capture video and still images of service events as described above and send videos and still images to Customer Services, Operations, Dispatch, such other User designees and to customers directly via US Mail, web-address, email and text.

In certain illustrative embodiments, a method is provided of managing service and non-service related activities associated with a waste collection, disposal and/or recycling vehicle (see FIG. 56). For example, OBC and DVR can be activated (including GPS) for continuously monitoring and recording of a waste vehicle. OBC and DVR can be activated upon start-up of the waste vehicle. Routing and customer data can be prepopulated and/or loaded in the OBU. A system health assessment can be generated to ensure operability, e.g., optical sensors, OBU and DVR operating. The optical Sensors can be activated and begin continuously recording video onto the OBC and DVR. The waste driver can begin his route. One or more chapters can be created on the recordings based on automated Triggering Events. The Triggering Event may include, for example, arm lift, hopper activation, etc. One or more Chapters can also be created on the recordings based on driver initiated events and/or on external signals. The Chapters can be converted to discreet images (video and still) within the recording and loaded onto a viewing portal designated for events to review. One or more discreet images that are assigned to (i) a latitude/longitude and/or (ii) user customer information assigned to a latitude/longitude can be matched and verified. One or more videos and still images can be transferred to the viewing portal. The images can for example, be in sequential order and/or have a date and time stamp. Within the viewing portal, the end user can select from various drop-down matters relating to the subject matter of videos and still images. For example, the drop-down menus can begin with or include User Name, District/BU and/or Use Case.

In certain illustrative embodiments, a system is provided for managing service and nonservice activities in connection with waste collection, disposal and/or recycling. For example, the system can include a waste vehicle equipped with an onboard board computer (OBC) and digital video recorder (DVR). The waste vehicle can also be equipped with one or more optical sensors. The vehicle can be configured to provide triangulation of customer location for commercial, residential and industrial collections using an OBC linked to GPS, an on-board DVR linked to GPS and other off-the-shelf mapping geo-coding applications to establish latitude/longitude for each customer container, bin, cart and box. One or more optical sensors can be configured to capture continuous video recordings from the time the waste collection truck driver commences the DOT pre-trip inspection at the facility location until the collection waste truck driver returns to the facility location and performs the DOT post-trip inspection. One or more optical sensors can also be configured to the user's OBC, DVR and back office hardware and software system ("System"). One or more optical sensors, while configured to the OBC, DVR & System, can also be configured to a signal or signals emanating from electronic or mechanical devices on the truck which can include, but is not limited to, proximity switches, limit switches, mechanical sensors, electronic control module (ECM), programmable logic computer (PLC), arms, hoppers and/or blades and such other vehicle devices (hereinafter referred to as "Devices"). One or more optical sensors, while configured to the OBC, DVR & System, can also be configured to detect vehicle movement including acceleration, deceleration, g-force, stopping and starting (hereinafter referred to as "Vehicle Movement"). One or more optical sensors, while configured to the OBC, DVR & System, can also be configured to detect a driver initiated triggering event (hereinafter referred to as "Driver Initiated Event"). One or more optical sensors, while configured to the OBC, DVR & System, can also be configured to detect a vehicle initiated triggering event that is external or outside of the vehicle (hereinafter referred to as "External Initiated Event"). One or more of the Devices, Vehicle Movement, Driver Initiated Event, and External Initiated Event (hereinafter referred to as "Triggering Events") can be configured to the OBC and DVR and can cause a Chapter to be captured on the continuous video recording resulting in a Still Image or up to 60 second Video Clip that is assigned to one or more optical sensors. The Chapters can be configured to associate with a viewing portal for review and can be made available in sequential order based on Date, Time and Truck ID.

In certain illustrative embodiments, a method is provided that involves the use and analysis of one or more of Company information and Customer information. The Company information can include, but is not limited to, Business Unit/Site, Truck ID, Company Code and Route ID, and can be downloaded into the OBC. The Customer locations can include locations of the container/bin/cart/box, and can be assigned a latitude/longitude and downloaded into the OBC. The OBC can contain Customer information including, but not limited to Customer ID, Customer name, Customer address, Customer service levels, Franchise name/Open Market with the Customer information likewise link to the Customer location. The OBC can also contain service requirements assigned to the Customer and waste collection municipal franchise system. Resulting Chapters can be created from the continuous video recording through Triggering Events which are linked/connected to the Company and Customer with each Chapter containing Customer Name, Customer Address, Service Level, Sub-Line of Business, Route ID, Customer Account Number, Franchise Name/Open Market, Service Time and Service Date.

In certain illustrative embodiments, a method of viewing Company information, Customer information and Chapter developed from Triggering Events through the Optical Sensor(s) stored on the OBC and DVR within an Event to Review Portal or Display is provided. A visual display of the Still Image and/or up to 60-second Video Clip can be loaded into the Events to Review Portal and viewable by Use Case and then Business Unit and Truck ID. A visual display can be provided of the Still Image and/or up to 60-second Video Clip with Customer Name, Customer Address, Service Level, Sub-Line of Business, Route ID, Customer Account Number, Franchise Name/Open Market, Service Time and Service Date below the Still Image and/or Video Clip. The end-user can select an Image aligned to a Use-Case resulting in a red-box highlighting the Image. The end-user can also send the Image via web-address, email and/or text to the User's various departments (e.g. Customer Service, Billing, Operations, etc.) and to the Customer. The end-user can also Submit the highlighted image to an Advance Report module for use by the Company.

In certain illustrative embodiments, a method of reviewing Use Cases resulting from Chapters and such other waste service activities and nonservice activities outside of the waste servicing collection vehicle is provided. One or more Use-Cases can be selected from the Events to Review portal. A user can determine if the Images meet the criteria under each of the Use-Cases. The selected Chapter can then be submitted for further review within Advanced Reports.

In certain illustrative embodiments, a method for viewing Advanced Reports and such other Reports resulting from Images from Triggering Events being Submitted from the Events to Review Portal is provided. The end-user can select a series of selected Images from the Events to Review Portal. The selected Images can be made available for further review in the Advanced Reporting screen. The selected Images in the Advanced Reporting screen can be sent to Customer Service, Billing and Operations. The selected Images in the Advanced Reporting screen can also be sent to Customers via US Mail, web-address, email and/or text.

Figure 57:
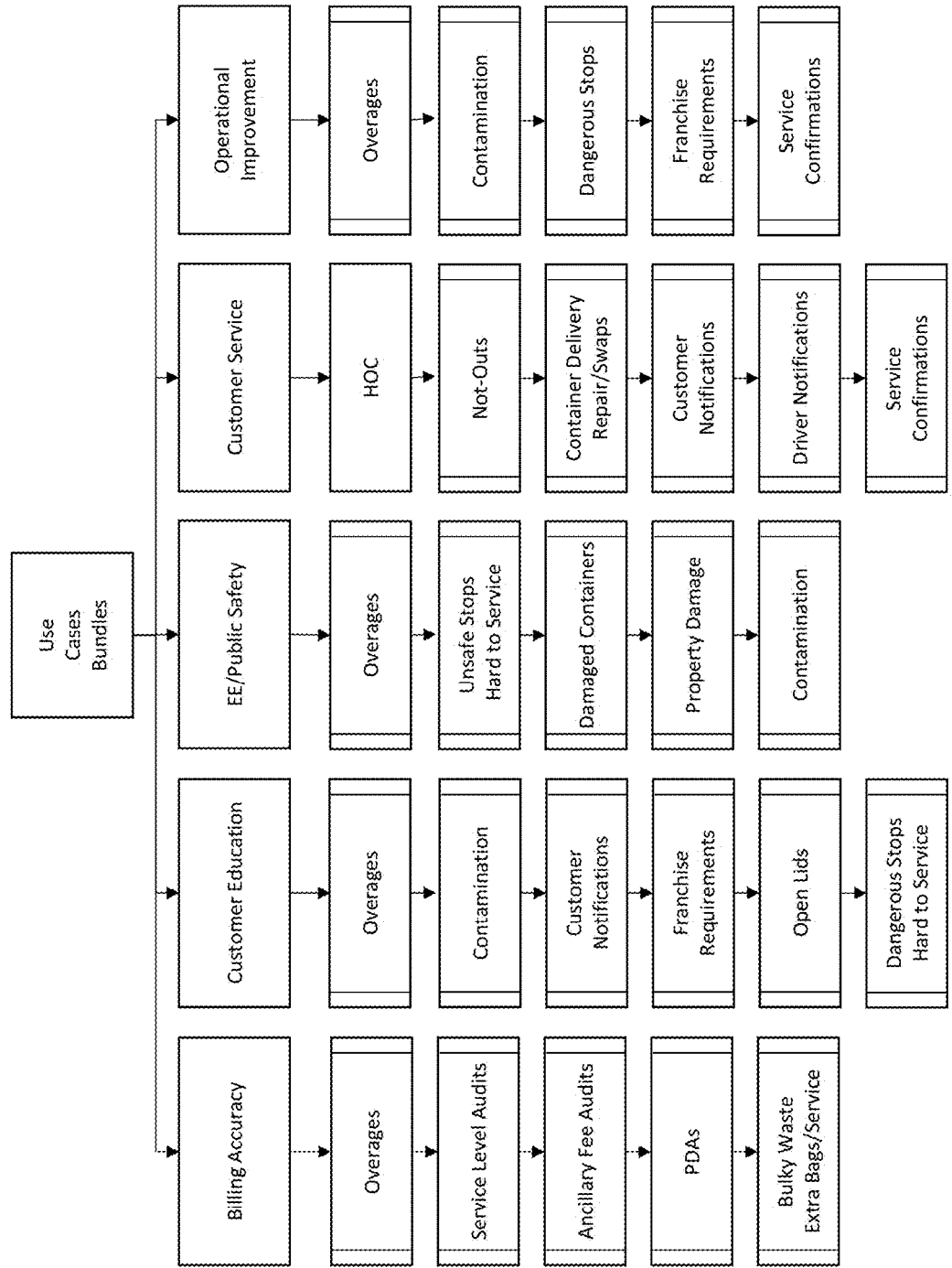
FIG. 57 illustrates various examples of use case bundles in accordance with illustrative embodiments of the presently disclosed subject matter.

Consideration of Use Cases in management of collection waste services may be categorized or bundled as follows (See FIG. 57) with some Use-Cases spanning multiple categories/bundles as set forth in the following categories:

(a) Accuracy in Billing the Customer:

A critical component of providing waste services to residential and commercial customers is accuracy in the customer's statement. The system and method of recording service related and non-service related activities outside of the waste collection vehicle allows the end-user to include but not limited to: (i) determine if the waste container or bin is overloaded resulting in the customer receiving additional service beyond the capacity of the container or bin; (ii) determine if the container or bin size, quantity and/or frequency of service is inconsistent with the Customer information in User's system; (iii) determine if the Customer is receiving ancillary services and not being charged or being charged for ancillary services with the same not being provided; (iv) determine if an address is receiving waste collection services and the owner or tenant is not set-up correctly or not being charged in the User's system; and (v) accurately charge for Bulky Pick-ups and Extra Bags/Extra Service.

(b) Management and Education of Customers Regarding Service Requirements:

An obligation of the waste service provider is to manage and educate the residential and commercial customer of the waste collection company's service requirements as well as requirements under a municipal franchise system and/or regulatory authority. The system and method of recording service related and non-service related activities outside of the waste collection vehicle allows the end-user to include but not limited to: (i) educate the customer on contamination of recycling and organics including highlighting prohibited items in the container or bin; (ii) educate the customer on closing the container or bin lid to reduce capturing of precipitation, to reduce litter/blight, to reduce unauthorized dumping or use; and, to reduce animals and vermin from intruding the container or bin; (iii) educate the customers on the dangers and hardships associated with overloading a container or bin; and (iv) educate the customer on proper and safe container placement and location as well as the impact of obstructing container or bin access;

(c) Improve Employee and Public Safety:

An obligation of the waste service provider is to provide a safe working environment for its employees and its Customers. The system and method of recording service related and non-service related activities outside of the waste collection vehicle allows the end-user to include but not limited to: (i) improve safety and protects its employees and equipment by reducing overloaded containers, which damage equipment, cause collection vehicle fires, cause other property damage from falling debris and otherwise puts its employees at risk; (ii) improve safety by identifying and abating dangerous stops and hard to service accounts, which result in vehicle accidents and employee injuries; (iii) improve safety for our Material Recovery Facility (MRF) employees by reducing contamination in the recycling and organics streams and ultimately MRF sort lines managed and staffed by its employees; (iv) improve safety and reduce vehicle accidents by having safe access to containers and bins; and (v) improve safety by identifying and correcting damaged containers and bins at Customer's service location.

(d) Improved Customer Service:

The cornerstone of a successful waste collection provider is providing excellent customer service. The system and method of recording service related and non-service related activities outside of the waste collection vehicle allows the end-user to include but not limited to: (i) proactively notify the customer of waste collection service requirements to ensure safe and efficient waste collection; (ii) proactively notify operations and its driver of the driver's service deficiencies on-route; (iii) demonstrate a container is blocked or unavailable for service and assist the Customer in efforts to receive timely service; (iv) reduce litter/blight, unauthorized use of the customer's bin or container; (iv) demonstrate the Customer's container or bins was "Not-Out" and eliminate disputes between the Customer and Customer Service; (v) educate the Customer on proper recycling and management of waste in each of the containers or bins; and (vi) proactively remove or repair damaged and/or leaking containers and bins.

(e) Operational Improvements:

Operational improvements result in more efficient waste collection services and ultimately improved earnings, safety and employee morale. The system and method of recording service related and non-service related activities outside of the waste collection vehicle allows the end-user to include but not limited to: (i) ensure competitors or unauthorized waste collectors are not infringing on waste collectors exclusive franchise within a municipal franchise system resulting in increased revenue, route density and profitability; (ii) prospect open market sales opportunities within the waste collector's service area resulting in increased revenue, route density and profitability; (ii) reduce overloaded containers resulting in less equipment damage, employee injuries and time off-route; (iii) reduce contamination resulting lower disposal cost at MRFs, higher recovery of commodities, lower MRF equipment maintenance and damage; and, reduced employee injuries from exposure to contaminated recycling; (iv) improved route efficiencies by servicing readily accessible containers and bins; and (v) supporting frontline employees by holding Customer to waste collector's service requirements.

Those skilled in the art will appreciate that portions of the subject matter disclosed herein may be embodied as a method, data processing system, or computer program product. Accordingly, these portions of the subject matter disclosed herein may take the form of an entirely hardware embodiment, an entirely software embodiment, or an embodiment combining software and hardware. Furthermore, portions of the subject matter disclosed herein may be a computer program product on a computer-usable storage medium having computer readable program code on the medium. Any suitable computer readable medium may be utilized including hard disks, CD-ROMs, optical storage devices, or other storage devices. Further, the subject matter described herein may be embodied as systems, methods, devices, or components. Accordingly, embodiments may, for example, take the form of hardware, software or any combination thereof, and/or may exist as part of an overall system architecture within which the software will exist. The present detailed description is, therefore, not intended to be taken in a limiting sense.

It is to be understood that the present invention is not limited to the embodiment(s) described above and illustrated herein, but encompasses any and all variations falling within the scope of the appended claims.

What is claimed is:

1. A method of auditing the status of a customer waste or recycling container using a service vehicle, the method comprising:
   capturing a continuous video recording of an area outside of a cab of the service vehicle during the entirety of a service operations period for the service vehicle, wherein the continuous video recording is captured by a camera on the service vehicle;
   storing the continuous video recording on a recording device;
   capturing a chapter from the continuous video recording, wherein the chapter comprises one or more of a still image and a video clip of 60 seconds or less of a customer location;
   associating the chapter with a customer based on stored customer identifying information;
   associating the chapter with a user defined scenario relevant to the service activities, wherein the user defined scenario is a customer container that has contaminated materials therein;
   displaying the chapter on an electronic viewing portal in association with an identification of the user defined scenario and with one or more of date, time, an identification number for the service vehicle, and an identifying feature of the customer;
   making the electronic viewing portal available for viewing by a user; and
   receiving instructions from the user regarding whether to provide one or more of a communication, a billing adjustment and an account notation to the customer based on a determination by the user of whether the customer container has contaminated materials therein.

2. The method of claim 1, wherein the customer container is a residential container.

3. The method of claim 1, wherein the customer container is a commercial container.

4. The method of claim 1, wherein the customer container is an industrial roll-off container.

5. A method of auditing the status of a customer waste or recycling container using a service vehicle, the method comprising:
   collecting a continuous video recording of an area outside of a cab of the service vehicle during the entirety of a service operations period for the service vehicle, wherein the continuous video recording is captured by an optical sensor on the service vehicle;
   capturing a chapter from the continuous video recording, wherein the chapter comprises one or more of a still image and a video clip of a customer location and a customer container at the customer location;
   connecting the chapter with a specific customer based on stored customer identifying information;
   connecting the chapter with a pre-defined use case associated with service operations, wherein the pre-defined use case is a customer container having contaminated materials therein;
   determining whether the customer container has contaminated materials therein based on the information in the chapter; and
   providing one or more of a communication, a billing adjustment and an account notation to the customer based on the determination of whether the customer container has contaminated materials therein.

6. The method of claim 5, wherein the customer container is a residential container.

7. The method of claim 5, wherein the customer container is a commercial container.

8. The method of claim 5, wherein the customer container is an industrial roll-off container.

* * * * *